(12) United States Patent
Yasui et al.

(10) Patent No.: US 7,813,867 B2
(45) Date of Patent: Oct. 12, 2010

(54) CONTROL APPARATUS AND METHOD AND CONTROL UNIT

(75) Inventors: Yuji Yasui, Saitama-ken (JP); Ikue Kawasumi, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 12/314,896

(22) Filed: Dec. 18, 2008

(65) Prior Publication Data

US 2009/0164090 A1   Jun. 25, 2009

(30) Foreign Application Priority Data

Dec. 25, 2007   (JP)   ............................. 2007-332969

(51) Int. Cl.
*F02D 41/00*   (2006.01)
*G06F 7/70*   (2006.01)

(52) U.S. Cl. ........................ 701/103; 701/109; 701/114; 123/688; 123/690; 123/694

(58) Field of Classification Search ................. 123/672, 123/688, 690, 694; 701/102, 103, 108, 109, 701/114
See application file for complete search history.

(56) References Cited

U.S. PATENT DOCUMENTS 6,188,953 B1 *   2/2001   Yasui et al. ................. 701/109
7,640,067 B2 *   12/2009   Boyden et al. ............... 700/52

7,643,930 B2 *   1/2010   Yasui et al. ................. 701/103
2003/0140617 A1   7/2003   Yasui
2008/0264036 A1*   10/2008   Bellovary .................... 60/274

FOREIGN PATENT DOCUMENTS

| DE | 103 02 126 A1 | 8/2003 |
| JP | 2000-234550 | 8/2000 |
| JP | 2005-275489 | 10/2005 |

OTHER PUBLICATIONS

European Search Report 08022300.1 dated Apr. 29, 2009.

\* cited by examiner

*Primary Examiner*—Thomas N Moulis
(74) *Attorney, Agent, or Firm*—Squire, Sanders & Dempsey L.L.P.

(57) ABSTRACT

A control apparatus which can improve the accuracy of control of a controlled variable by a control input exhibiting a periodic fluctuating behavior. The control apparatus calculates an air-fuel ratio correction value DKCMD such that the output from an oxygen concentration sensor converges to a target output, and calculate a modulated value DKCMD_DSM by modulating DKCMD with an algorithm to which is applied a $\Delta \Sigma$ modulation algorithm. Further, the control apparatus calculates a reference air-fuel ratio KCMDBS according to an exhaust gas volume, calculates a model modification coefficient KTRQFF using a modification coefficient calculated such that DKCMD become equal to 0, calculates an adaptive reference air-fuel ratio KCMDADP by the equation of KCMDADP=KCMDBS×KTRQFF, and calculates a target air-fuel ratio KCMD by the equation of KCMD=KCMADP+DKCMD_DSM.

24 Claims, 21 Drawing Sheets

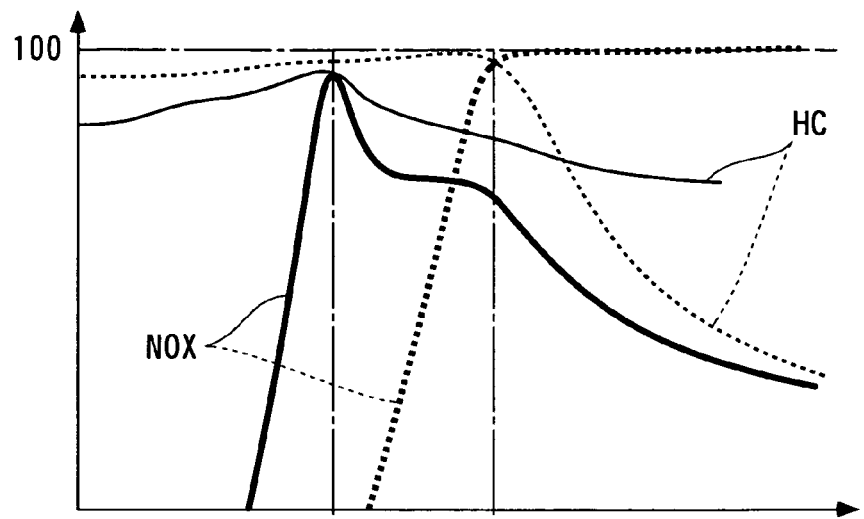

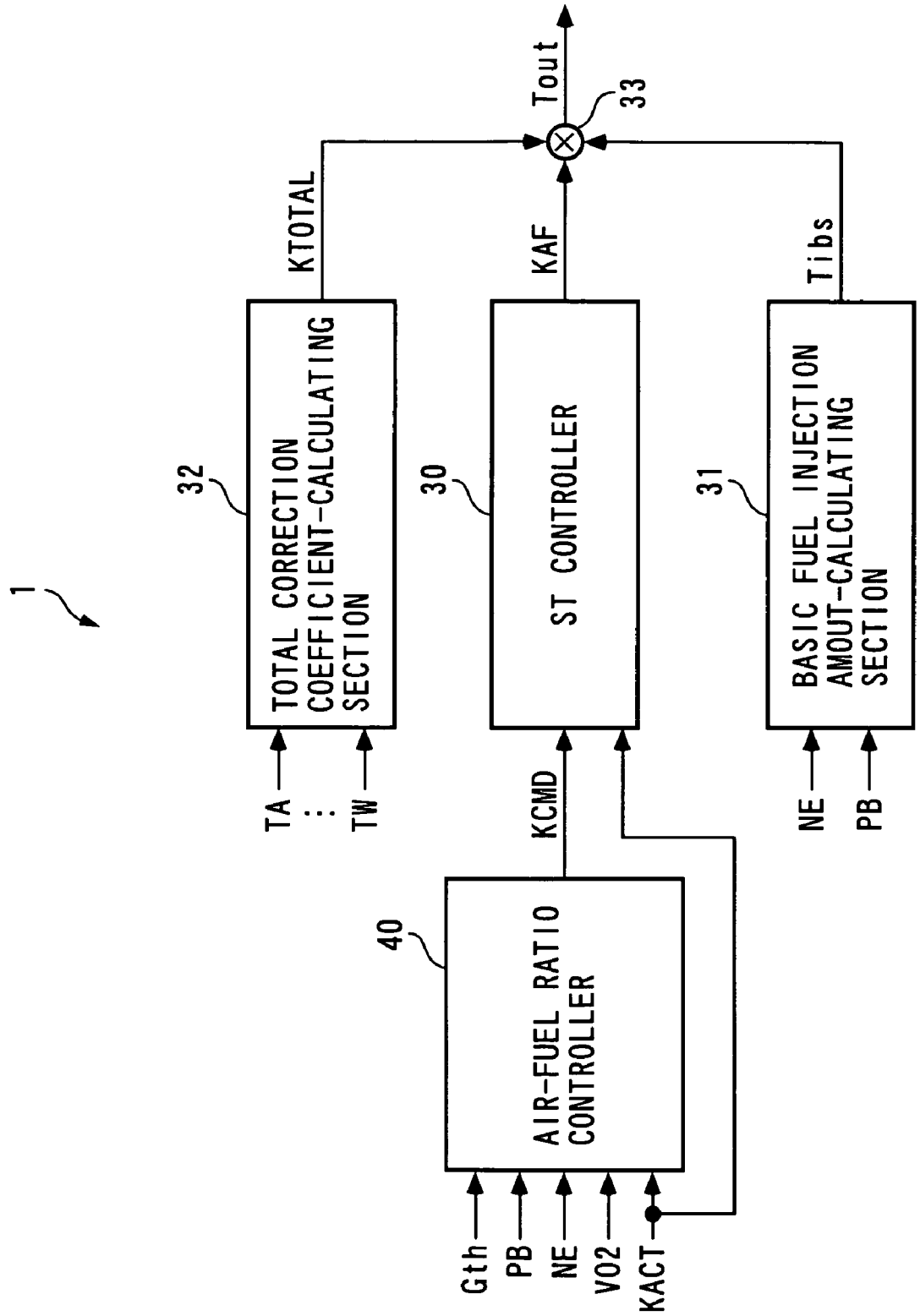

SV_hat

F I G. 9 A 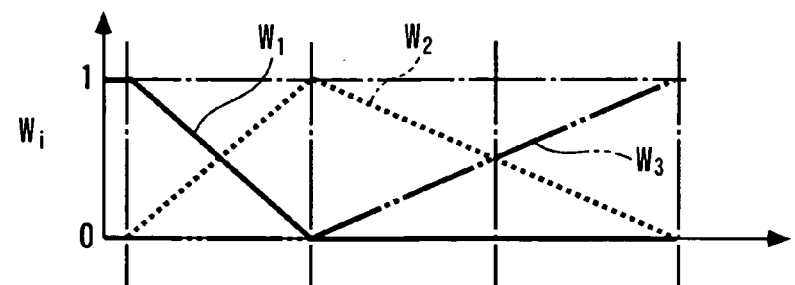
F I G. 9 B 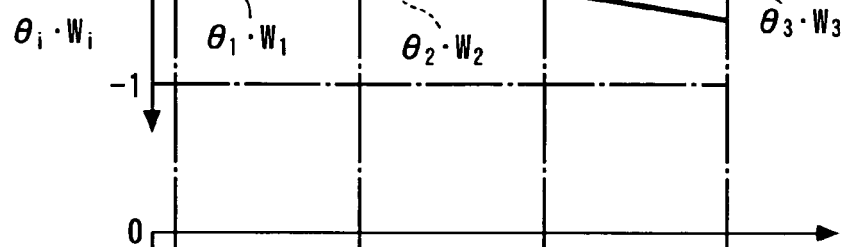
F I G. 9 C 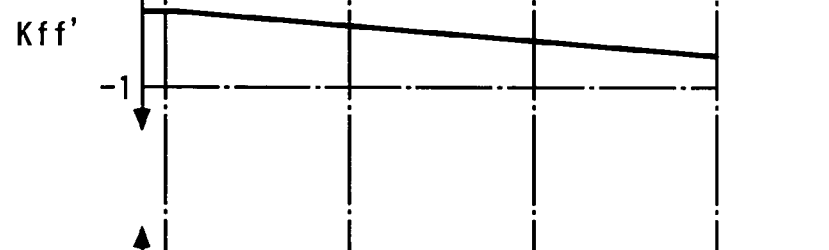
F I G. 9 D 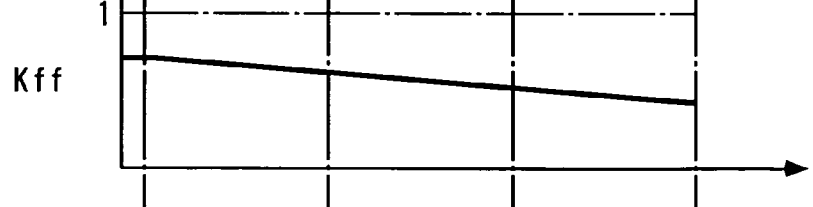
F I G. 9 E 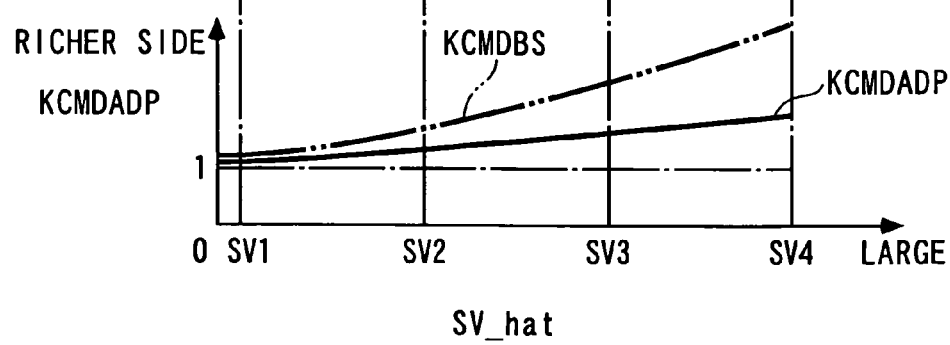
SV_hat F I G. 2 1
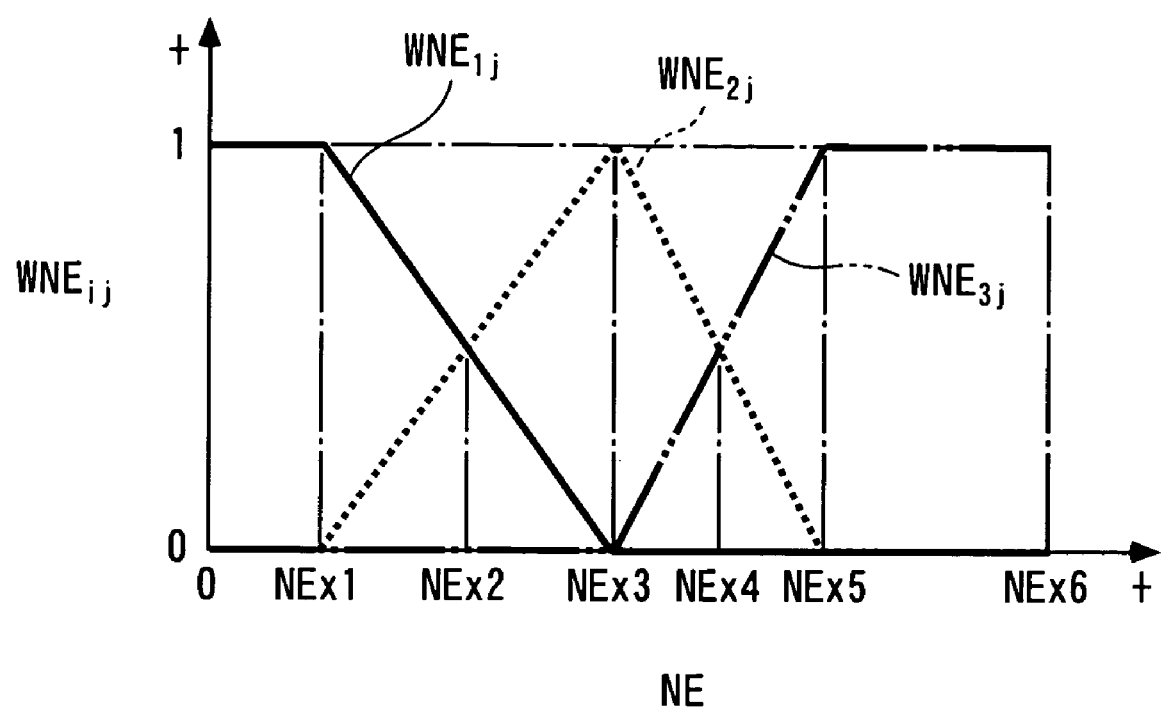

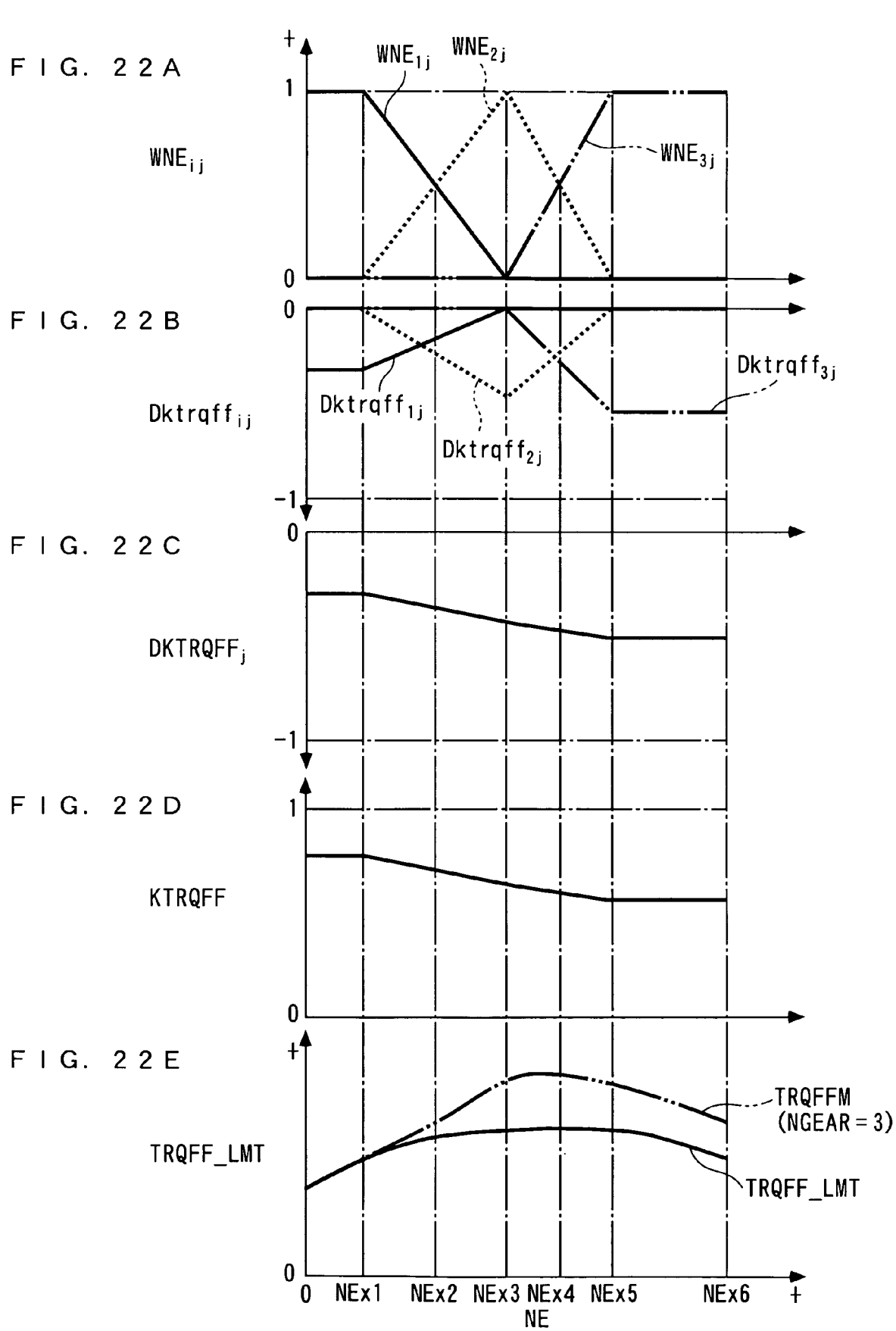

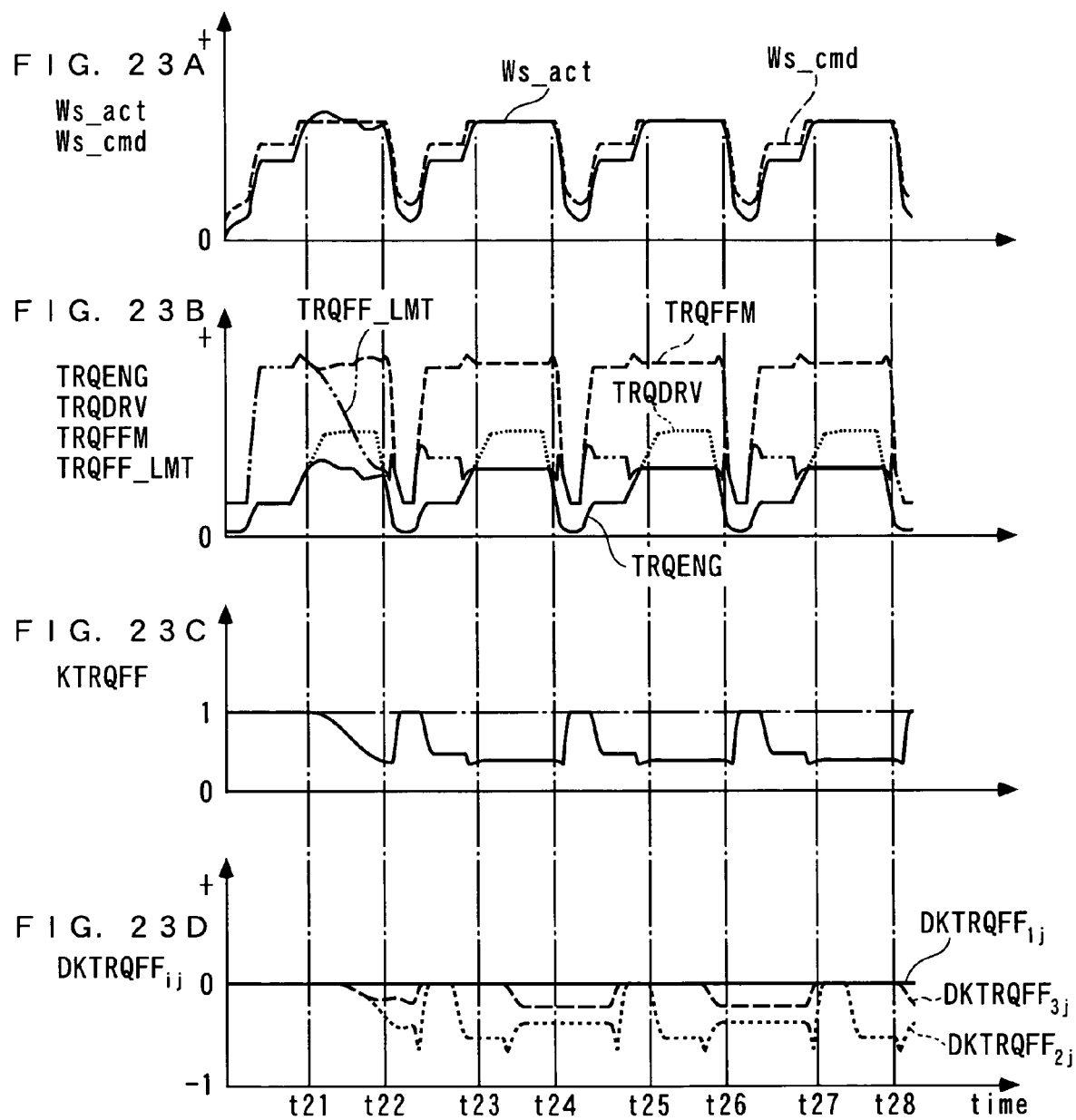

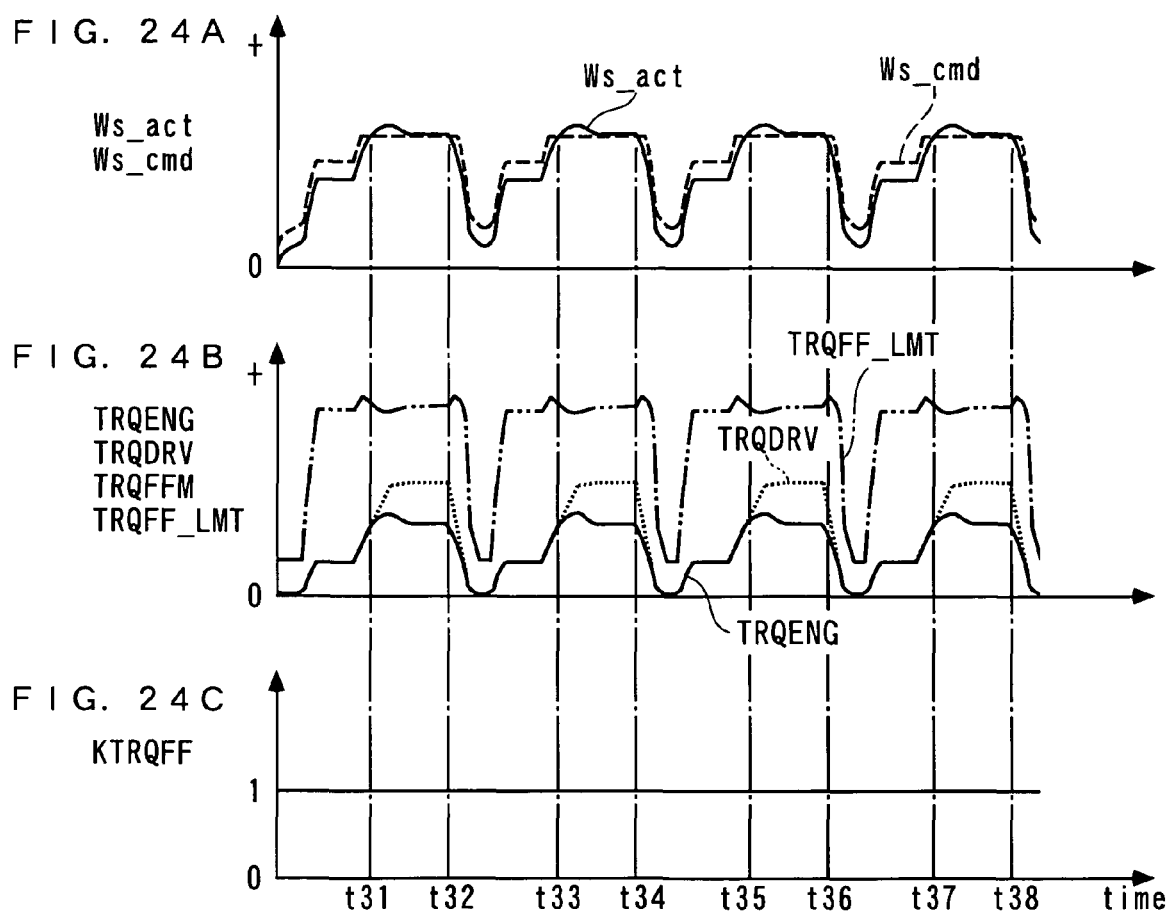

CONTROL APPARATUS AND METHOD AND CONTROL UNIT

BACKGROUND OF THE INVENTION

1. Field of the Invention

The present invention relates to a control apparatus and method and a control unit which modulate a value calculated by a feedback control method such that a controlled variable is caused to converge to a target controlled variable, with a predetermined modulation algorithm, to thereby calculate a control input to a controlled object using the modulated value.

2. Description of the Related Art

As a control apparatus for controlling the air-fuel ratio of a mixture supplied to an internal combustion engine, the present assignee has already proposed a control apparatus disclosed in Japanese Laid-Open Patent Publication (Kokai) No. 2000-234550. This control apparatus is comprised of a LAF sensor, an oxygen concentration sensor, a state predictor, an onboard identifier, a sliding mode controller, and a target air-fuel ratio-calculating section. The LAF sensor and the oxygen concentration sensor are each for detecting a value indicative of the concentration of oxygen in exhaust gases flowing through an exhaust passage of the engine, i.e. the air-fuel ratio, and are inserted into the exhaust passage at respective locations downstream of a collecting section thereof. Further, the LAF sensor is disposed on the upstream side of a catalytic device, and the oxygen concentration sensor is disposed on the downstream side of the catalytic device.

This control apparatus employs a discrete-time system model as a controlled object model to which is input the difference DKACT between an actual air-fuel ratio KACT detected by the LAF sensor and a learned value FLAFBASE (hereinafter referred to as "the air-fuel ratio difference DKACT") and from which is output the difference DVO2 between an output VOUT from the oxygen concentration sensor and a predetermined target value VOUT_TARGET (hereinafter referred to as "the output difference DVO2"), and calculates a target air-fuel ratio KCMD (target equivalent ratio) as a control input, as described hereinafter.

More specifically, the state predictor calculates a predicted value of the output difference DVO2 with a predetermined prediction algorithm based on the above-described controlled object model, and the onboard identifier identifies a model parameter of the controlled object model by an sequential least-squares method. Further, the sliding mode controller calculates an operation amount Usl based on the predicted value of the output difference and an identified value of the model parameter with a sliding mode control algorithm such that the output difference DVO2 converges to 0.

Furthermore, the target air-fuel ratio-calculating section calculates the learned value FLAFBASE by adding a learning component flafadp to a fixed value flafbase. When Uadp, which is a component of the operation amount Usl, is within a predetermined range, and KACT≈KCMD holds, the learning component flafadp is held at an immediately preceding value thereof, whereas when Uadp is not within the predetermined range, the learning component flafadp is calculated by adding or subtracting a predetermined value Δflaf to or from the immediately preceding value thereof. A calculation period or a learning speed at which the target air-fuel ratio-calculating section calculates or learns the learned value FLAFBASE is set to a relatively long period or low speed so as to prevent the calculation of the learned value from interfering with sliding mode control by sliding mode controllers.

Then, the target air-fuel ratio KCMD is calculated by adding the operation amount Usl to the learned value FLAF-BASE calculated as above. As a result, a fuel injection amount is calculated such that the actual air-fuel ratio KACT converges to the target air-fuel ratio KCMD, whereby the air-fuel ratio is controlled such that the output VOUT from the oxygen concentration sensor converges to a predetermined target value VOUT_TARGET. The predetermined target value VOUT_TARGET is set to such a value as will make it possible to obtain an excellent exhaust emission reduction rate of the catalytic device when the output VOUT from the oxygen concentration sensor takes the target value VOUT_TARGET. As a consequence, it is possible to obtain an excellent exhaust emission reduction rate of the catalytic device by the above control.

Further, the present assignee has already proposed a control apparatus which controls a controlled object having a nonlinear characteristic in Japanese Laid-Open Patent Publication (Kokai) No. 2005-275489. In the control apparatus disclosed in FIG. 9 of Japanese Laid-Open Patent Publication (Kokai) No. 2005-275489, a controller 51 calculates a reference input such that an output Vex from an exhaust gas sensor converges to its target value Vex_cmd, and a ΔΣ modulator 52 modulates the reference input with a ΔΣ modulation algorithm, whereby a fuel parameter Ufuel is calculated as a control input. This makes it possible to cause the output Vex from the exhaust gas sensor to converge to the target value Vex_cmd accurately, while compensating for response delay and variations of the engine and the catalytic device, thereby making it possible to ensure excellent reduction of exhaust emissions by the catalytic device.

According to the above-described conventional control apparatus disclosed in Japanese Laid-Open Patent Publication (Kokai) No. 2000-234550, the air-fuel ratio is controlled based on the output VOUT from the oxygen concentration sensor disposed on the downstream side of the catalytic device. This can cause the following problems: In general, when the air-fuel ratio varies between cylinders of a multi-cylinder internal combustion engine, although exhaust gases emitted from the cylinders are mixed with each other on the downstream side of the collecting section of the exhaust passage, the degree of mixing between them is limited, and hence when the exhaust gases flow into the catalytic device, non-uniformity of the air-fuel ratio of the exhaust gases is sometimes caused in the catalytic device. Therefore, for example, even when the output VOUT from the oxygen concentration sensor has converged to the predetermined target value VOUT_TARGET, i.e. even when DVO2≈0 holds, a state is sometimes caused in which a half of the catalytic device is in a rich atmosphere, and the other half thereof is in a lean atmosphere. When the catalytic device is held in such a state for a long time period, the exhaust emission reduction rate of the whole catalytic device is reduced, resulting in increased exhaust emissions.

To solve the above-described problems of the control apparatus disclosed in Japanese Laid-Open Patent Publication (Kokai) No. 2000-234550, it is envisaged to configure a control apparatus, as described below, by applying the control method disclosed in Japanese Laid-Open Patent Publication (Kokai) No. 2005-275489 to the control apparatus disclosed in Japanese Laid-Open Patent Publication (Kokai) No. 2000-234550. The control apparatus is configured such that the above-mentioned operation amount Usl is modulated with the A ΔΣ modulation algorithm to thereby calculate a modulated operation amount, and the learned value FLAFBASE is added to the modulated operation amount, to thereby calculate the target air-fuel ratio KCMD. With this configuration, when DVO2≈0 holds, the target air-fuel ratio KCMD is calculated such that it repeatedly performs a high-frequency periodic fluctuating behavior with respect to the learned value FLAFBASE as the center. As a consequence, when the learned value FLAFBASE is equal to the optimum value of the target air-fuel ratio KCMD, which makes DVO2 appropriately equal to 0 (DVO2≈0), the air-fuel ratio of each cylinder performs the high-frequency periodic fluctuating behavior, which makes it possible to prevent the atmosphere of the catalytic device from being held in a non-uniform state for a long time period, thereby making it possible to ensure excellent reduction of exhaust emissions.

However, when the learned value FLAFBASE largely deviates from the optimum value of the above-mentioned target air-fuel ratio KCMD, the output VOUT from the oxygen concentration sensor largely deviates from the predetermined target value VOUT_TARGET, so that the fluctuating frequency of the target air-fuel ratio KCMD becomes lower. The present assignee has already confirmed that when the fluctuating frequency of the target air-fuel ratio KCMD becomes lower as described above, unless the catalytic device is degraded, it is possible to maintain an excellent exhaust emission reduction rate of the catalytic device, whereas if the catalytic device is degraded, the exhaust emission reduction rate becomes markedly lower (e.g. the publication of Japanese Patent No. 3880861 (Paragraph numbers [0202] to [0205], FIG. 38).

Recently, ethanol-mixed fuel is used as fuel for engines, and non-metal catalysts, such as Perovskite, low-precious metal catalysts, and so forth are used as catalysts for catalytic devices. In such cases, the optimum value of the target air-fuel ratio KCMD, which makes DVO2 appropriately equal to 0, is liable to change suddenly and largely with a change in the operating state of the engine (e.g. a change in the volume of exhaust gases). In contrast, as described above, the learned value FLAFBASE has a characteristic that the learning speed thereof is low, so that when the optimum value of the target air-fuel ratio KCMD is changed suddenly and largely with the change in the operating state of the engine, as described above, the learned value FLAFBASE is made liable to deviate from its optimum value largely, thereby making the fluctuating frequency of the target air-fuel ratio KCMD liable to be become markedly lower, which makes the above problem conspicuous.

SUMMARY OF THE INVENTION

It is an object of the present invention to provide a control apparatus and method and a control unit which are capable of quickly correcting the lowering of the fluctuating frequency of a control input, caused by a sudden change in the dynamic characteristics of a controlled object, when a controlled variable is controlled by the control input which performs a periodic fluctuating behavior, such that the controlled variable is caused to converge to a target controlled variable, thereby making it possible to improve the control accuracy.

To attain the above object, in a first aspect of the present invention, there is provided a control apparatus for controlling a controlled variable of a controlled object by a control input, comprising controlled variable-detecting means for detecting the controlled variable, target controlled variable-setting means for setting a target controlled variable serving as a target to which the controlled variable is controlled, first input value-calculating means for calculating a first input value for performing feedback control of the controlled variable such that the controlled variable is caused to converge to the target controlled variable, with a predetermined feedback control algorithm, modulated input value-calculating means for calculating a modulated input value by modulating the first input value with a predetermined modulation algorithm such that the modulated input value has a higher frequency as an absolute value of the first input value is smaller, operating state parameter-detecting means for detecting an operating state parameter indicative of an operating state of the controlled object, except for the controlled variable, error parameter-calculating means for calculating an error parameter indicative of an error of the control input with respect to an estimated value of the control input at which the controlled variable is estimated to become equal to the target controlled variable, modification value-calculating means for calculating a plurality of modification values respectively associated with a plurality of regions formed by dividing a region within which the operating state parameter is variable, with a predetermined control algorithm, such that the error parameter becomes equal to a predetermined target value, model-modifying means for modifying a correlation model representative of a relationship between a second input value for feedforward-controlling the controlled variable and the operating state parameter, using the plurality of modification values, second input value-calculating means for calculating the second input value using the modified correlation model and the operating state parameter, and control input-calculating means for calculating the control input based on a sum of the second input value and the modulated input value such that the control input performs a periodic fluctuating behavior.

With the configuration of the control apparatus according to the first aspect of the present invention, the first input value for performing feedback control of the controlled variable such that the controlled variable is caused to converge to the target variable is calculated with the predetermined feedback control algorithm, and the modulated input value is calculated by modulating the first input value with the predetermined modulation algorithm such that the modulated input value has a higher frequency as the absolute value of the first input value is smaller. The second input value for feedforward-controlling the controlled variable is calculated using the modified correlation model and the operating state parameter, and the control input is calculated based on the sum of the second input value and the modulated input value. Since the control input is thus calculated, when the error of the control input with respect to the estimated value of the control input is suddenly increased due to a sudden change in the dynamic characteristics of the controlled object, it takes time to compensate for the error using the first input value since the first input value is calculated with the feedback control algorithm, resulting in degraded control accuracy.

However, according to the present invention, the plurality of modification values associated with the plurality of regions formed by dividing the region within which the operating state parameter is variable are calculated, respectively, such that the error parameter becomes equal to a predetermined target value, and the second input value is calculated using the correlation model modified using the modification values and the operating state parameter. In short, the second input value is calculated using the correlation model modified for the plurality of regions, on a region-by-region basis, such that the error parameter becomes equal to the predetermined target value. Therefore, even when the error of the control input with respect to the estimated value of the control input is suddenly increased due to a sudden change in the dynamic characteristics of the controlled object, it is possible to quickly and accurately compensate for the error of the control input by the second input value that is calculated using the modified correlation model.

Particularly, by using, as the correlation model, an N-dimensional map (N is a natural number) representing the correlation between the operating state parameter and the second input value, which is generally used in the feedforward control method, a calculating equation representing the correlation therebetween, or the like, the error parameter, i.e. the error of the control input with respect to the estimated value of the control input can be more quickly compensated for than in a case where the same is compensated for by the first input value calculated with the feedback control algorithm. Thus, even under a condition where the error of the control input with respect to the estimated value of the control input is suddenly and temporarily increased e.g. due to a change in the dynamic characteristics of the controlled object, it is possible to control the controlled variable to a value close to the target controlled variable and reduce the absolute value of the first input value, thereby making it possible to quickly increase the frequency of the modulated input value, that is, the fluctuating frequency of the control input. Thus, it is possible to quickly correct the lowering of the fluctuating frequency of the control input caused by a sudden change in the dynamic characteristics of the controlled object, whereby the control accuracy can be improved (It should be noted that throughout the specification, "correlation model" is not limited to a response surface model or a mathematical model but includes all models which represent the correlation between the operating state parameter and the second input value, such as the N-dimensional map (N is a natural number) and a predetermined calculation algorithm. Further, "detection of the operating state parameter" is not limited to direct detection of the operating state parameter by a sensor, but includes calculation or estimation thereof).

Preferably, the model-modifying means calculates a plurality of products by multiplying a difference between the error parameter and the predetermined target value, by values of a respective plurality of predetermined functions, and calculates the plurality of modification values according to the plurality of products, respectively, the plurality of regions having adjacent regions overlapping each other, and the plurality of predetermined functions are associated with the plurality of regions, respectively, and are set to values other than 0 only in the associated regions and to 0 in regions other than the associated regions, such that in regions overlapping each other, an absolute value of a total sum of values of the respective functions associated with the overlapping regions becomes equal to an absolute value of a maximum value of the functions.

With the configuration of the preferred embodiment, the plurality of predetermined functions are associated with the plurality of regions, respectively, and are set to values other than 0 only in the associated regions and to 0 in regions other than the associated regions, such that in regions overlapping each other, an absolute value of a total sum of values of the respective functions associated with the overlapping regions becomes equal to an absolute value of a maximum value of the functions. The plurality of products are calculated by multiplying the difference between the error parameter and the predetermined target value, by the values of the respective plurality of predetermined functions, and the plurality of modification values are calculated according to the plurality of products, respectively. This makes it possible to distribute the difference between the error parameter and the predetermined target value, to the modification values via the values of the predetermined functions, thereby making it possible to properly modify the correlation model while reflecting the degrees of errors in the respective regions on the correlation model, by the modification values. In addition thereto, the absolute value of the total sum of the values of the functions associated with the overlapping regions is set to be equal to the absolute value of the maximum value of the functions, so that the modification values calculated using the values of the thus set functions become values continuous with each other, whereby even when the operating state parameters are suddenly changed, it is possible to calculate the second input value smoothly and steplessly. This makes it possible, even when the error of the control input with respect to the estimated value of the control input is suddenly and temporarily increased due to a sudden change in the dynamic characteristics of the controlled object, it is possible to avoid a sudden improper change or a sudden stepped change in the second input value, thereby making it possible to improve the accuracy and stability of control.

Preferably, the error parameter-calculating means includes setting means for setting the first input value to the error parameter, and setting the predetermined target value to 0.

With the configuration of the preferred embodiment, the second input value is calculated using the correlation model modified for the plurality of regions, on a region-by-region basis, such that the first input value becomes equal to 0, so that even when the control input largely deviates from the estimated value, and the controlled variable largely deviates from the target controlled variable, by the sudden change in the dynamic characteristics of the controlled object, causing a sudden increase in the first input value, it is possible to quickly control the suddenly increased first input value such that it becomes equal to 0, by the second input value calculated using the modified correlation model. As a result, it is possible to quickly control the controlled variable to the target controlled variable and thereby quickly increase the frequency of the modulated input value, i.e. the fluctuating frequency of the control input, whereby the control accuracy can be improved.

More preferably, the controlled variable is an output from an exhaust gas concentration sensor for detecting a concentration of a predetermined component of exhaust gases in an exhaust passage of an internal combustion engine at a location downstream of a catalytic device, the target controlled variable being a target output at which an exhaust emission reduction rate of the catalytic device is estimated to be placed in a predetermined state, the operating state parameter being an operating state parameter indicative of an operating state of the engine, and the control input-calculating means calculates, as the control input, a target air-fuel ratio which serves, in an air-fuel ratio control of a mixture supplied to the engine, as a target to which the air-fuel ratio of the mixture is controlled.

With the configuration of the preferred embodiment, the second input value is calculated using the correlation model modified for the plurality of regions, on a region-by-region basis, such that the first input value becomes equal to 0, and the operating state parameter, and the target air-fuel ratio is calculated based on the sum of the second input value and the modulated input value. Therefore, even when the calculated target air-fuel ratio largely deviates from the estimated value, and the output from the exhaust gas concentration sensor largely deviates from the target output, due to a sudden change in the operating state of the engine, thereby causing a sudden increase in the first input value, it is possible to quickly control the suddenly increased first input value to 0, by the second input value calculated using the modified correlation model. This makes it possible to quickly control the output from the exhaust gas concentration sensor to the target output, thereby making it possible to quickly increase the frequency of the modulated input value, i.e. the fluctuating frequency of the target air-fuel ratio. As a consequence, it is possible to quickly correct the lowering of the fluctuating frequency of the target air-fuel ratio caused by a sudden change in the operating state of the engine, and improve the exhaust emission reduction rate of the catalytic device by setting the target output to a value causing the catalytic device to achieve an excellent exhaust emission reduction rate.

Preferably, the error parameter-calculating means comprises estimated value-calculating means for calculating the estimated value of the control input, and error parameter-setting means for setting a difference between the estimated value and the second input value to the error parameter.

With the configuration of the preferred embodiment, the second input value is calculated using the correlation model modified for the plurality of regions, on a region-by-region basis, such that the difference between the estimated value of the control input and the second input value becomes equal to 0. Therefore, even when the control input largely deviates from the estimated value, and the controlled variable largely deviates from the target controlled variable, due to a sudden change in the dynamic characteristics of the controlled object, causing a sudden increase in the first input value, it is possible to quickly control the controlled variable to the target controlled variable and quickly reduce the first input, using the second input value calculated by the modified correlation model. This makes it possible to quickly increase the frequency of the modulated input value, i.e. the fluctuating frequency of the control input, thereby making it possible to improve the accuracy control.

More preferably, the controlled variable is a speed of drive wheels of a vehicle using the engine as a drive source, the target controlled variable being a target speed for making an amount of slippage of the drive wheels with respect to non-drive wheels of the vehicle, equal to a predetermined amount, the operating state parameter being an operating state parameter indicative of an operating state of the engine, and the control input-calculating means calculates, as the control input, a target output which serves, in output control of an output from the engine, as a target to which the output from the engine is controlled.

If the speed of the drive wheels of the vehicle is controlled using the target output from the engine as the control input, as in the case of this control apparatus, a friction characteristic between the tires and a road surface nonlinearly and largely changes across a point at which occurs a slip of the drive wheels (hereinafter this characteristic is referred to as "the nonlinear characteristic of the grip behavior"), and therefore, even when the speed of the drive wheels has converged to the target speed, there is a fear that the slip amount of the drive wheels undergoes hunting, or there occurs a steady-state deviation from a predetermined value. To avoid such inconveniences, it is necessary to calculate the target output such that it exhibits a behavior of fluctuating at a high frequency. In view of this, with the configuration of the preferred embodiment, the second input value is calculated using the correlation model modified for the plurality of regions, on a region-by-region basis, such that the first input value becomes equal to 0, and the operating state parameter, and the target output is calculated based on the sum of the second input value and the modulated input value. Therefore, even when the calculated target output largely deviates from the estimated value thereof, and the speed of the drive wheels largely deviates from the target speed, due to a sudden change in the operating state of the engine, causing a sudden increase in the first input value, it is possible to quickly control the suddenly increased first input value to 0, by the second input value calculated using the modified correlation model. This makes it possible to quickly control the speed of the drive wheels to the target speed, thereby making it possible to quickly increase the frequency of the modulated input value, i.e. the fluctuating frequency of the target output. As a consequence, the above-described nonlinear characteristic of the grip behavior can be compensated for, whereby it is possible to prevent hunting of the slip amount of the drive wheels, or occurrence of the steady-state deviation from the predetermined slip amount, and by setting the predetermined slip amount to a very small value, it is possible to ensure high-level accuracy in the control of the speed of the drive wheels. In short, high-accuracy traction control can be realized.

Further preferably, the control apparatus further comprises demanded output-calculating means for calculating the output from the engine demanded by a driver of the vehicle, as a demanded output, and selection means for selecting a smaller one of the demanded output and the target output as the target of the output from the engine in the output control.

With the configuration of the preferred embodiment, a smaller one of the demanded output demanded by the driver of the vehicle and the target output is selected as the target of the output from the engine in the output control, so that when the demanded output is larger than the target output, the target output is selected as the target, which enables the high-accuracy traction control to be executed as described hereinabove. On the other hand, when the target output is larger than the demanded output, the demanded output is selected as the target, which makes it possible to obtain the output from the engine as demanded by the driver, thereby making it possible to ensure excellent drivability.

Even more preferably, the control input-calculating means calculates the target output as a sum of the second input value and the modulated input value when the second input value is smaller than the demanded output, and calculates the target output as a sum of the demanded output and the modulated input value when the second input value is not smaller than the demanded output.

With the configuration of the preferred embodiment, when the second input value is smaller than the demanded output, the target output is calculated as the sum of the second input value and the modulated input value, whereas when the second input value is not smaller than the demanded output, the target output is calculated as the sum of the demanded output and the modulated input value. In other words, the target output is calculated as the sum of a smaller one of the second input value and the demanded output and the modulated input value, and a smaller one of the target output and the demanded output is selected as the target of the output from the engine. Therefore, when the demanded output is larger than the second input value which can cause the drive wheels to slip, the target output is calculated as the sum of the second input value and the modulated input value, and the target output thus calculated is selected as the target of the output from the engine. This makes it possible to quickly control the speed of the drive wheels to a target wheel speed, thereby making it possible to execute high-accuracy traction control.

On the other hand, when the demanded output is smaller than the target output, the demanded output is selected as the target of the output from the engine, so that it is possible to prevent the drive wheels from slipping. In this case, since the first input value is calculated with the feedback control algorithm, the first input value sometimes takes a negative value. If the demanded output is suddenly increased from this state, e.g. by a sudden acceleration operation of the driver, causing the demanded output to exceed the target output, the target output is selected as the target of the output from the engine, but the first input value has a characteristic of low responsiveness since it is calculated with the feedback control algorithm. Therefore, when the first input value takes a negative value, the target output is suppressed to be smaller than required to make the output generated by the engine smaller than required. This can degrade the acceleration response of the vehicle, resulting in degraded drivability.

According to the preferred embodiment, however, the target output is calculated as the sum of a smaller one of the second input value and the demanded output and the modulated input value, and hence when the demanded output is suddenly increased to largely exceed the second input value, the target output is calculated as the sum of the second input value which is capable of preventing the drive wheels from slipping and the modulated input value, whereby the target of the output from the engine can be calculated as a value which is repeatedly inverted with respect to the second input value. This makes it possible to hold the output generated by the engine at a value close to the upper limit value thereof which is capable of preventing the drive wheels from slipping, while preventing the target output from being made smaller than required. This makes it possible to obtain excellent acceleration response of the vehicle, while executing high-accuracy traction control.

To attain the above object, in a second aspect of the present invention, there is provided a method of controlling a controlled variable of a controlled object by a control input, comprising a controlled variable-detecting step of detecting the controlled variable, a target controlled variable-setting step of setting a target controlled variable serving as a target to which the controlled variable is controlled, a first input value-calculating step of calculating a first input value for performing feedback control of the controlled variable such that the controlled variable is caused to converge to the target controlled variable, with a predetermined feedback control algorithm, a modulated input value-calculating step of calculating a modulated input value by modulating the first input value with a predetermined modulation algorithm such that the modulated input value has a higher frequency as an absolute value of the first input value is smaller, an operating state parameter-detecting step of detecting an operating state parameter indicative of an operating state of the controlled object, except for the controlled variable, an error parameter-calculating step of calculating an error parameter indicative of an error of the control input with respect to an estimated value of the control input at which the controlled variable is estimated to become equal to the target controlled variable, a modification value-calculating step of calculating a plurality of modification values respectively associated with a plurality of regions formed by dividing a region within which the operating state parameter is variable, with a predetermined control algorithm, such that the error parameter becomes equal to a predetermined target value, a model-modifying step of modifying a correlation model representative of a relationship between a second input value for feedforward-controlling the controlled variable and the operating state parameter, using the plurality of modification values, a second input value-calculating step of calculating the second input value using the modified correlation model and the operating state parameter, and a control input-calculating step of calculating the control input based on a sum of the second input value and the modulated input value such that the control input performs a periodic fluctuating behavior.

With the configuration of the method according to the second aspect of the present invention, it is possible to obtain the same advantageous effects as provided by the first aspect of the present invention.

Preferably, the model-modifying step includes calculating a plurality of products by multiplying a difference between the error parameter and the predetermined target value, by values of a respective plurality of predetermined functions, and calculating the plurality of modification values according to the plurality of products, respectively, the plurality of regions having adjacent regions overlapping each other, and the plurality of predetermined functions are associated with the plurality of regions, respectively, and are set to values other than 0 only in the associated regions and to 0 in regions other than the associated regions, such that in regions overlapping each other, an absolute value of a total sum of values of the respective functions associated with the overlapping regions becomes equal to an absolute value of a maximum value of the functions.

Preferably, the error parameter-calculating step includes a setting step of setting the first input value to the error parameter, and setting the predetermined target value to 0.

More preferably, the controlled variable is an output from an exhaust gas concentration sensor for detecting a concentration of a predetermined component of exhaust gases in an exhaust passage of an internal combustion engine at a location downstream of a catalytic device, the target controlled variable being a target output at which an exhaust emission reduction rate of the catalytic device is estimated to be placed in a predetermined state, the operating state parameter being an operating state parameter indicative of an operating state of the engine, and the control input-calculating step includes calculating, as the control input, a target air-fuel ratio which serves, in an air-fuel ratio control of a mixture supplied to the engine, as a target to which the air-fuel ratio of the mixture is controlled.

Preferably, the error parameter-calculating step comprises an estimated value-calculating step of calculating the estimated value of the control input, and an error parameter-setting step of setting a difference between the estimated value and the second input value to the error parameter.

More preferably, the controlled variable is a speed of drive wheels of a vehicle using the engine as a drive source, the target controlled variable being a target speed for making an amount of slippage of the drive wheels with respect to non-drive wheels of the vehicle, equal to a predetermined amount, the operating state parameter being an operating state parameter indicative of an operating state of the engine, and the control input-calculating step includes calculating, as the control input, a target output which serves, in output control of an output from the engine, as a target to which the output from the engine is controlled.

Further preferably, the method further comprises a demanded output-calculating step of calculating the output from the engine demanded by a driver of the vehicle, as a demanded output, and a selection step of selecting a smaller one of the demanded output and the target output as the target of the output from the engine in the output control.

Even more preferably, the control input-calculating step includes calculating the target output as a sum of the second input value and the modulated input value when the second input value is smaller than the demanded output, and calculating the target output as a sum of the demanded output and the modulated input value when the second input value is not smaller than the demanded output.

With the configurations of these preferred embodiments, it is possible to obtain the same advantageous effects as provided by the respective corresponding preferred embodiments of the first aspect of the present invention.

To attain the above object, in a third aspect of the present invention, there is provided a control unit including a control program for causing a computer to execute a method of controlling a controlled variable of a controlled object by a control input, wherein the method comprises a controlled variable-detecting step of detecting the controlled variable, a target controlled variable-setting step of setting a target controlled variable serving as a target to which the controlled variable is controlled, a first input value-calculating step of calculating a first input value for performing feedback control of the controlled variable such that the controlled variable is caused to converge to the target controlled variable, with a predetermined feedback control algorithm, a modulated input value-calculating step of calculating a modulated input value by modulating the first input value with a predetermined modulation algorithm such that the modulated input value has a higher frequency as an absolute value of the first input value is smaller, an operating state parameter-detecting step of detecting an operating state parameter indicative of an operating state of the controlled object, except for the controlled variable, an error parameter-calculating step of calculating an error parameter indicative of an error of the control input with respect to an estimated value of the control input at which the controlled variable is estimated to become equal to the target controlled variable, a modification value-calculating step of calculating a plurality of modification values respectively associated with a plurality of regions formed by dividing a region within which the operating state parameter is variable, with a predetermined control algorithm, such that the error parameter becomes equal to a predetermined target value, a model-modifying step of modifying a correlation model representative of a relationship between a second input value for feedforward-controlling the controlled variable and the operating state parameter, using the plurality of modification values, a second input value-calculating step of calculating the second input value using the modified correlation model and the operating state parameter, and a control input-calculating step of calculating the control input based on a sum of the second input value and the modulated input value such that the control input performs a periodic fluctuating behavior.

With the configuration of the control unit according to the third aspect of the present invention, it is possible to obtain the same advantageous effects as provided by the first aspect of the present invention.

Preferably, the model-modifying step includes calculating a plurality of products by multiplying a difference between the error parameter and the predetermined target value, by values of a respective plurality of predetermined functions, and calculating the plurality of modification values according to the plurality of products, respectively, the plurality of regions having adjacent regions overlapping each other, and the plurality of predetermined functions are associated with the plurality of regions, respectively, and are set to values other than 0 only in the associated regions and to 0 in regions other than the associated regions, such that in regions overlapping each other, an absolute value of a total sum of values of the respective functions associated with the overlapping regions becomes equal to an absolute value of a maximum value of the functions.

Preferably, the error parameter-calculating step includes a setting step of setting the first input value to the error parameter, and setting the predetermined target value to 0.

More preferably, the controlled variable is an output from an exhaust gas concentration sensor for detecting a concentration of a predetermined component of exhaust gases in an exhaust passage of an internal combustion engine at a location downstream of a catalytic device, the target controlled variable being a target output at which an exhaust emission reduction rate of the catalytic device is estimated to be placed in a predetermined state, the operating state parameter being an operating state parameter indicative of an operating state of the engine, and the control input-calculating step includes calculating, as the control input, a target air-fuel ratio which serves, in an air-fuel ratio control of a mixture supplied to the engine, as a target to which the air-fuel ratio of the mixture is controlled.

Preferably the error parameter-calculating step comprises an estimated value-calculating step of calculating the estimated value of the control input, and an error parameter-setting step of setting a difference between the estimated value and the second input value to the error parameter.

More preferably, the controlled variable is a speed of drive wheels of a vehicle using the engine as a drive source, the target controlled variable being a target speed for making an amount of slippage of the drive wheels with respect to non-drive wheels of the vehicle, equal to a predetermined amount, the operating state parameter being an operating state parameter indicative of an operating state of the engine, and the control input-calculating step includes calculating, as the control input, a target output which serves, in output control of an output from the engine, as a target to which the output from the engine is controlled.

Further preferably, the method further comprises a demanded output-calculating step of calculating the output from the engine demanded by a driver of the vehicle, as a demanded output, and a selection step of selecting a smaller one of the demanded output and the target output as the target of the output from the engine in the output control.

Even more preferably, the control input-calculating step includes calculating the target output as a sum of the second input value and the modulated input value when the second input value is smaller than the demanded output, and calculating the target output as a sum of the demanded output and the modulated input value when the second input value is not smaller than the demanded output.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIGS. 2A and 2B are diagrams showing an example of results of measurement of reduction rates of HC and NOx of first catalytic devices in respective degraded and undegraded conditions and outputs VO2 from an O2 sensor, as plotted against an actual air-fuel ratio KACT;

FIG. 3 is a schematic functional block diagram of the control apparatus according to the first embodiment;

FIG. 9A is a diagram showing an example of results of calculation of a weight function $W_i$;

FIG. 9B is a diagram showing an example of results of calculation of a product $\theta_i \cdot W_i$;

FIG. 9C is a diagram showing an example of results of calculation of a product sum Kff';

FIG. 9D is a diagram showing an example of results of calculation of a model modification coefficient Kff;

FIG. 9E is a diagram showing an example of results of calculation of an adaptive reference air-fuel ratio KCMDADP;

FIG. 21 is a diagram showing an example of a map for use in calculating a weight function $WNE_{ij}$;

FIG. 22A is a diagram showing an example of results of calculation of the weight function $WNE_{ij}$;

FIG. 22B is a diagram showing an example of results of calculation of a product $Dktrqff_{ij}$;

FIG. 22C is a diagram showing an example of results of calculation of a local correction value $DKTRQFF_j$;

FIG. 22D is a diagram showing an example of results of calculation of a model modification coefficient KTRQFF;

FIG. 22E is a diagram showing an example of results of calculation of an adaptive limit torque TRQFF_LMT;

FIGS. 23A to 24D are a timing diagram showing an example of results of a simulation of traction control, which is performed by the control apparatus according to the second embodiment; and FIGS. 24A to 24C are a timing diagram showing an example of results of a simulation of the traction control, which is performed when the model modification coefficient KTRQFF=1 is held, for comparison.

DETAILED DESCRIPTION OF PREFERRED EMBODIMENTS

Figure 1:
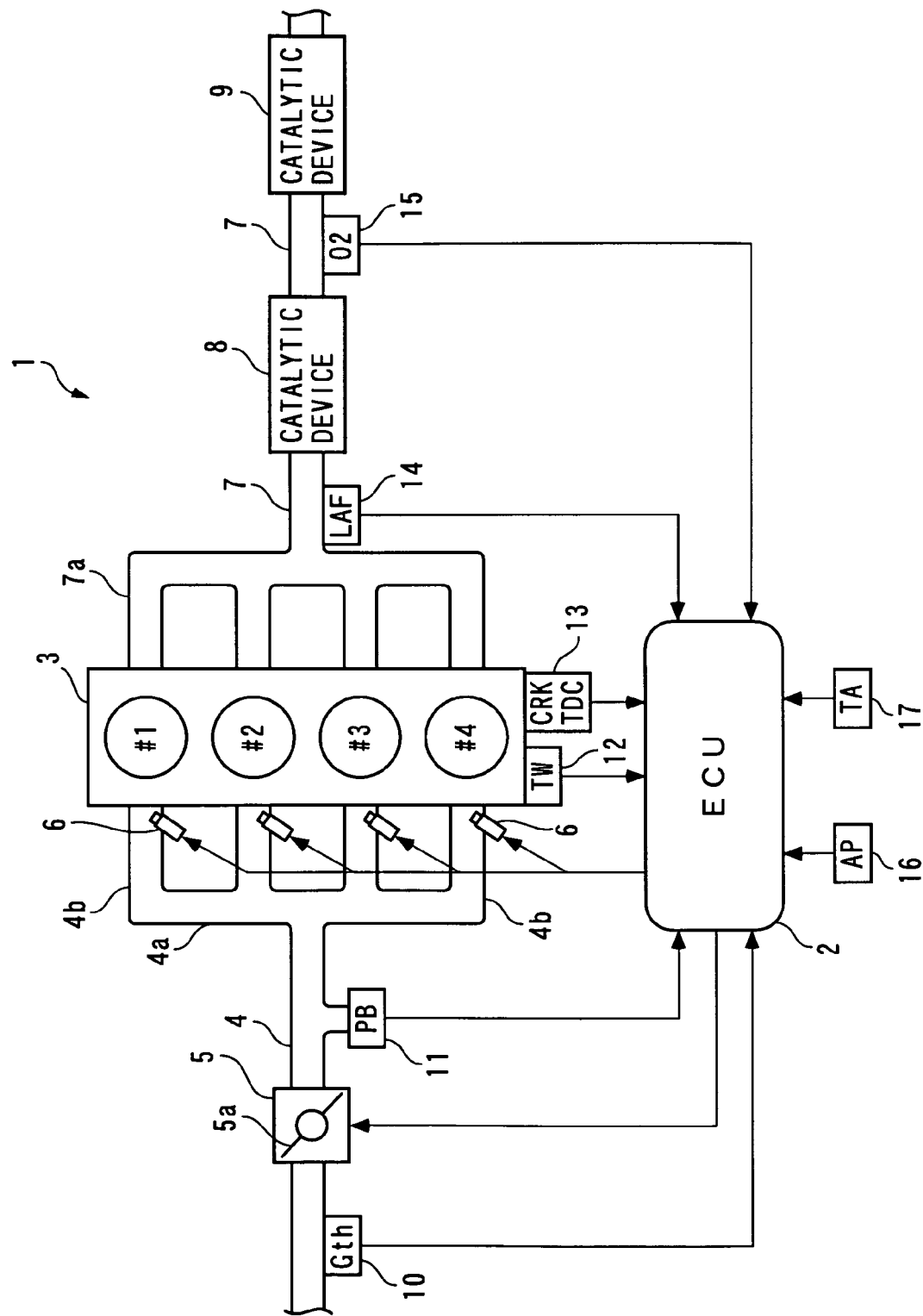
FIG. 1 is a schematic diagram of a control apparatus according to a first embodiment of the present invention, and an internal combustion engine to which is applied the control apparatus.

Hereafter, a control apparatus according to a first embodiment of the present invention will be described with reference to the drawings. The control apparatus according to the present embodiment is for controlling the air-fuel ratio of a mixture to be supplied to an internal combustion engine. FIG. 1 is a schematic diagram of the control apparatus 1, and the internal combustion engine (hereinafter referred to as "the engine") 3 to which is applied the control apparatus. Referring to FIG. 1, the control apparatus 1 includes an ECU 2. As described hereinafter, the ECU 2 controls the air-fuel ratio of a mixture to be supplied to cylinders of the engine 3, depending on operating conditions of the engine 3.

The engine 3 is an inline four-cylinder gasoline engine installed on a vehicle (not shown) with a stepped automatic transmission (not shown) mounted thereon, and includes first to fourth cylinders #1 to #4. An air flow sensor 10, a throttle valve mechanism 5, and an intake pressure sensor 11 are arranged in an intake passage 4 of the engine 3 from upstream to downstream in the mentioned order. It should be noted that in the present embodiment, the air flow sensor 10 and the intake pressure sensor 11 correspond to operating state parameter-detecting means.

The air flow sensor 10 is formed by a hot-wire air flow meter, and detects the flow rate of air flowing through the intake passage 4 to deliver a signal indicative of the detected air flow rate to the ECU 2. The ECU 2 calculates an air flow rate Gth (in units of g/sec) based on the signal from the air flow sensor 10.

Further, the throttle valve mechanism 5 includes a throttle valve 5a, and a TH actuator (not shown) that actuates the throttle valve 5a to open and close the same. The TH actuator is a combination of a motor (not shown) connected to the ECU 2, and a gear mechanism (not shown), and is controlled by a control signal input from the ECU 2, to thereby change the degree of opening of the throttle valve 5a. The throttle valve 5a is pivotally disposed in an intermediate portion of the intake passage 4 such that the degree of opening thereof is changed by the pivotal motion thereof to thereby change the air flow rate Gth.

Furthermore, the intake pressure sensor 11 is implemented e.g. by a semiconductor pressure sensor, and detects an absolute pressure (hereinafter referred to as "the intake pressure") PB within the intake passage 4 to deliver a signal indicative of the detected intake pressure PB to the ECU 2.

Further, the intake passage 4 is connected to the four cylinders #1 to #4 via four branch portions 4b of an intake manifold 4a, respectively. Each branch portion 4b has a fuel injection valve 6 inserted therein at a location upstream of an intake port, not shown, of a connected one of the cylinders. During operation of the engine 3, each fuel injection valve 6 is controlled in respect of a fuel injection amount Tout, which is a valve-opening time period of the same, and fuel injection timing thereof by a control signal from the ECU 2.

Mounted in the body of the engine 3 is an engine coolant temperature sensor 12 implemented e.g. by a thermistor. The engine coolant temperature sensor 12 detects an engine coolant temperature TW, which is the temperature of an engine coolant circulating through a cylinder block of the engine 3, and delivers a signal indicative of the detected engine coolant temperature TW to the ECU 2.

Further, the engine 3 has a crankshaft (not shown) provided with a crank angle sensor 13. The crank angle sensor 13 delivers a CRK signal and a TDC signal, which are both pulse signals, to the ECU 2 in accordance with rotation of the crankshaft.

The CRK signal is delivered whenever the crankshaft rotates through a predetermined angle (e.g. 30°). The ECU 2 calculates the rotational speed NE of the engine 3 (hereinafter referred to as "the engine speed NE") based on the CRK signal. The TDC signal indicates that each piston (not shown) in an associated one of cylinders is in a predetermined crank angle position slightly before the TDC position at the start of the intake stroke, and is delivered whenever the crankshaft rotates through a predetermined crank angle. It should be noted that in the present embodiment, the crank angle sensor 13 corresponds to the operating state parameter-detecting means.

On the other hand, a first catalytic device 8 and a second catalytic device 9 are provided in an exhaust passage 7 at respective locations downstream of an exhaust manifold 7a thereof with a predetermined distance therebetween from upstream to downstream in the mentioned order. Each of the catalytic devices 8 and 9 is a combination of a NOx catalyst and a three-way catalyst, and the NOx catalyst is comprised of a honeycomb structure base, an iridium catalyst (sintered body of silicon carbide whisker powder carrying iridium and silica) coated on the surface of the honeycomb structure base, and Perovskite double oxide (sintered body of $LaCoO_3$ powder and silica) further coated on the iridium catalyst.

Further, the catalytic devices 8 and 9 eliminate NOx from exhaust gases emitted during a lean burn operation of the engine 3 by oxidation-reduction catalytic actions of the NOx catalyst, and eliminate CO, HC, and NOx from exhaust gases emitted during other operations of the engine 3 than the lean burn operation by oxidation-reduction catalytic actions of the three-way catalyst. It should be noted that each of the catalytic devices 8 and 9 is not limited to the combination of a NOx catalyst and a three-way catalyst, but any suitable catalysts may be used as the catalytic devices 8 and 9 insofar as they are capable of eliminating CO, HC, and NOx from exhaust gases. For example, the catalytic devices 8 and 9 each may be formed by a non-metal catalyst, such as a Perovskite catalyst, and/or a metal catalyst, such as a three-way catalyst.

An oxygen concentration sensor (hereinafter referred to as "the O2 sensor") 15 is inserted into the exhaust passage 7 between the first and second catalytic devices 8 and 9. The O2 sensor 15 is comprised of a zirconia layer and platinum electrodes, and detects the concentration of oxygen contained in exhaust gases downstream of the first catalytic device 8, to deliver a signal indicative of the detected oxygen concentration to the ECU 2. An output VO2 from the O2 sensor 15 (hereinafter referred to as "the sensor output VO2") assumes a high-level voltage value (e.g. 0.8 V) when an air-fuel mixture having a richer air-fuel ratio than the stoichiometric air-fuel ratio has been burned, whereas it assumes a low-level voltage value (e.g. 0.2 V) when an air-fuel mixture having a leaner air-fuel ratio than the stoichiometric air-fuel ratio has been burned. Further, when the air-fuel ratio of the mixture is close to the stoichiometric air-fuel ratio, the sensor output VO2 assumes a predetermined target output VO2_TRGT (e.g. 0.6 V) between the high-level and low-level voltage values (see FIGS. 2A and 2B).

It should be noted that in the present embodiment, the O2 sensor 15 corresponds to controlled variable-detecting means and an exhaust gas concentration sensor, the sensor output VO2 to a controlled variable and an output from the exhaust gas concentration sensor, and the target output VO2_TRGT to a target controlled variable.

Further, a LAF sensor 14 is inserted into the exhaust passage 7 in the vicinity of a collecting section of the exhaust manifold 7a at a location upstream of the first catalytic device 8. The LAF sensor 14 is comprised of a zirconia layer and platinum electrodes, and linearly detects the concentration of oxygen in exhaust gases flowing through the exhaust passage 7, in a broad air-fuel ratio range from a rich region richer than the stoichiometric air-fuel ratio to a very lean region, to deliver a signal indicative of the sensed oxygen concentration to the ECU 2. The ECU 2 calculates an actual air-fuel ratio KACT indicative of the air-fuel ratio in the exhaust gases, based on the value of the signal from the LAF sensor 14. It should be noted that the actual air-fuel ratio KACT is specifically calculated as an equivalent ratio.

Next, the relationship between the exhaust emission reduction rate of the first catalytic device 8 (catalytic device) and the sensor output VO2 will be described with reference to FIGS. 2A and 2B. FIGS. 2A and 2B illustrate an example of results of measurement of reduction rates of HC and NOx of the first catalytic device 8 and sensor outputs VO2, each measured when the actual air-fuel ratio KACT, i.e. the air-fuel ratio of the mixture supplied to the engine 3 changes across the stoichiometric air-fuel ratio, in respective states in which the emission reduction capability of the first catalytic device 8 is degraded due to long-term use and in which the emission reduction capability is not yet degraded. In FIGS. 2A and 2B, broken lines each represent results of measurement obtained when the first catalytic device 8 is in the undegraded state, while solid lines each represent results of measurement obtained when the first catalytic device 8 is in the degraded state. Further, In FIGS. 2A and 2B, as the actual air-fuel ratio KACT is larger, the air-fuel ratio of the mixture is richer.

As shown in FIGS. 2A and 2B, when the first catalytic device 8 is degraded, its emission reduction capability is lowered compared with that in the undegraded state, and hence the sensor output VO2 crosses the target output VO2_TRGT when the actual air-fuel ratio KACT assumes a value KACT1 on a leaner side. The first catalytic device 8 has a characteristic of eliminating HC and NOx most efficiently when the sensor output VO2 is equal to the target output VO2_TRGT, irrespective of whether the first catalytic device 8 is degraded or not degraded. Accordingly, it is understood that by controlling the air-fuel ratio of the mixture such that the sensor output VO2 becomes equal to the target output VO2_TRGT, it is possible to achieve most efficient reduction of exhaust emissions by the first catalytic device 8. For this reason, in an air-fuel ratio control process described in detail hereinafter, a target air-fuel ratio KCMD is calculated such that the sensor output VO2 converges to the target output VO2_TRGT.

Further, the ECU 2 has an accelerator pedal opening sensor 16, an intake air temperature sensor 17, and so forth. The accelerator pedal opening sensor 16 detects a stepped-on amount AP of an accelerator pedal, not shown, of the vehicle (hereinafter referred to as "the accelerator pedal opening AP") and delivers a signal indicative of the detected accelerator pedal opening AP to the ECU 2. Further, the intake air temperature sensor 17 detects intake air temperature TA, and delivers a signal indicative of the detected intake air temperature TA to the ECU 2. It should be noted that in the present embodiment, the intake pressure sensor 11 corresponds to the operating state parameter-detecting means.

The ECU 2 is implemented by a microcomputer comprised of a CPU, a RAM, a ROM, and an I/O interface, none of which is shown, for example. The ECU 2 determines operating conditions of the engine 3 based on the signals from the aforementioned sensors 10 to 17, and carries out various control processes, as described hereinafter. More specifically, as described hereinafter, the ECU 2 calculates the target air-fuel ratio KCMD depending on operating conditions of the engine 3, and further calculates the fuel injection amount Tout and fuel injection timing of each fuel injection valve 6 on a cylinder-by-cylinder basis based on the target air-fuel ratio KCMD. Then, the ECU 2 drives the fuel injection valve 6 by a control signal generated based on the calculated fuel injection amount Tout and fuel injection timing, to thereby control the air-fuel ratio of the mixture.

It should be noted that in the present embodiment, the ECU 2 corresponds to the controlled variable-detecting means, target controlled variable-setting means, first input value-calculating means, modulated input value-calculating means, the operating state parameter-detecting means, error parameter-calculating means, modification value-calculating means, model-modifying means, second input value-calculating means, control input-calculating means, setting means, estimated value-calculating means, error parameter-setting means, and selection means.

Next, the control apparatus 1 according to the present embodiment will be described with reference to FIG. 3. As shown in FIG. 3, the control apparatus 1 is comprised of an ST controller 30, a basic fuel injection amount-calculating section 31, a total correction coefficient-calculating section 32, a multiplier 33, and an air-fuel ratio controller 40. These component elements 30 to 33 and 40 are all implemented by the ECU 2.

First, as described hereinafter, the air-fuel ratio controller 40 calculates the target air-fuel ratio KCMD based on the air flow rate Gth, the intake pressure PB, the engine speed NE, the sensor output VO2, and the actual air-fuel ratio KACT. The target air-fuel ratio KCMD is calculated as an equivalent ratio. It should be noted that in the present embodiment, the air-fuel ratio controller 40 corresponds to the control input-calculating means and the setting means, and the target air-fuel ratio KCMD corresponds to a control input.

Further, the ST controller 30 is for calculating an air-fuel ratio correction coefficient KAF, and includes a PID controller and an adaptive controller, neither of which is shown. The PID controller calculates the air-fuel ratio correction coefficient KAF by a known PID control method such that the actual air-fuel ratio KACT converges to the target air-fuel ratio KCMD. The adaptive controller calculates the air-fuel ratio correction coefficient KAF by an adaptive control method that has already been proposed by the present assignee e.g. in Japanese Laid-Open Patent Publication (Kokai) No. 2000-234550, such that the actual air-fuel ratio KACT converges to the target air-fuel ratio KCMD. One of values calculated by the two control methods is selected as the air-fuel ratio correction coefficient KAF depending on operating conditions of the engine 3.

Furthermore, the basic fuel injection amount-calculating section 31 calculates a basic fuel injection amount Tibs by searching a map, not shown, according to the engine speed NE and the intake pressure PB.

On the other hand, the total correction coefficient-calculating section 32 calculates various correction coefficients by searching respective associated maps, not shown, according to parameters, such as the engine coolant temperature TW and the intake air temperature TA, indicative of the operating conditions of the engine, and calculates a total correction coefficient KTOTAL by multiplying the thus calculated correction coefficients by each other.

The multiplier 33 calculates the fuel injection amount Tout by the following equation (1):

$$Tout(k)=Tibs(k)\cdot KAF(k)\cdot KTOTAL(k) \quad (1)$$

It should be noted that in the above equation (1), data with a symbol (k) indicates that it is discrete data calculated or sampled at a predetermined control period $\Delta T$ (the repetition period of generation of the TDC signal). The symbol k indicates a control time point at which respective discrete data is calculated. For example, the symbol k indicates that discrete data therewith is a value calculated in the current control timing, and a symbol k−1 indicates that discrete data therewith is a value calculated in the immediately preceding control timing. This also applies to discrete data referred to hereinafter. Further, in the following description, the symbol (k) provided for the discrete data is omitted as deemed appropriate.

Figure 4:
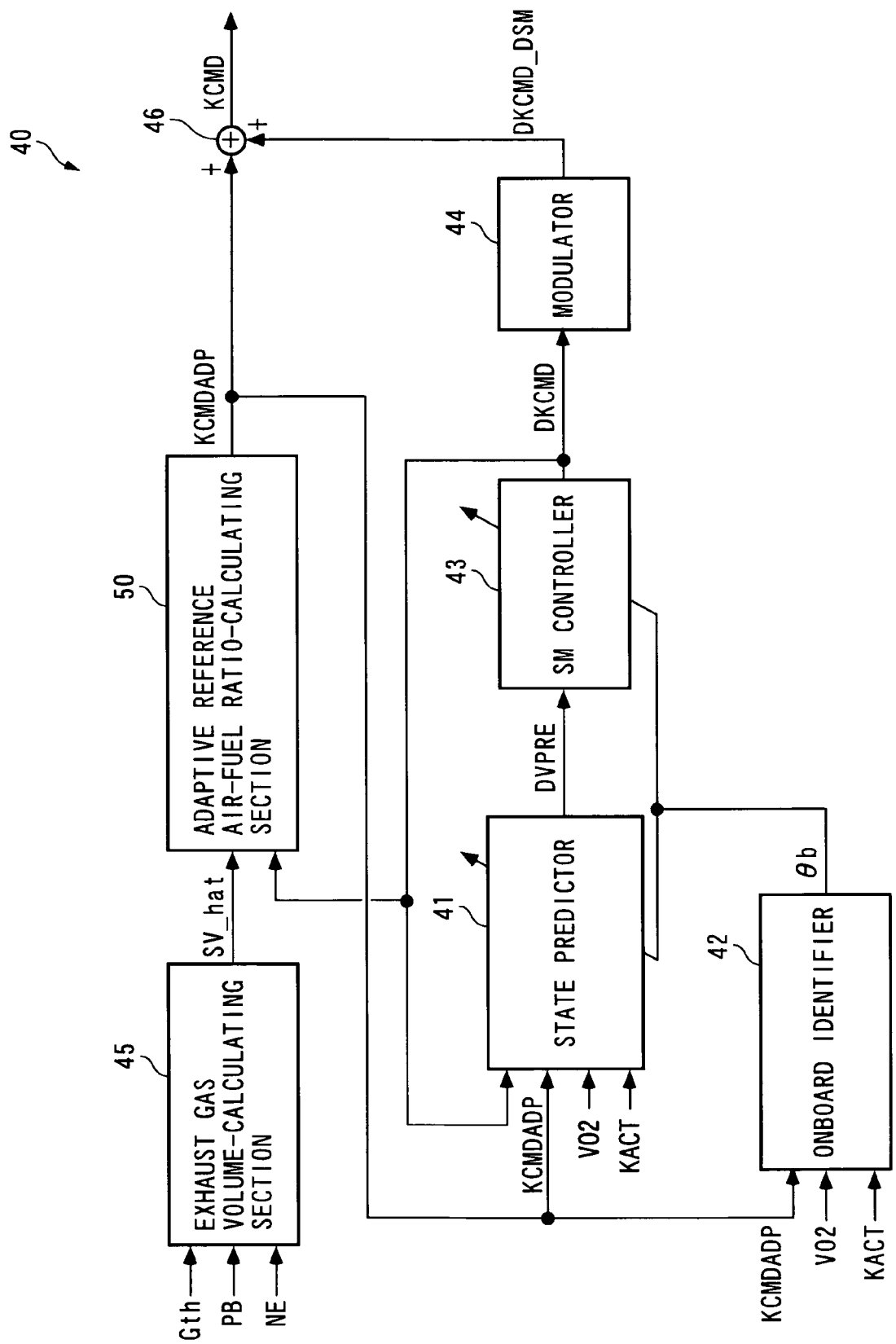
FIG. 4 is a schematic functional block diagram of an air-fuel ratio controller.

Next, the aforementioned air-fuel ratio controller 40 will be described with reference to FIG. 4. As shown in FIG. 4, the air-fuel ratio controller 40 includes a state predictor 41, an onboard identifier 42, a sliding mode controller 43, a modulator 44, an exhaust gas volume-calculating section 45, an adder 46, and an adaptive reference air-fuel ratio-calculating section 50.

In the air-fuel ratio controller 40, the state predictor 41 calculates a predicted value DVPRE of the output difference DVO2 with a prediction algorithm, described hereinafter, and the onboard identifier 42 calculates a model parameter vector θb with a sequential identification algorithm, described hereinafter.

Further, the sliding mode controller 43 calculates an air-fuel ratio correction value DKCMD with an adaptive sliding mode control algorithm, as described hereinafter, and the modulator 44 calculates a modulated value DKCMD_DSM of the air-fuel ratio correction value DKCMD with a modulation algorithm to which is applied a $\Delta\Sigma$ modulation algorithm, as described hereinafter.

Furthermore, the exhaust gas volume-calculating section 45 calculates an exhaust gas volume SV_hat by a control method described hereinafter, and the adaptive reference air-fuel ratio-calculating section 50 calculates an adaptive reference air-fuel ratio KCMDADP by a control method described hereinafter. Then, finally, the adder 46 calculates the target air-fuel ratio KCMD by the following equation (2):

$$KCMD(k)=DKCMD\_DSM(k)+KCMDADP(k-1) \quad (2)$$

Next, a description will be given of the above-mentioned state predictor 41. The state predictor 41 is for calculating the predicted value DVPRE of the output difference DVO2 with the prediction algorithm, described hereinbelow. First, the output difference DVO2 is defined as expressed by the following equation (3):

$$DVO2(k)=VO2(k)-VO2\_TRGT \quad (3)$$

Next, a controlled object model of a system to which is input the air-fuel ratio correction value DKCMD described hereinafter, and from which is output the output difference DVO2 is defined as expressed by the following equation (4):

$$DVO2(k)=a1\cdot DVO2(k-1)+a2\cdot DVO2(k-2)+\\b1\cdot DKCMD(k-d) \quad (4)$$

In the above equation (4), a1, a2, and b1 represent model parameters. Further, in the above equation (4), d represents dead time from supply of a mixture having the target air-fuel ratio KCMD to the intake system by the fuel injection valve 6 to reflection of the supply of the mixture on the sensor output VO2, and is defined by the following equation (5):

$$d=d1+d2 \quad (5)$$

wherein d1 represents the dead time of the engine system occurring between injection by the fuel injection valve 6 and detection by the LAF sensor 14, and d2 represents the dead time of the exhaust system occurring between detection by the LAF sensor 14 and detection by the O2 sensor 15.

Further, the predicted value DVPRE is a value predicted as an output difference DVO2(k+d) which will be obtained when dead time d has elapsed after the mixture having the target air-fuel ratio KCMD being supplied to the intake system. From the equation (4), an equation (6) for calculating the predicted value DVPRE can be obtained as follows:

$$DVPRE(k) \fallingdotseq DVO2(k+d) = \qquad (6)$$
$$a1 \cdot DVO2(k+d-1) + a2 \cdot DVO2(k+d-2) + b1 \cdot DKCMD(k)$$

This equation (6) requires calculation of DVO2(k+d−1) and DVO2(k+d−2) each corresponding to a future value of an output difference DVO2(k), and hence it is difficult to actually program the equation (6). For this reason, matrices A and B are defined by the following equations (7) and (8) by using identified values a1(k), a2(k), and b1(k) of model parameters, which are calculated by the onboard identifier 42, as described hereinafter, and if the above equation (6) is changed by repeatedly using a recurrence formula thereof, the following equation (9) can be obtained:

$$A = \begin{bmatrix} a1(k) & a2(k) \\ 1 & 0 \end{bmatrix} \qquad (7)$$

$$B = \begin{bmatrix} b1(k) \\ 0 \end{bmatrix} \qquad (8)$$

$$DVPRE(k) = \qquad (9)$$
$$\alpha1(k) \cdot DVO2(k) + \alpha2(k) \cdot DVO2(k-1) + \sum_{i=1}^{d} \beta i(k) \cdot DKCMD(k-i)$$

wherein α1(k): first-row first-column element of $A^d$
α2(k): first-row second-column element of $A^d$
βi(k): first-row element of $A^{i-1}B$ Next, when an accrual air-fuel ratio difference DKACT is defined by the following equation (10), it can be regarded that DKACT(k)=DKCMD(k−d1) holds, and therefore by applying this relationship between DKACT(k) and DKCMD(k−d1) to the aforementioned equation (9), the following equation (11) can be obtained.

$$DKACT(k) = KACT(k) - KCMDADP(k-1) \qquad (10)$$

$$DVPRE(k) = \alpha1(k) \cdot DVO2(k) + \alpha2(k) \cdot DVO2(k-1) + \qquad (11)$$
$$\sum_{i=1}^{d1-1} \beta i(k) \cdot DKCMD(k-i) + \sum_{j=0}^{d2} \beta j + d1(k) \cdot DKACT(k-j)$$

wherein βj: first-row element of $A^{j-1}B$

In the above equation (10), KCMDADP represents the adaptive reference air-fuel ratio, and is calculated by the adaptive reference air-fuel ratio-calculating section 50, as described hereinafter. The state predictor 41 according to the present embodiment, calculates the predicted value DVPRE using the equation (11) derived as above.

Next, a description will be given of the onboard identifier 42 mentioned above. The onboard identifier 42 calculates the vector θb of the model parameters a1, a2, and b1 with the sequential identification algorithm expressed by the following equations (12) to (18):

$$\theta b(k) = \theta b(k-1) + KQ(k) \cdot Eid(k) \qquad (12)$$

$$\theta b(k)^T = [\, a1(k) \quad a2(k) \quad b1(k) \,] \qquad (13)$$

$$Eid(k) = DVO2(k) - DVO2\_HAT(k) \qquad (14)$$

$$DVO2\_HAT(k) = \theta b(k-1)^T \zeta(k) \qquad (15)$$

$$\zeta(k)^T = [\, DVO2(k-1) \quad DVO2(k-2) \quad DKACT(k-d2) \,] \qquad (16)$$

$$KQ(k) = \frac{P(k-1)\zeta(k)}{1 + \zeta(k)^T P(k-1)\zeta(k)} \qquad (17)$$

$$P(k) = \frac{1}{\lambda_1}\left(I - \frac{\lambda_2 P(k-1)\zeta(k)\zeta(k)^T}{\lambda_1 + \lambda_2 \zeta(k)^T P(k-1)\zeta(k)}\right)P(k-1) \qquad (18)$$

wherein l represents a unit matrix.

In the equation (12), the vector θb is a vector the transposed matrix of which is defined by the equation (13), and Eid in the equation (12) represents a follow-up error calculated by the equation (14). In the equation (14), DVO2_HAT represents an estimated value of the output difference DVO2, and is calculated by the equation (15). In the equation (15), ζ represents a vector the transposed matrix of which is defined by the equation (16).

Further, in the equation (12), KQ represents a vector of a gain coefficient calculated by the equation (17). P in the equation (17) represents a square matrix of order 3 defined by the equation (18). In the equation (18), I represents a unit matrix of order 3, and λ1 and λ2 represent weighting parameters set such that 0<λ1≦1 and 0<λ2≦1 hold, respectively.

Next, a description will be given of the above-mentioned sliding mode controller 43. The sliding mode controller 43 calculates the air-fuel ratio correction value DKCMD with an adaptive sliding mode control algorithm expressed by the following equations (19) to (23).

$$\sigma2(k) = DVPRE(k) + S2 \cdot DVPRE(k-1) \qquad (19)$$

$$Urch2(k) = \frac{-Krch2}{b1(k)} \sigma2(k) \qquad (20)$$

$$Uadp2(k) = \frac{-Kadp2}{b1(k)} \sum_{i=0}^{k} \sigma2(i) \qquad (21)$$

$$Ueq2(k) = \qquad (22)$$
$$\frac{-1}{b1(k)} \{[a1(k) - 1 + S2] \cdot DVPRE(k) + [a2(k) - S2] \cdot DVPRE(k-1)\}$$

$$DKCMD(k) = Urch2(k) + Uadp2(k) + Ueq2(k) \qquad (23)$$

In the above equation (19), σ2 represents a switching function, and S2 represents a switching function-setting parameter set to a value which satisfies the relationship of −1<S2<0. In this case, the convergence rate of the predicted value DVPRE to 0 is designated by a value set as the switching function-setting parameter S2. Further, as shown in the above equation (23), the air-fuel ratio correction value DKCMD is calculated as the sum of a reaching law input Urch2, an adaptive law input Uadp2, and an equivalent control input Ueq2. The reaching law input Urch2 is calculated by the equation (20). In the equation (20), Krch2 represents a predetermined reaching law gain.

Further, the adaptive law input Uadp2 is calculated by the equation (21). In the equation (21), Kadp2 represents a predetermined adaptive law gain. Furthermore, the equivalent control input Ueq2 is calculated by the equation (22).

As described above, the sliding mode controller 43 calculates the air-fuel ratio correction value DKCMD as a value for causing the predicted value DVPRE to converge to 0, i.e. a value for causing the sensor output VO2 to converge to the target output VO2_TRGT with the sliding mode control algorithm expressed by the equations (19) to (23).

It should be noted that in the present embodiment, the sliding mode controller 43 corresponds to the first input value-calculating means and the error parameter-calculating means, the air-fuel ratio correction value DKCMD to a first input value, an error parameter, and the difference between the error parameter and a predetermined target value, and a value of 0 to the predetermined target value.

Next, a description will be given of the above-described modulator 44. As will be described hereinafter, the modulator 44 calculates the modulated value DKCMD_DSM. First, a small amplitude component value DKCMD_L is calculated by the following equations (24) to (26).

When $DKCMD(k) < -DKCMD\_L\_LMT$, $DKCMD\_L(k) = -DKCMD\_L\_LMT$ (24)

When $-DKCMD\_L\_LMT \leq DKCMD(k) \leq DKCMD\_L\_LMT$, $DKCMD\_L(k) = DKCMD(k)$ (25)

When $DKCMD\_L\_LMT < DKCMD(k)$, $DKCMD\_L(k) = DKCMD\_L\_LMT$ (26)

In the above equations (24) to (26), DKCMD_L_LMT represents a predetermined threshold value, and as shown in the equations (24) to (26), the small amplitude component value DKCMD_L is calculated by performing a limiting process on the amplitude of the air-fuel ratio correction value DKCMD using DKCMD_L_LMT as an upper limit value and −DKCMD_L_LMT as a lower limit value. In other words, the small amplitude component value DKCMD_L corresponds to the air-fuel ratio correction value DKCMD obtained when the air-fuel ratio correction value DKCMD undergoes small changes, and an absolute value thereof is within a range of the threshold value DKCMD_L_LMT.

Further, a large amplitude component value DKCMD_H is calculated by the following equations (27) to (29):

When $DKCMD(k) < -DKCMD\_L\_LMT$, $DKCMD\_H(k) = DKCMD(k) + DKCMD\_L\_LMT$ (27)

When $-DKCMD\_L\_LMT \leq DKCMD(k) \leq DKCMD\_L\_LMT$, $DKCMD\_H(k) = 0$ (28)

When $DKCMD\_L\_LMT < DKCMD(k)$, $DKCMD\_H(k) = DKCMD(k) - DKCMD\_L\_LMT$ (29)

As shown in the above equations (27) to (29), the large amplitude component value DKCMD_H is calculated as 0 when the absolute value of the air-fuel ratio correction value DKCMD does not exceed the threshold value DKCMD_L_LMT, whereas when the former exceeds the latter, the large amplitude component value DKCMD_H is calculated as a value corresponding to the excess amount. More specifically, when the quick responsiveness of the control is demanded due to large changes in the air-fuel ratio correction value DKCMD, the large amplitude component value DKCMD_H is calculated as a value that will cause the air-fuel ratio correction value DKCMD in such a state to be properly reflected on the target air-fuel ratio KCMD.

Further, a modulated component value DKCMD_L_DSM is calculated by modulating the small amplitude component value DKCMD_L with an algorithm to which is applied the $\Delta\Sigma$ modulation algorithm expressed by the following equations (30) to (33).

$\delta dsm(k) = DKCMD\_L(k) - DKCMD\_L\_DSM(k-1)$ (30)

$\sigma dsm(k) = \sigma dsm(k-1) + \delta dsm(k)$ (31)

When $\sigma dsm(k) < 0$, $DKCMD\_L\_DSM(k) = -DKCMD\_L\_AMP$ (32)

When $\sigma dsm(k) \geq 0$, $DKCMD\_L\_DSM(k) = DKCMD\_L\_AMP$ (33)

As shown in the above equation (30), the difference $\delta dsm$ is calculated as the difference between the small amplitude component value DKCMD_L and the immediately preceding value of the modulated component value DKCMD_L_DSM. Further, in the equation (31), $\sigma dsm$ represents the integral value of the difference $\delta dsm$. Further, in the equations (32) and (33), DKCMD_L_AMP represents a predetermined amplitude value. As is clear from the above equations (30) to (33), the modulated component value DKCMD_L_DSM is calculated as a value which is repeatedly inverted between a minimum value −DKCMD_L_AMP and a maximum value DKCMD_L_AMP with respect to 0.

Then, finally, as shown in the following equation (34), the modulated value DKCMD_DSM is calculated by adding the large amplitude component value DKCMD_H to the modulated component value DKCMD_L_DSM.

$DKCMD\_DSM(k) = DKCMD\_L\_DSM(k) + DKCMD\_H(k)$ (34)

It should be noted that in the present embodiment, the modulator 44 corresponds to the modulated input value-calculating means, and the modulated value DKCMD_DSM corresponds to a modulated input value.

On the other hand, the aforementioned exhaust gas volume-calculating section 45 calculates the exhaust gas volume SV_hat by the following equations (35) and (36).

$$Gcyl(k) = \frac{Gth(k)}{NE(k) \cdot SV\_PRA} - \frac{\{PB(k) - PB(k-1)\} \cdot Vb}{R \cdot TA(k)}$$ (35)

$$SV\_hat(k) = NE(k) \cdot Gcyl(k) \cdot SV\_PRA$$ (36)

In the above equation (35), Gcyl represents an intake air amount, Vb represents an intake pipe internal volume, and R represents a predetermined gas constant. SV_PRA in the equation (35) represents a conversion coefficient set according to the number of cylinders of the engine 3. In this case, the intake air amount Gcyl may be calculated using a method of searching a map according to the intake pressure PB and the fuel injection amount Tout in place of the equation (35). Further, the air flow rate Gth may be used as the exhaust gas volume SV_hat. It should be noted that in the present embodiment, the exhaust gas volume SV_hat corresponds to an operating state parameter and an operating state parameter.

Figure 5:
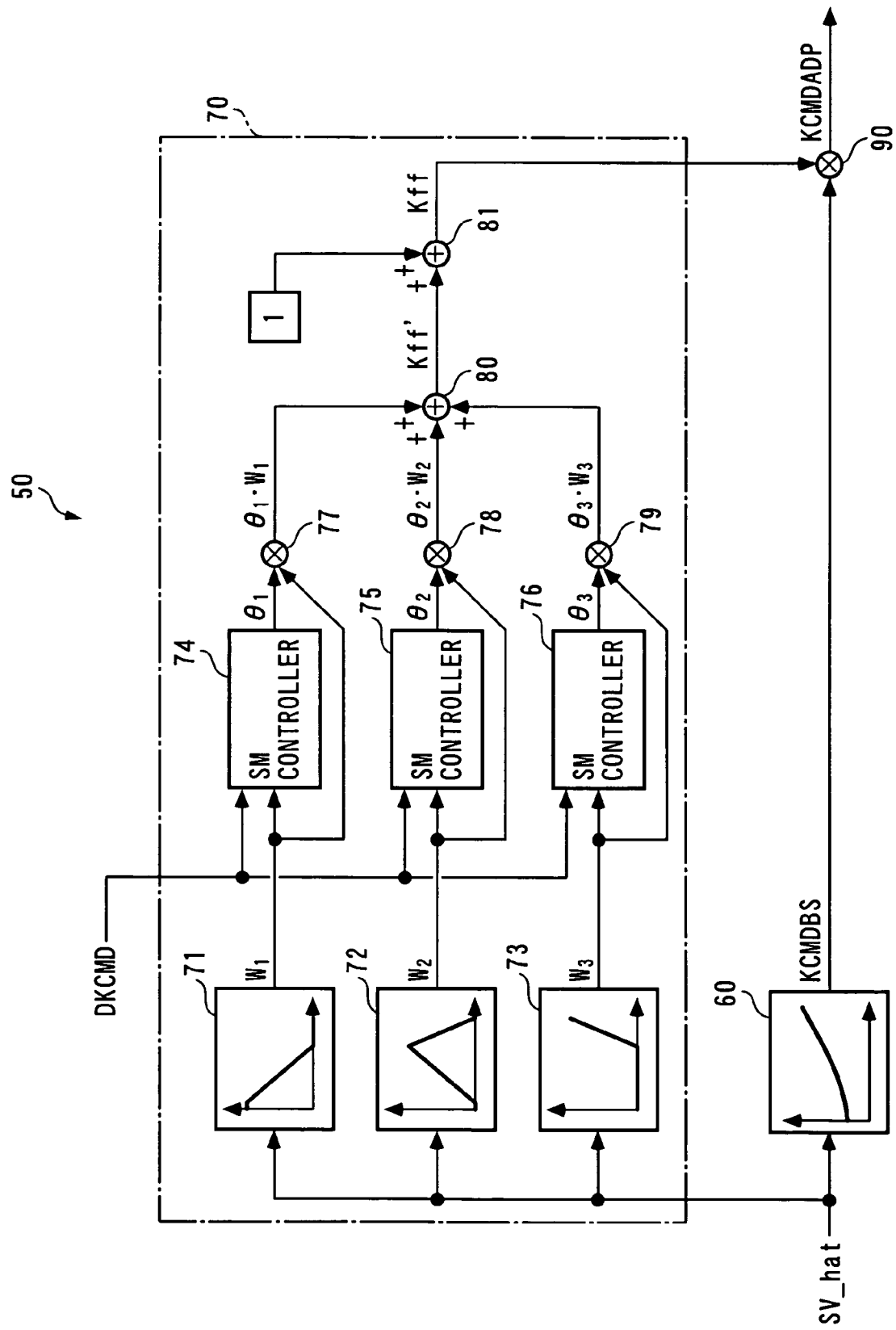
FIG. 5 is a schematic functional block diagram of an adaptive reference air-fuel ratio-calculating section.

Next, a description will be given of the above-described adaptive reference air-fuel ratio-calculating section 50. The adaptive reference air-fuel ratio-calculating section 50 is for calculating the adaptive reference air-fuel ratio KCMDADP by a method, described hereinafter, and includes a reference air-fuel ratio-calculating section 60, a model modifier 70, and a multiplier 90, as shown in FIG. 5. It should be noted that in the present embodiment, the adaptive reference air-fuel ratio-calculating section 50 corresponds to the model modifying means and the second input value-calculating means, and the adaptive reference air-fuel ratio KCMDADP corresponds to a second input value.

Figure 6:
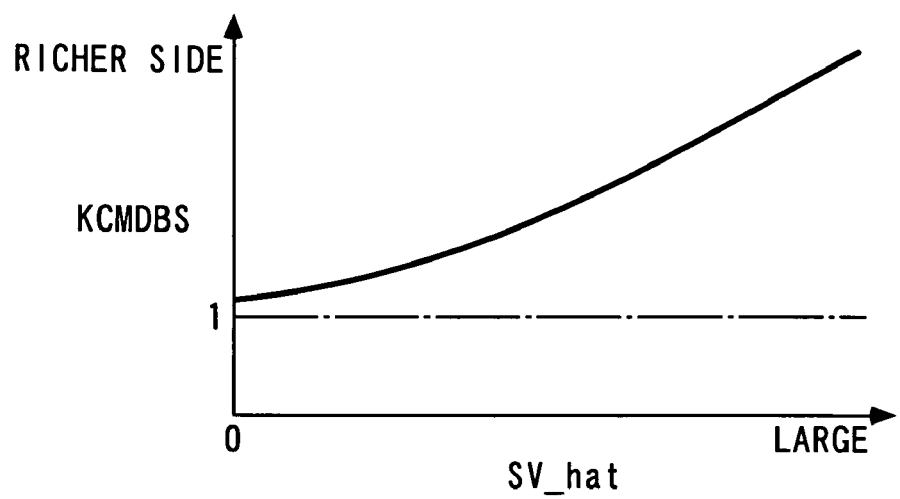
FIG. 6 is a diagram showing an example of a map for use in calculating a reference air-fuel ratio KCMDBS.

First, the reference air-fuel ratio-calculating section 60 calculates a reference air-fuel ratio KCMDBS by searching a map (one-dimensional map) appearing in FIG. 6 according to the exhaust gas volume SV_hat. The reference air-fuel ratio KCMDBS represents an optimum value of the air-fuel ratio of the mixture (hereinafter referred to as "the optimum air-fuel ratio"), which satisfies the relationship of VO2≈VO2_TRGT with respect to the exhaust gas volume SV_hat at the time point. This map is set based on average characteristics of the first catalytic device 8 in a new condition, and corresponds to a correlation model in the present embodiment.

Further, as described hereinafter, the model modifier 70 calculates a model modification coefficient Kff. The multiplier 90 calculates the adaptive reference air-fuel ratio KCMDADP, as shown in the following equation (37):

$$KCMDADP(k)=Kff(k)\cdot KCMDBS(k) \quad (37)$$

As shown in the above equation (37), the adaptive reference air-fuel ratio KCMDADP is calculated by modifying (or correcting) the reference air-fuel ratio KCMDBS by the model modification coefficient Kff. In other words, the adaptive reference air-fuel ratio KCMDADP corresponds to a value that is calculated using a map obtained by nonlinearly modifying the FIG. 6 map as the correlation model by the model modification coefficient Kff.

Figure 7:
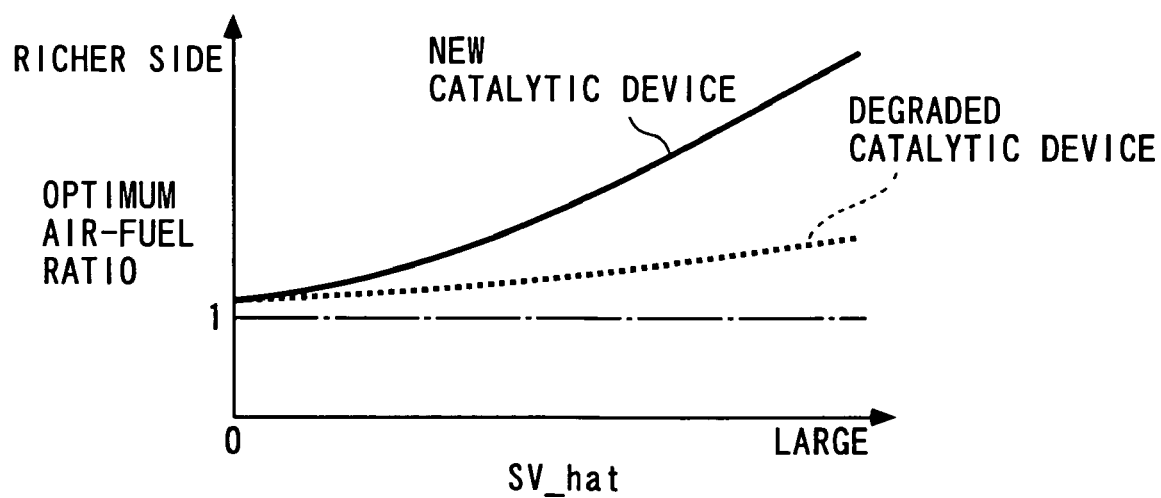
FIG. 7 is a diagram showing the relationship between an exhaust gas volume SV_hat and an optimum value of an air-fuel ratio of a mixture (optimum air-fuel ratio) which satisfies the relationship of VO2≈VO2_TRGT, in respect states of use of new and degraded first catalytic devices.

Next, the reason for using the above-described model modification coefficient Kff will be described with reference to FIG. 7. A curve indicated by a solid line in FIG. 7 shows the relationship between the exhaust gas volume SV_hat and the above-mentioned optimum air-fuel ratio, obtained by using the first catalytic device 8 when the first catalytic device 8 is in a new and undegraded condition, while a curve indicated by a broken line in FIG. 7 shows the relationship therebetween obtained by using the first catalytic device 8 when the first catalytic device 8 is in a degraded condition.

As is clear from the above two lines, when the first catalytic device 8 is in a degraded condition, the optimum air-fuel ratio does not uniformly decrease in the whole region of the exhaust gas volume SV_hat, but it changes with variation in the degree of decrease in the optimum air-fuel ratio. Therefore, in modifying the reference air-fuel ratio KCMDBS, it is necessary to nonlinearly modify the reference air-fuel ratio in a manner corresponding to the change in the optimum air-fuel ratio. Therefore, to nonlinearly modify the reference air-fuel ratio KCMDBS assumed when the first catalytic device 8 is undegraded, the model modifier 70 calculates the model modification coefficient Kff by a method described below.

Referring to FIG. 5, the model modifier 70 is comprised of three weight function-calculating sections 71 to 73, three sliding mode controllers (represented by "SM controllers" in FIG. 5) 74 to 76, three multipliers 77 to 79, and two adders 80 and 81.

Figure 8A:
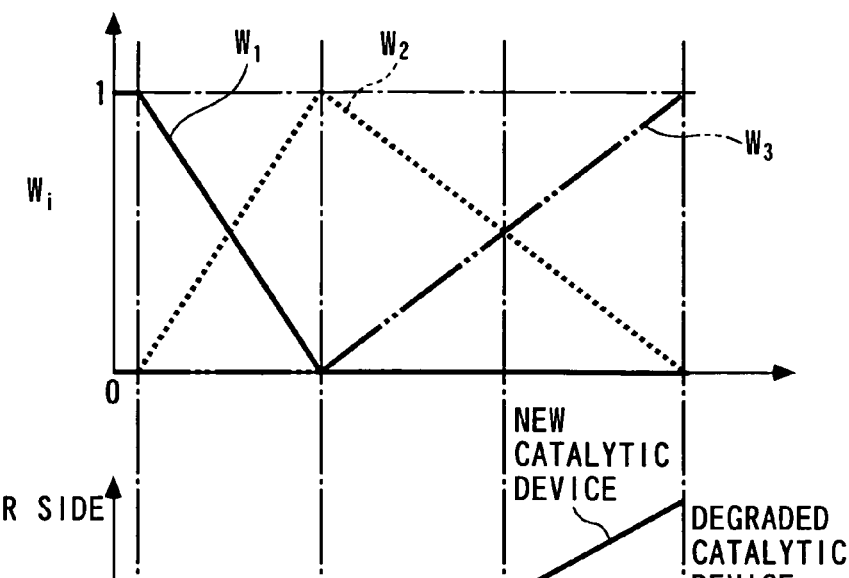
FIG. 8A is a diagram showing an example of a map for use in calculating a weight function $W_i$.

First, the weight function-calculating sections 71 to 73 calculate respective values of the three weight functions $W_i$ (i=1 to 3) by searching a map shown in FIG. 8A according to the exhaust gas volume SV_hat, respectively. In FIG. 8A, SV1 to SV4 represent predetermined values of the exhaust gas volume SV_hat, which are set such that $0<SV1<SV2<SV3<SV4$ holds.

Here, the subscript i of the weight function $W_i$ represents each of values associated with three regions, described hereinafter, of the exhaust gas volume SV_hat. This relationship also applies to various values, described hereinafter. More specifically, a weight function $W_1$ is associated with a first region defined as $0 \leq SV\_hat<SV2$; a weight function $W_2$ is associated with a second region defined as $SV1<SV\_hat<SV4$; and a weight function $W_3$ is associated with a third region defined as $SV2<SV\_hat$.

Further, as shown in FIG. 8A, each of the three weight functions $W_i$ is set to a positive value not larger than 1 in the above-described regions associated therewith, and set to 0 in the other regions. Further, two adjacent weight functions $W_m$ and $W_{m+1}$, (m=1 or 2) are set such that they intersect with each other, and the sum of the values of an intersection of the two adjacent weight functions is equal to the maximum value 1 of the weight functions $W_i$.

Figure 8B:
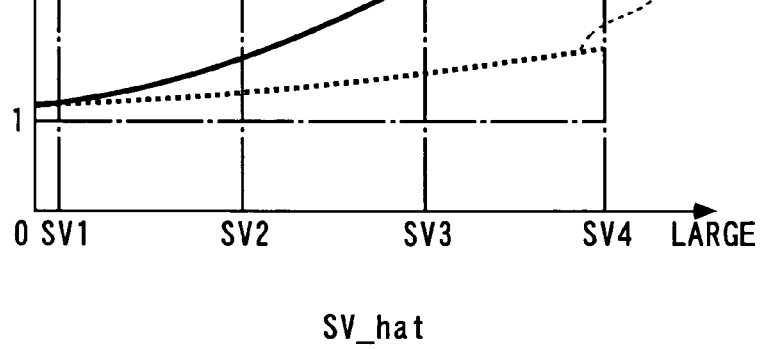
FIG. 8B is a diagram showing an example of the reference air-fuel ratio KCMDBS in respect states of use of new and degraded first catalytic devices.

More specifically, the two adjacent weight functions $W_1$ and $W_2$ intersect with each other between the predetermined value SV1 and the predetermined value SV2, and the exhaust gas volume SV_hat at the intersection of the two $W_1$ and $W_2$ forms a gradient change point across which the gradient of the reference air-fuel ratio KCMDBS changes, as shown in FIG. 8B. Similarly, the two adjacent weight functions $W_2$ and $W_3$ intersect with each other at the predetermined value SV3, and the predetermined value SV3 at the intersection of the two $W_2$ and $W_3$ forms a gradient change point across which the gradient of the reference air-fuel ratio KCMDBS changes.

As described above, an intersection of the two adjacent weight functions $W_m$ and $W_{m+1}$, (m=1 or 2) is set such that it corresponds to the gradient change point of the reference air-fuel ratio KCMDBS for the following reason: As indicated by a broken line in FIG. 8B, when the first catalytic device 8 is degraded, the reference air-fuel ratio KCMDBS has the above-described gradient change point, and at the same time changes while maintaining the position of the gradient change point. This makes it necessary to calculate the model modification coefficient Kff such that it has different gradients between regions associated with the gradient change points. Therefore, to make the gradients of the model modification coefficient Kff different between regions associated with the gradient change points of the reference air-fuel ratio KCMDBS, an intersection of two adjacent weight functions $W_i$ is set such that it corresponds to a gradient change point of the reference air-fuel ratio KCMDBS.

It should be noted that when the position of the gradient change point of the reference air-fuel ratio KCMDBS is moved along with degradation of the first catalytic device 8, the two weight functions $W_m$ and $W_{m+1}$ may be set such that they intersect with each other in a region containing respective gradient change points of the reference air-fuel ratio KCMDBS of the first catalytic device 8 in a new condition and the first catalytic device 8 in a degraded condition. Further, when a large number of weight functions W are set, it is only required to increase the number of weight functions W associated with a region containing gradient change points to densely arrange the weight functions in the region.

On the other hand, the three sliding mode controllers 74 to 76 calculate three modification coefficients $\theta_i$ (i=1 to 3), respectively. The modification coefficients $\theta_i$ are for modifying the three weight functions $W_i$, and as described hereinafter, they are calculated with an algorithm [equations (38) to (44)] to which is applied a sliding mode control algorithm.

First, three distribution errors $Ew_i$ (i=1 to 3) are calculated by the following equation (38), respectively:

$$Ew_i(k)=W_i(k)\cdot DKCMD(k) \quad (38)$$

As shown in the above equation (38), the three distribution errors $Ew_i$ are calculated by multiplying the air-fuel ratio correction value DKCMD by the three weight functions $W_i$, so that they are calculated as values obtained by distributing the air-fuel ratio correction value DKCMD to the aforementioned first to third three regions of the exhaust gas volume SV_hat.

Then, the three modification coefficients $\theta_i$ are calculated with a sliding mode control algorithm using a forgetting coefficient $\lambda$, as expressed by the following equations (39) to (44):

$$\sigma w_i(k) = Ew_i(k) + S \cdot Ew_i(k-1) \quad (39)$$

$$\theta rch_i(k) = Krch\_w \cdot \sigma w_i(k) \quad (40)$$

$$\theta adp_i(k) = \lambda \cdot \theta adp_i(k-1) + Kadp\_w \cdot \sigma w_i(k) \quad (41)$$

When $\theta L \leq \theta_i(k-1) \leq \theta H$, $\lambda = 1$ \quad (42)

When $\theta_i(k-1) < \theta L$ or $\theta H < \theta_i(k-1)$, $\lambda = \lambda lmt$ \quad (43)

$$\theta_i(k) = \theta rch_i(k) + \theta adp_i(k) \quad (44)$$

In the above equation (39), $\sigma w_i$ represents a switching function, and S represents a switching function-setting parameter set to a value which satisfies the relationship of $-1 < S < 0$. Further, in the equation (40), $\theta rch_i$ represents a reaching law input, and $Krch_i$ represents a predetermined reaching law gain.

Further, in the equation (41), $\theta adp_i$ represents an adaptive law input, and $Kadp_i$ represents a predetermined adaptive law gain. Further, in the equation (41), $\lambda$ represents a forgetting coefficient, and as shown in the equations (42) and (43), the value thereof is set to 1 or a predetermined value $\lambda$ lmt, according to the results of comparison between the immediately preceding value $\theta_i(k-1)$ of the modification coefficient and predetermined upper and lower limit values $\theta H$ and $\theta L$. The upper limit value $\theta H$ is set to a predetermined positive value, and the lower limit value $\theta L$ is set to a predetermined negative value, while the predetermined value $\lambda$ lmt is set to a value which satisfies the relationship of $0 < \lambda lmt < 1$.

Furthermore, as shown in the equation (44), the modification coefficient $\theta_i$ is calculated as the sum of the reaching law input $\theta rch_i$ and the adaptive law input $\theta adp_i$.

The forgetting coefficient $\lambda$ is used in the algorithm for calculating the modification coefficient $\theta_i$ for the following reason: When a large distribution error $Ew_i$ is generated by some cause (e.g. introduction of purge gas or ethanol fuel contained in an amount larger than expected) other than a change in the reference air-fuel ratio KCMDBS in the first catalytic device 8, the modification coefficient $\theta_i$ is erroneously adapted and temporarily made improper, which degrades transient controllability.

In contrast, in the aforementioned equation (41), when the absolute value of the immediately preceding value $\theta_i(k-1)$ of the modification coefficient is large, to avoid an increase in the adaptive law input $\theta adp_i$, the immediately preceding value $\theta adp_i(k-1)$ of the adaptive law input is multiplied by the forgetting coefficient $\lambda$ which is set to a value within a range of $0 < \lambda < 1$. In this case, when the aforementioned equation (41) is expanded by a recurrence formula thereof, the immediately preceding value $\theta adp_i(k-h)$ of the adaptive law input calculated in control timing h (h is a natural number not smaller than 2) times earlier is multiplied by $\lambda^h$ ($\approx 0$), so that even when the calculation process proceeds, it is possible to avoid an increase in the adaptive law input $\theta adp_i$. As a result, it is possible to prevent the modification coefficient $\theta_i$ from being erroneously applied and temporarily taking an improper value. This makes it possible to improve controllability in a transient state.

Further, if the forgetting coefficient $\lambda$ is always set to a value within the range of $0 < \lambda < 1$, when the region of the modification coefficient $\theta_i$ is changed to make $Ew_i$ equal to 0 or when the above-described cause is eliminated to thereby make $Ew_i$ approximately equal to 0, the modification coefficient $\theta_i$ comes to converge to a value close to 0 due to a forgetting effect provided by the forgetting coefficient $\lambda$, so that when a large distribution error $Ew_i$ occurs again in such a state, it takes time to eliminate the distribution error $Ew_i$. Therefore, to avoid the inconvenience and eliminate the distribution error $Ew_i$ quickly, it is necessary to properly hold the modification coefficient $\theta_i$ at a value capable of compensating for the distribution error $Ew_i$ even when the absolute value of the modification coefficient $\theta_i$ is relatively small. Therefore, in the present embodiment, when $\theta L \leq \theta_i(k-1) \leq \theta H$ holds, the forgetting coefficient $\lambda$ is set to 1 so as to cancel the forgetting effect provided by the forgetting coefficient $\lambda$. It should be noted that when the forgetting effect by the forgetting coefficient $\lambda$ is always unnecessary, the forgetting coefficient $\lambda$ may be set to 1 in the equation (41) irrespective of the magnitude of the immediately preceding value $\theta_i(k-1)$ of the modification coefficient.

As described above, the three modification coefficients $\theta_i$ are calculated with the sliding mode control algorithm using the forgetting coefficient $\lambda$ such that the air-fuel ratio correction value DKCMD for the three regions of the exhaust gas volume SV_hat with which the three weight functions $W_i$ are associated, respectively, converges to 0.

Next, three products $\theta_i \cdot W_i$ are calculated by multiplying the three modification coefficients $\theta_i$ and the three weight functions $W_i$ associated therewith by the three multipliers 77 to 79, respectively.

Further, a product sum Kff' is calculated by the adder 80 using the following equation (45):

$$Kff'(k) = \sum_{i=1}^{3} \theta_i(k) \cdot W_i(k) \quad (45)$$

Then, the model modification coefficient Kff is calculated by the adder 81 using the following equation (46):

$$Kff(k) = 1 + Kff'(k) = 1 + \sum_{i=1}^{3} \theta_i(k) \cdot W_i(k) \quad (46)$$

As shown in the above equation (46), the model modification coefficient Kff is calculated by adding 1 to the product sum Kff'. This is for causing KCMDADP=KCMDBS to hold in the equation (37) when the three modification coefficients $\theta_i$ have all converged to 0.

It should be noted that in the present embodiment, the model modifier 70 corresponds to the modification value-calculating means, the modification coefficients $\theta_i$ to a plurality of modification values, the three weight functions $W_i$ to a plurality of predetermined functions, and the distribution errors $Ew_i$ to a plurality of products.

FIGS. 9A to 9E show examples of calculations of values by the adaptive reference air-fuel ratio-calculating section 50. As shown in FIGS. 9A to 9E, the three products $\theta_i \cdot W_i$ are calculated as values which change in a manner different from each other, while the model modification coefficient Kff is calculated as a value which nonlinearly changes with respect to the exhaust gas volume SV_hat. From this, it is understood that the adaptive reference air-fuel ratio KCMDADP can be calculated as the results of nonlinear modification of the reference air-fuel ratio KCMDBS by the model modification coefficient Kff.

As described above, the adaptive reference air-fuel ratio-calculating section 50 calculates the modification coefficients $\theta_i$ such that the air-fuel ratio correction value DKCMD becomes equal to 0 (i.e. such that the sensor output VO2 becomes equal to the target output VO2_TRGT), calculates the model modification coefficient Kff while modifying the weight functions $W_i$ by the modification coefficients $\theta_i$ calculated as above, and further calculates the adaptive reference air-fuel ratio KCMDADP by modifying the reference air-fuel ratio KCMDBS using the calculated model modification coefficient Kff. This makes it possible, even when the actual reference air-fuel ratio KCMDBS of the first catalytic device 8 does not nonlinearly change by the above-described various causes, to calculate the adaptive reference air-fuel ratio KCMDADP while causing the same to be adapted to the above nonlinear changes in the reference air-fuel ratio KCMDBS.

Figure 10:
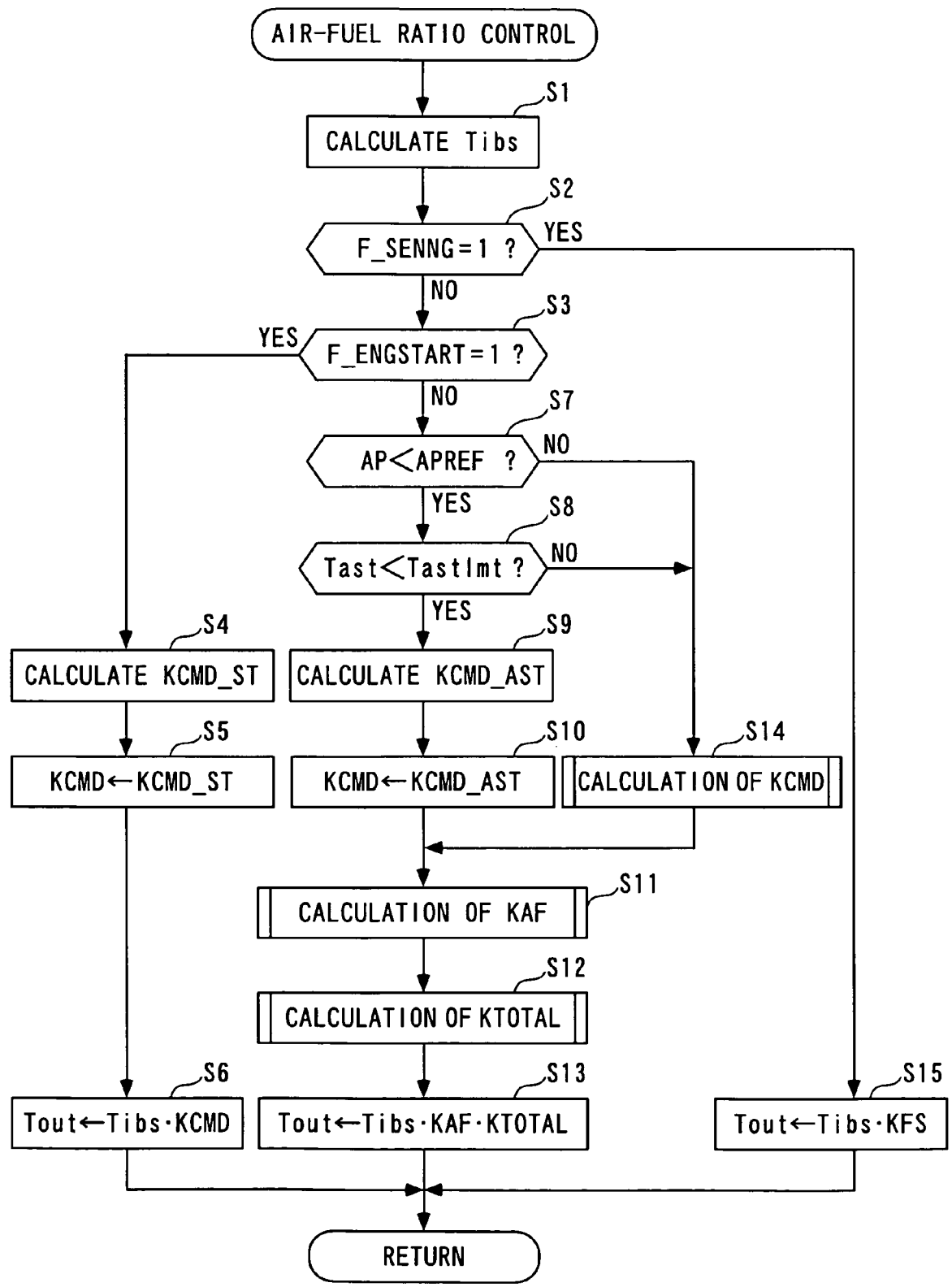
FIG. 10 is a flowchart of an air-fuel ratio control process.

Next, an air-fuel ratio control process executed by the ECU 2 will be described with reference to FIG. 10. The present process is for calculating the fuel injection amount Tout to be injected from each fuel injection valve 6, and is executed at the aforementioned predetermined control period ΔT.

In this process, first, in a step 1 (shown as S1 in abbreviated form in FIG. 10; the following steps are also shown in abbreviated form), a basic injection amount Tibs by searching a map, not shown, according to the engine speed NE and the intake pressure PB.

Then, the process proceeds to a step 2, wherein it is determined whether or not a sensor failure flag F_SENNG is equal to 1. The sensor failure flag F_SENNG is set to 1 when at least one of the air flow sensor 10 and the intake pressure sensor 11 is faulty, and otherwise set to 0.

If the answer to the question of the step 2 is negative (NO), i.e. if the two sensors 10 and 11 are both normal, the process proceeds to a step 3, wherein it is determined whether or not an engine start flag F_ENGSTART is equal to 1. The engine start flag F_ENGSTART is set by determining in a determination process, not shown, whether or not engine start control is being executed, i.e. the engine 3 is being cranked, based on the engine speed NE and an ON/OFF signal output from an ignition switch (not shown). More specifically, when the engine start control is being executed, the engine start flag F_ENGSTART is set to 1, and otherwise set to 0.

Figure 11:
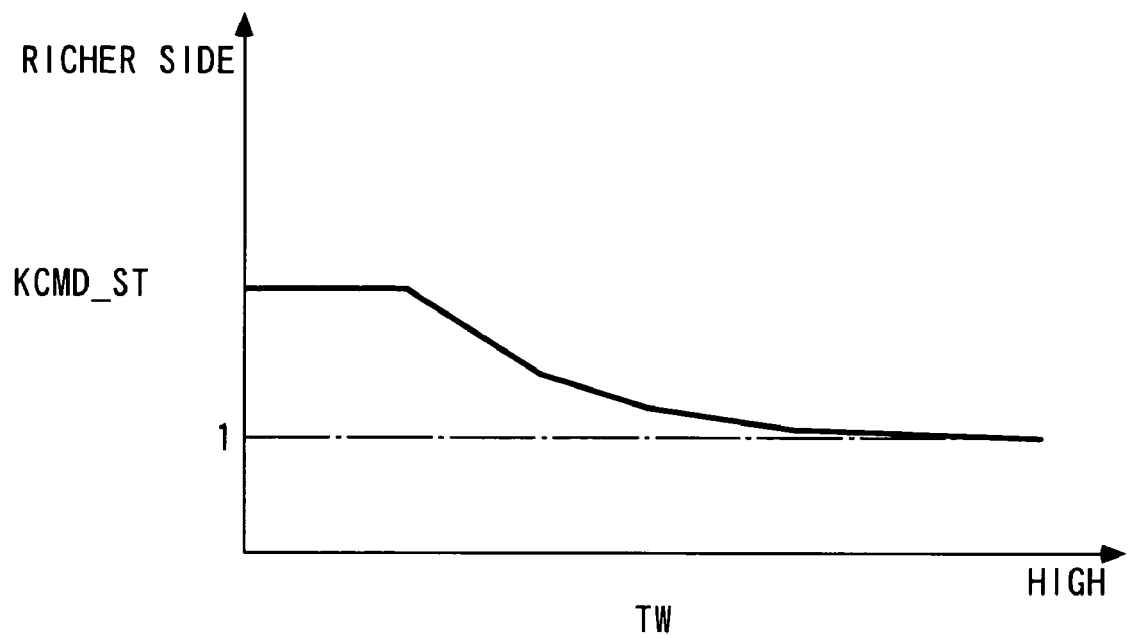
FIG. 11 is a diagram showing an example of a map for use in calculating a start-time value KCMD_ST of a target air-fuel ratio.

If the answer to the question of the step 3 is affirmative (YES), i.e. if the engine start control is being executed, the process proceeds to a step 4, wherein a start-time value KCMD_ST of the target air-fuel ratio is calculated by searching a map shown in FIG. 11 according to the engine coolant temperature TW. In this map, the start-time value KCMD_ST is set to a richer value as the engine coolant temperature TW is lower. This is because when the engine coolant temperature TW is low, to enhance the startability of the engine 3, it is required to control the mixture to a richer value.

In a step 5 following the step 4, the target air-fuel ratio KCMD is set to the above-described start-time value KCMD_ST. Then, the process proceeds to a step 6, wherein the fuel injection amount Tout is set to a product Tibs·KCMD of the basic injection amount Tibs and the target air-fuel ratio KCMD, followed by terminating the present process.

On the other hand, if the answer to the question of the step 3 is negative (NO), i.e. if the engine start control is not being executed, the process proceeds to a step 7, wherein it is determined whether or not the accelerator pedal opening AP is smaller than a predetermined value APREF. If the answer to this question is affirmative (YES), i.e. if the accelerator pedal is not stepped on, the process proceeds to a step 8, wherein it is determined whether or not the count Tast of an after-start timer is smaller than a predetermined value Tastlmt.

Figure 12:
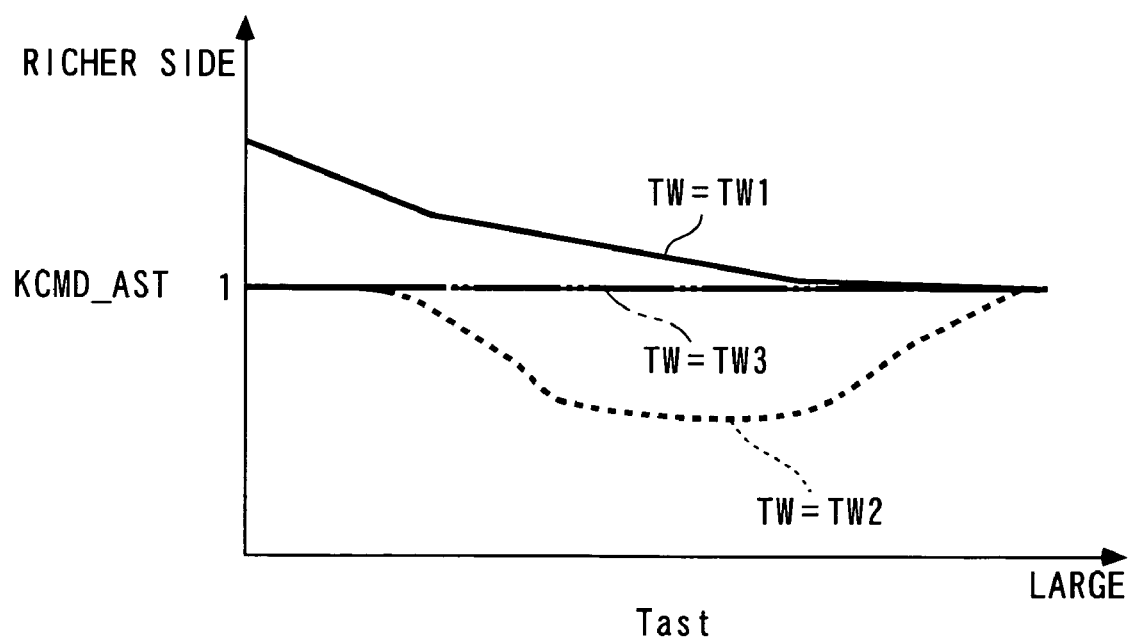
FIG. 12 is a diagram showing an example of a map for use in calculating a catalyst warmup control value KCMD_AST of the target air-fuel ratio.

If the answer to this question is affirmative (YES), i.e. if Tast<Tastlmt holds, it is judged that the catalyst warmup control should be executed, and the process proceeds to a step 9, wherein a catalyst warmup control value KCMD_AST of the target air-fuel ratio is calculated by searching a map shown in FIG. 12 according to the count Tast of the after-start timer and the engine coolant temperature TW. In FIG. 12, TW1 to TW3 represent predetermined values of the engine coolant temperature TW, which satisfy the relationship of TW1<TW2<TW3.

In this map, in a low temperature region of the engine coolant where TW=TW1 is caused to hold, the catalyst warmup control value KCMD_AST is set to a larger value on the richer side as the count Tast is smaller, so as to accelerate activation of the catalysts. Further, in a high temperature region of the engine coolant where TW=TW3 is caused to hold, and the catalyst warmup control has been completed, the catalyst warmup control value KCMD_AST is set to a value corresponding to the stoichiometric air-fuel ratio.

Next, the process proceeds to a step 10, wherein the target air-fuel ratio KCMD is set to the catalyst warmup control value KCMD_AST. After that, in a step 11, the air-fuel ratio correction coefficient KAF is calculated by the calculation methods by the aforementioned ST controller 30.

In a step 12 following the step 11, the total correction coefficient KTOTAL is calculated by the calculation method by the aforementioned total correction coefficient-calculating section 32. Then, the process proceeds to a step 13, wherein the fuel injection amount Tout is set to the product of the basic injection amount Tibs, the air-fuel ratio correction coefficient KAF, and the total correction coefficient KTOTAL, followed by terminating the present process.

On the other hand, if the answer to the question of the step 7 or 8 is negative (NO), i.e. if the accelerator pedal is stepped on, or if Tast≦Tastlmt holds, the process proceeds to a step 14, wherein the target air-fuel ratio KCMD is calculated by the calculation method by the aforementioned air-fuel ratio controller 40.

Then, as described hereinabove, the steps 11 to 13 are executed, followed by terminating the present process.

On the other hand, if the answer to the question of the step 2 is affirmative (YES), i.e. if at least one of the two sensors 10 and 11 is faulty, the process proceeds to a step 15, wherein the fuel injection amount Tout is set to the product Tibs·KFS of the basic injection amount Tibs and a predetermined failure time value KFS of the target air-fuel ratio KCMD, followed by terminating the present process.

The control apparatus 1 according to the present embodiment calculates the fuel injection amount Tout by the above-described air-fuel ratio control process, and although not shown, calculates fuel injection timing according to the fuel injection amount Tout and the engine speed NE. Further, the control apparatus 1 drives the fuel injection valve 6 by a control input signal generated based on the fuel injection amount Tout and the fuel injection timing, to thereby control the air-fuel ratio of the mixture.

Next, results (hereinafter referred to as "the control results") of simulations of the air-fuel ratio control carried out by the control apparatus 1 according to the present embodiment will be described with reference to FIGS. 13A to 13G and FIGS. 14A to 14G. First, FIGS. 13A to 13G show an example of the control results by the control apparatus 1 according to the present embodiment. For comparison, FIGS. 14A to 14G show an example of the control results obtained when the adaptive reference air-fuel ratio KCMDADP is calculated by the same method as employed in Japanese Laid-Open Patent Publication (Kokai) No. 2000-234550.

Figure 13:
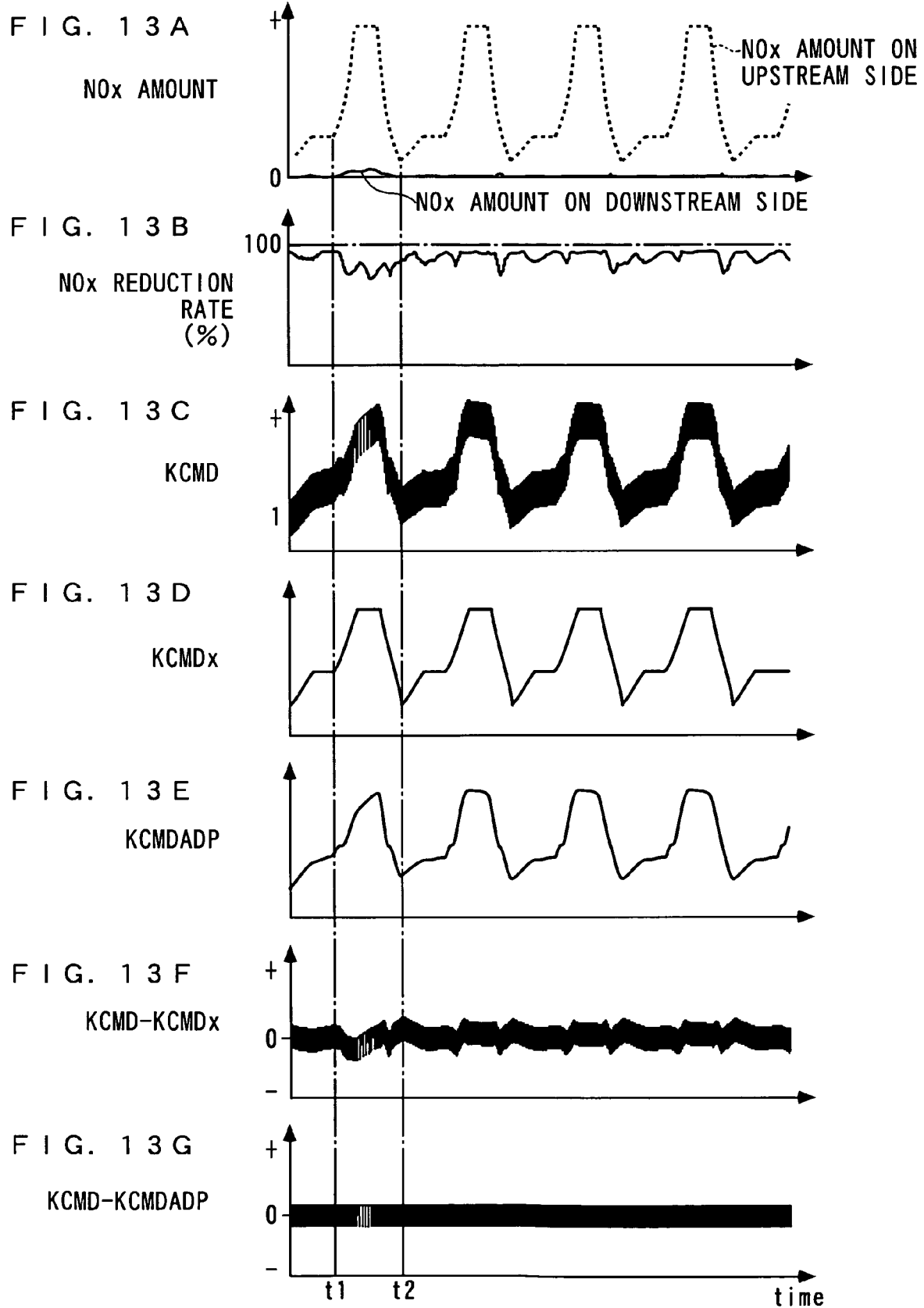
FIGS. 13A to 13G are a timing diagram showing an example of results of a simulation of air-fuel ratio control, which is performed by the control apparatus according to the first embodiment.
Figure 14:
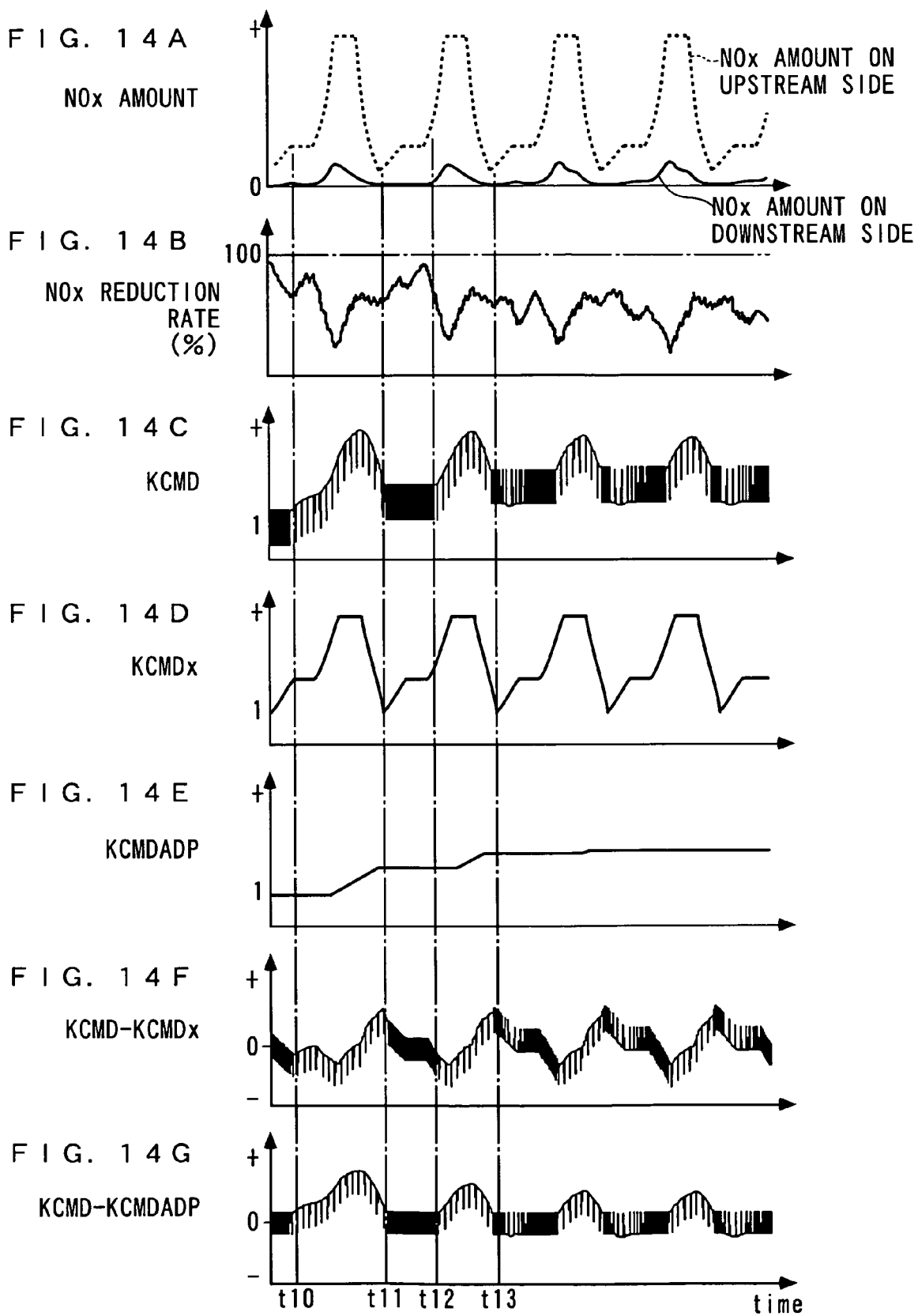
FIG. 14A to 14G are a timing diagram showing an example of results of a simulation of air-fuel ratio control, which is performed by a conventional control method, for comparison.

In FIG. 13A, a curve indicated by a broken line shows the amount of NOx on the upstream side of the first catalytic device 8, and a curve indicated by a solid line shows the amount of NOx on the downstream side of the first catalytic device 8. Further, FIG. 13B shows the NOx reduction rate of the first catalytic device 8. In FIG. 13D, KCMDx represents the aforementioned optimum air-fuel ratio, i.e. the optimum value of the air-fuel ratio of the mixture, which satisfies the relationship of VO2≈VO2_TRGT. Furthermore, a curve in FIG. 13F represents the difference KCMD−KCMDx between the target air-fuel ratio KCMD and the optimum air-fuel ratio KCMDx, and a curve in FIG. 13G represents the difference KCMD−KCMDADP between the target air-fuel ratio KCMD and the adaptive reference air-fuel ratio KCMDADP. These relationships also apply to FIGS. 14A to 14G.

As is apparent from FIGS. 14A to 14G, when the adaptive reference air-fuel ratio KCMDADP is calculated by the same method as employed in Japanese Laid-Open Patent Publication (Kokai) No. 2000-234550, when the NOx emission amount of the engine 3 increases, the target air-fuel ratio KCMD largely deviates from the optimum air-fuel ratio KCMDx due to the low follow-up characteristic of the adaptive reference air-fuel ratio KCMDADP with respect to the optimum air-fuel ratio KCMDx, and the output difference DVO2 increases (the output VO2 from the oxygen concentration sensor largely deviates from the predetermined target output VO2_TRGT), so that the fluctuating frequency of the target air-fuel ratio KCMD lowers (between time points t10 and t11, and time points t12 and t13). Understandably, this results in lowering of the NOx reduction rate of the first catalytic device 8 to temporarily increase the NOx amount on the downstream side of the first catalytic device 8.

In contrast, as shown in FIGS. 13A to 13G, according to the control apparatus 1 of the present embodiment, when the NOx emission amount of the engine 3 increases, the adaptive reference air-fuel ratio KCMDADP produces a slight difference with respect to the optimum air-fuel ratio KCMDx so that the fluctuating frequency of the target air-fuel ratio KCMD temporarily becomes lower, immediately after the start of the control (between time points t1 and t2). After that, however, the adaptive reference air-fuel ratio KCMDADP can be caused to be adapted to the characteristic of the optimum air-fuel ratio KCMDx with the lapse of the execution time period of the control, and hence the output difference DVO2 can be caused to converge to 0, whereby the fluctuating frequency of the target air-fuel ratio KCMD is held within the high frequency region (e.g. a frequency region not lower than 5 Hz). As a consequence, it is understood that an excellent NOx reduction rate of the first catalytic device 8 can be ensured, thereby making it possible to reduce the NOx amount on the downstream side of the first catalytic device 8.

As described above, according to the control apparatus 1 of the present embodiment, the sliding mode controller 43 calculates the air-fuel ratio correction value DKCMD with the adaptive sliding mode control algorithm such that the output VO2 from the O2 sensor converges to the predetermined target output VO2_TRGT, and the modulator 44 calculates the modulated value DKCMD_DSM of the air-fuel ratio correction value DKCMD by modulating the air-fuel ratio correction value DKCMD with the algorithm to which is applied the $\Delta\Sigma$ modulation algorithm. With this configuration, when VO2≈VO2_TRGT holds, DKCMD≈0 holds, and hence the modulated value DKCMD_DSM is calculated as a value exhibiting an inverting behavior at a high frequency (e.g. a frequency of not lower than 5 Hz).

Further, the adaptive reference air-fuel ratio-calculating section 50 calculates the model modification coefficient Kff by calculating the three modification coefficients $\theta_i$ associated with three regions formed by dividing a region where the exhaust gas volume SV_hat is variable, respectively, such that the air-fuel ratio correction value DKCMD becomes equal to 0 (i.e. such that the sensor output VO2 becomes equal to the target output VO2_TRGT), multiplying the modification coefficients $\theta_i$ by the weight functions $W_i$, and adding the product sum Kff, which is the total sum of the products $\theta_i \cdot W_i$, to 1. Furthermore, the adaptive reference air-fuel ratio KCMDADP is calculated by modifying the reference air-fuel ratio KCMDBS using the model modification coefficient Kff. With this configuration, even when the aforementioned optimum air-fuel ratio does not nonlinearly change with respect to the three regions of the exhaust gas volume SV_hat due to a sudden change in the operating conditions of the engine 3, it is possible to calculate the adaptive reference air-fuel ratio KCMDADP while causing the same to be quickly adapted to the above nonlinear change in the optimum air-fuel ratio.

More specifically, when a sudden change in the operating conditions of the engine 3 causes the FIG. 6 relationship between the reference air-fuel ratio KCMDBS and the exhaust gas volume SV_hat to suffer from a local error in any of the above-mentioned three regions with respect to the actual relationship between the optimum air-fuel ratio and the exhaust gas volume SV_hat, or even when there is variation in the actual relationship between the reference air-fuel ratio KCMDBS and the exhaust gas volume SV_hat, between the three regions, it is possible to properly and quickly cause the relationship between the adaptive reference air-fuel ratio KCMDADP and the exhaust gas volume SV_hat to coincide with the actual relationship between the optimum air-fuel ratio and the exhaust gas volume SV_hat.

Further, the target air-fuel ratio KCMD is calculated by adding the modulated value DKCMD_DSM to the adaptive reference air-fuel ratio KCMDADP calculated as above, so that even when the target air-fuel ratio KCMD temporarily and largely deviates from the optimum air-fuel ratio, and the sensor output VO2 largely deviates from the target output VO2_TRGT, by a sudden change in the operating conditions of the engine 3, causing a sudden and temporary increase in the air-fuel ratio correction value DKCMD, it is possible to quickly control the suddenly increased air-fuel ratio correction value DKCMD using the adaptive reference air-fuel ratio KCMDADP such that the air-fuel ratio correction value DKCMD becomes equal to 0. This makes it possible to quickly control the sensor output VO2 to the target output VO2_TRGT, thereby making it possible to quickly increase the frequency of the modulated value DKCMD_DSM, that is, the fluctuating frequency of the target air-fuel ratio KCMD. As a consequence, it is possible to quickly correct the lowering of the fluctuating frequency of the target air-fuel ratio KCMD caused by the sudden change in the operating conditions of the engine 3, thereby making it possible to hold the exhaust emission reduction rate of the first catalytic device 8 at a high-level.

Further, each of the three weight functions $W_1$ is set to a positive value not larger than 1 in the above-described regions associated therewith, and set to 0 in the other regions. Further, the weight functions $W_1$ are configured such that two adjacent weight functions $W_m$ and $W_{m+1}$, (m=1 or 2) intersect with each other, and the sum of the values at the intersection of the two adjacent weight functions is equal to the maximum value 1 of the weight functions $W_i$. Therefore, in modifying the reference air-fuel ratio KCMDBS, it is possible to modify the same continuously over the three regions, so that the adaptive reference air-fuel ratio KCMDADP resulting from the modification comes to have no discontinuities. This makes it possible to prevent the adaptive reference air-fuel ratio KCMDADP from becoming temporarily improper due to the discontinuities of the reference air-fuel ratio KCMDBS.

It should be noted that although in the first embodiment, the control apparatus according to the present invention is applied to the controlled object in which the output VO2 of the oxygen concentration sensor 15 is a controlled variable and the target air-fuel ratio KCMD is a control input, by way of example, this is not limitative, but it may be applied to any suitable system in various industrial apparatuses, as a controlled object, in which an output therefrom is a controlled variable and an input thereto is a control input.

Further, although in the first embodiment, the adaptive sliding mode control algorithm is employed as a predetermined feedback control algorithm, by way of example, the predetermined feedback control algorithm according to the present invention is not limited to this, but any suitable feedback control algorithm may be used insofar as it is capable of calculating an input value such that a controlled variable is caused to converge to a target controlled variable. For example, as the predetermined feedback control algorithm according to the present invention, there may be used any of an ordinary sliding mode control algorithm, a PID control algorithm, a back-stepping control algorithm, a response-specifying control algorithm in which a controlled object model of a sliding mode control algorithm is replaced by a controlled object model of a linear type, or an optimum regulation algorithm.

Further, although in the first embodiment, a modulation algorithm [equations (24) to (34)] to which is applied the $\Delta\Sigma$ modulation algorithm is used as a predetermined modulation algorithm, by way of example, the predetermined modulation algorithm according to the present invention is not limited to this, but any suitable modulation algorithm may be used insofar as it is capable of calculating a modulated value of an input value to the predetermined modulation algorithm such that the modulated value has a higher frequency as the absolute value of the input value is smaller. For example, a $\Delta$ modulation algorithm, a $\Delta\Sigma$ modulation algorithm, or a modulation algorithm formed based on these may be used as the predetermined modulation algorithm.

On the other hand, although in the first embodiment, the exhaust gas volume SV_hat is used as the operating state parameter, by way of example, the operating state parameter according to the present invention is not limited to this, but any suitable operating state parameter may be used insofar as it represents the operating state of a controlled object.

Further, although in the first embodiment, the exhaust gas volume SV_hat is used as the operating state parameter, by way of example, the operating state parameter according to the present invention is not limited to this, but any suitable operating state parameter may be used insofar as it represents the operating state of the engine. For example, the air flow rate Gth may be used as the operating state parameter.

Further, although in the first embodiment, the one-dimensional map shown in FIG. 6 is used as the correlation model, by way of example, the correlation model according to the present invention is not limited to this, but any suitable correlation model may be used insofar as it represents the relationship between the second input value and the operating state parameter. For example, another calculating equation, a two or more-dimensional map, and so forth may be used as the correlation model.

Furthermore, although in the first embodiment, the oxygen concentration sensor 15 is used as the exhaust gas concentration sensor, by way of example, the exhaust gas concentration sensor according to the present invention is not limited to this, but any suitable exhaust gas concentration sensor may be used insofar as it detects the concentration of a predetermined component of exhaust gases. For example, an NOx concentration sensor for detecting the concentration of NOx in exhaust gases may be used as the exhaust gas concentration sensor.

Further, although in the first embodiment, the target air-fuel ratio KCMD as the control input is calculated as the sum of the adaptive reference air-fuel ratio KCMDADP as the second input value and the modulated value DKCMD_DSM as the modulated input value, by way of example, the control input according to the present invention is not limited to this, but any suitable control input may be used insofar as it is calculated based on the sum of the second input value and the modulated input value. For example, the control input may be calculated by adding a predetermined value to the sum of the second input value and the modulated input value, or by multiplying the sum of the second input value and the modulated input value by a predetermined value.

Next, a control apparatus 1A (see FIG. 15) according to a second embodiment of the present invention will be described. It should be noted that in the following description, component elements of the control apparatus 1A, identical to those of the control apparatus 1 according to the first embodiment, are designated by identical reference numerals, and detailed description thereof is omitted. The control apparatus 1A is applied to a vehicle of a so-called FR system, not shown, which has the engine 3 with the aforementioned stepped automatic transmission installed on a front side thereof, and includes rear wheels and front wheels, neither of which is shown, as drive wheels and non-drive wheels (driven wheels), respectively. More specifically, the control apparatus 1A is for carrying out traction control of the vehicle.

It should be noted that the term "traction control" is intended to mean a control method of reducing torque generated by the engine 3, when the torque generated by the engine 3 becomes too large during acceleration of the vehicle, thereby causing a state in which the drive wheels rotate without load or race with respect to the non-drive wheels, so as to avoid the racing state to thereby ensure the stability of the vehicle and enhance the acceleration performance of the engine 3 in a compatible manner.

Figure 15:
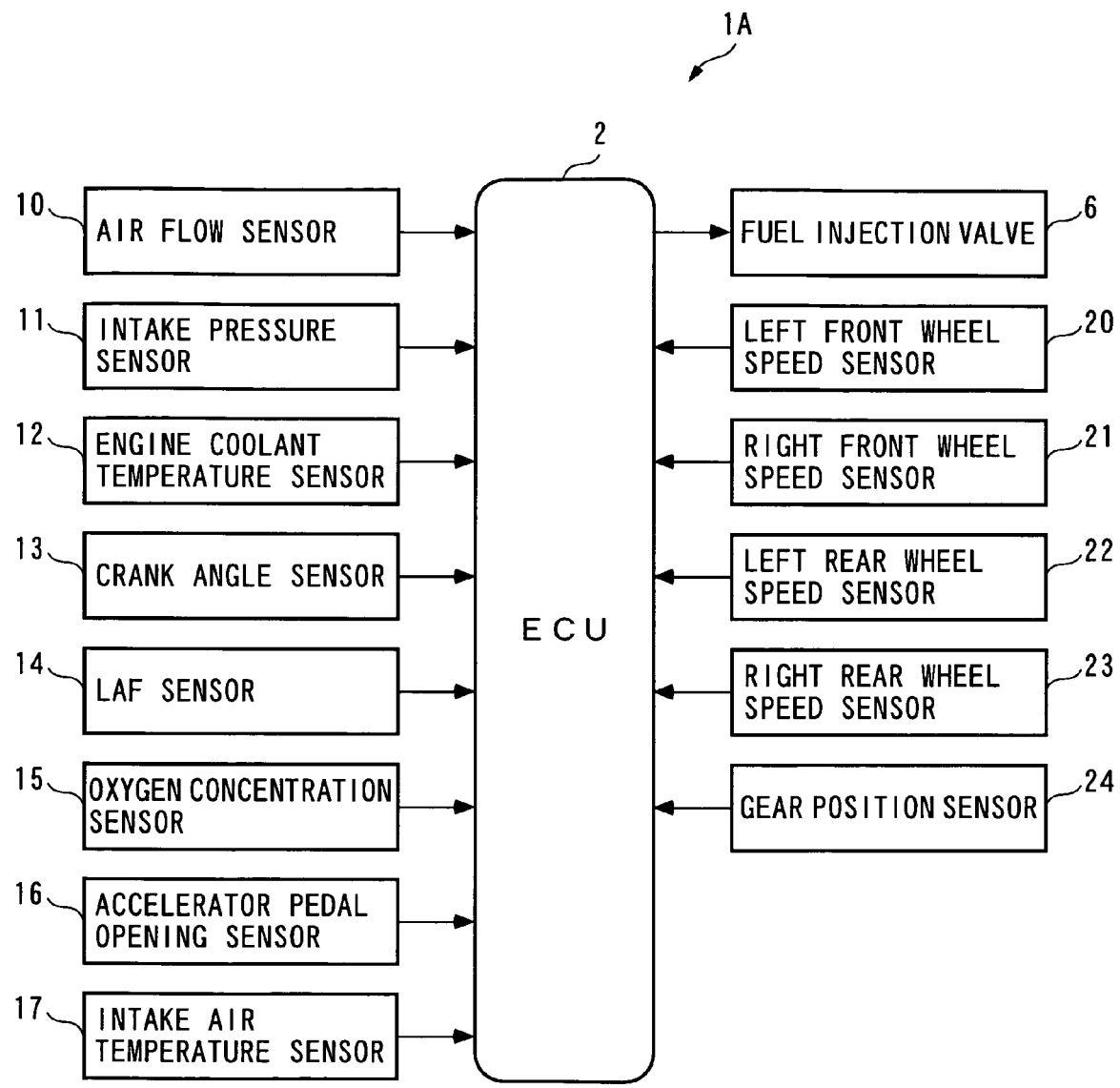
FIG. 15 is a schematic diagram of a control apparatus according to a second embodiment of the present invention.

Referring to FIG. 15, the control apparatus 1A includes the ECU 2. To the ECU 2 are connected not only the aforementioned sensors 10 to 17 but also left and right front wheel speed sensors 20 and 21, left and right rear wheel speed sensors 22 and 23, and a gear position sensor 24. The left and right front wheel speed sensors 20 and 21 detect the speeds of the left and right front wheels, to deliver signals indicative of the respective sensed left and light front wheel speeds to the ECU 2. The left and right rear wheel speed sensors 22 and 23 detect the speeds of the left and right rear wheels, to deliver signals indicative of the respective sensed left and right rear wheel speeds to the ECU 2.

The ECU 2 calculates the left and right front wheel speeds based on the signals from the left and right front wheel speed sensors 20 and 21, and calculates the arithmetic mean thereof as a non-drive wheel speed Ws_ref. Further, the ECU 2 calculates the left and right rear wheel speeds based on the signals from the left and right rear wheel speed sensors 22 and 23, and calculates the arithmetic mean thereof as a drive wheel speed Ws_act.

It should be noted that in the present embodiment, the ECU 2 corresponds to the controlled variable-detecting means, the target controlled variable-setting means, the first input value-calculating means, the modulated input value-calculating means, the operating state parameter-detecting means, the error parameter-calculating means, the modification value-calculating means, the model-modifying means, the second input value-calculating means, the control input-calculating means, the setting means, the estimated value-calculating means, the error parameter-setting means, demanded output-calculating means, and the selection means. Further, the left and right rear wheel speed sensors 22 and 23 correspond to the controlled variable-detecting means, the drive wheel speed Ws_act to the controlled variable and the speed of the drive wheels, the crank angle sensor 13 to the operating state parameter-detecting means, and the engine speed NE to the operating state parameter and operating state parameter.

The stepped automatic transmission includes a forward sixth-speed gear position and a rear first-speed gear position. The gear position sensor 24 detects the gear position of the stepped automatic transmission, and delivers a signal indicative of the detected gear position to the ECU 2. The ECU 2 sets a forward gear position value NGEAR based on the signal from the gear position sensor 24. More specifically, the forward gear position value NGEAR is set to 1 to 3 for first to third-speed forward gear positions, respectively, and is set to 4 for fourth to sixth-speed forward gear positions.

Figure 16:
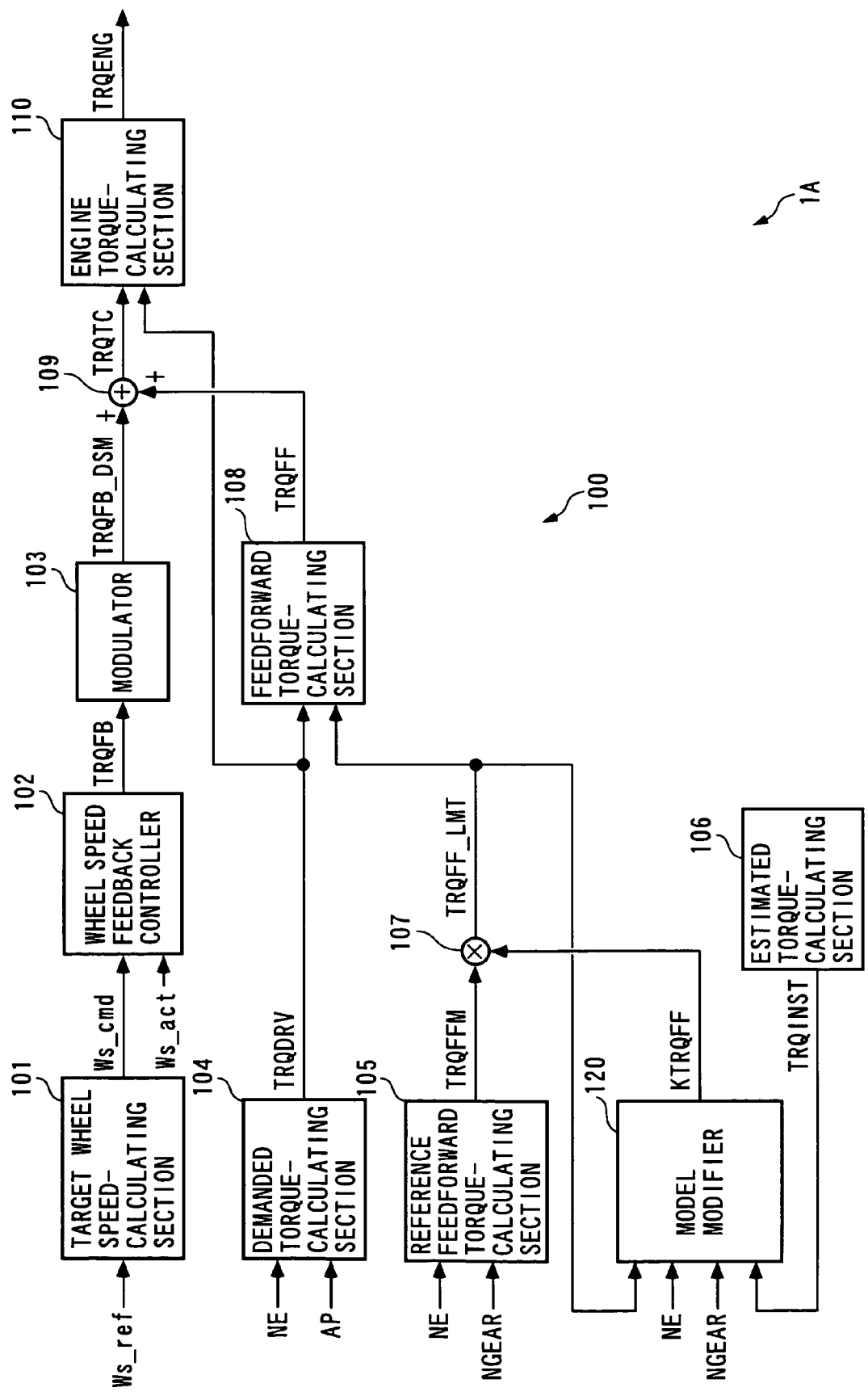
FIG. 16 is a schematic diagram of a traction controller.

Further, as shown in FIG. 16, the control apparatus 1A includes a traction controller 100. As described hereinafter, the traction controller 100 is for calculating engine torque TRQENG as torque of the engine 3 which is estimated to make it possible to avoid the racing state of the drive wheels, to thereby ensure the stability of the vehicle and enhance the acceleration performance of the engine 3 in a compatible manner. Specifically, the traction controller 100 is implemented by the ECU 2. It should be noted that in the present embodiment, the traction controller 100 corresponds to the model-modifying means, the second input value-calculating means, and the control input-calculating means, and the engine torque TRQENG corresponds to the target of an output from the engine.

As shown in FIG. 16, the traction controller 100 is comprised of a target wheel speed-calculating section 101, a wheel speed feedback controller 102, a modulator 103, a demanded torque-calculating section 104, a reference feed-forward torque-calculating section 105, an estimated torque-calculating section 106, a multiplier 107, a feedforward torque-calculating section 108, an adder 109, an engine torque-calculating section 110, and a model modifier 120.

First, the target wheel speed-calculating section 101 calculates a target wheel speed Ws_cmd by the following equation (47). It should be noted that in the present embodiment, the target wheel speed-calculating section 101 corresponds to target controlled variable-setting means, and the target wheel speed Ws_cmd corresponds to the target controlled variable and a target speed.

$$Ws\_cmd(k) = Ws\_ref(k) + OptSlip \qquad (47)$$

In the above equation (47), OptSlip represents a predetermined slip offset value which corresponds to a slip amount allowable between the drive wheels and the non-drive wheels, and in the present embodiment, it is set to a fixed value (e.g. 10 km/h). In this case, the slip offset value OptSlip may be determined by searching a map or using a predetermined calculating equation, according to a predetermined parameter (e.g. the non-drive wheel speed Ws_ref, an estimated value of the frictional resistance coefficient of a road surface, a detection signal from a yaw rate sensor, a detection signal from a slip angle sensor mounted on the body of the vehicle, etc.). It should be noted that in the present embodiment, the slip offset value OptSlip corresponds to a predetermined amount.

Next, a description will be given of the wheel speed feedback controller 102 described above. As will be described hereinafter, the wheel speed feedback controller 102 calculates a torque feedback value TRQFB with a control algorithm [equations (48) to (58)], to which are applied a combination of a target value filter-type two-degree-of-freedom sliding mode control algorithm, and an adaptive disturbance observer. It should be noted that in the present embodiment, the wheel speed feedback controller 102 corresponds to the first input value-calculating means, and the torque feedback value TRQFB corresponds to the first input value.

First, a filtered value Ws_cmd_f of the target wheel speed is calculated with a first order lag type low pass filter algorithm expressed by the equation (48).

$$Ws\_cmd\_f(k) = -Rt \cdot Ws\_cmd\_f(k-1) + (1+Rt)Ws\_cmd(k) \qquad (48)$$

In the above equation (48), Rt represents a target value filter-setting parameter, and is set to a value which satisfies the relationship of $-1 < Rt < 0$. In this case, the follow-up speed of the filtered value Ws_cmd_f to the target wheel speed Ws_cmd is determined by a value set to the target value filter-setting parameter Rt.

Then, a reaching law input Urch_t and a nonlinear input Unl_t are calculated with a control algorithm to which is applied a sliding mode control algorithm expressed by the following equations (49) to (52).

$$Et(k) = Ws\_act(k) - Ws\_cmd\_f(k) \qquad (49)$$

$$\sigma t(k) = Et(k) + St \cdot Et(k-1) \qquad (50)$$

$$Urch\_t(k) = -Krch\_t \cdot \sigma t(k) \qquad (51)$$

$$Unl\_t(k) = -Knl\_t \cdot sgn(\sigma t(k)) \qquad (52)$$

In the equation (49), Et represents a follow-up error, and in the equation (50), σt represents a switching function. Further, in the equation (50), St represents a switching function-setting parameter, and is set to a value which satisfies the relationship of $-1 < St < 0$. In this case, the convergence rate of the follow-up error Et to 0 is designated by a value set to the switching function-setting parameter St. Further, in the equation (51), Krch_t represents a predetermined reaching law gain, and in the equation (52), Knl_t represents a predetermined nonlinear input gain. Furthermore, in the equation (52), sgn(σt(k)) represents a sign function, and the value thereof is set such that sgn(σt(k))=1 holds when σt(k)≧0, and when σt(k)<0, sgn(σt(k))=−1 holds (it should be noted that the value thereof may be set such that sgn(σt(k))=0 holds when σt(k)=0).

Then, a disturbance estimated value Uls_t is calculated with a control algorithm to which is applied an adaptive disturbance observer expressed by the following equations (53) to (57).

$$\sigma t\_hat(k) = Urch\_t(k-1) + Unl\_t(k-1) + Uls\_t(k-1) \qquad (53)$$

-continued $$Et\_sig(k) = \sigma t(k) - \sigma t\_hat(k) \quad (54)$$
$$= \sigma t(k) - Urch\_t(k-1) - Un\_t(k-1) - Uls\_t(k-1)$$

$$Uls\_t(k) = \lambda t \cdot Uls\_t(k-1) + \frac{Pt}{1+Pt} Et\_sig(k) \quad (55)$$

· When $Uls\_t\_L < Uls\_t(k-1) < Uls\_t\_H$, (56)
$\lambda t = 1$

· When $Uls\_t(k-1) \leq Uls\_t\_L$ or $Uls\_t\_H \leq Uls\_t(k-1)$, (57)
$\lambda t = \lambda tlmt$ In the equation (53), σt_hat represents an estimated value of a switching function, and Uls_t represents a disturbance estimated value. The disturbance estimated value Uls_t is calculated with a fixed gain identification algorithm expressed by the equations (54) and (55). In the equation (54), Et_sig represents an estimation error, and in the equation (55), Pt represents a fixed identification gain.

Further, in the equation (55), λt represents a forgetting coefficient, and as shown in the equations (56) and (57), the value thereof is set to 1 or a predetermined value λtlmt, according to the results of comparisons between the immediately preceding value Uls_t(k−1) of the disturbance estimated value and predetermined upper and lower limit values Uls_t_H and Uls_t_L. The upper limit value Uls_t_H is set to a predetermined positive value, and the lower limit value Uls_t_L is set to a predetermined negative value, while the predetermined value λtlmt is set a value which satisfies the relationship of 0<λtlmt<1.

Then, as shown in the equation (58), the torque feedback value TRQFB is finally calculated as the sum of the reaching law input Urch_t, the nonlinear input Unl_t, and the disturbance estimated value Uls_t.

$$TRQFB(k) = Urch\_t(k) + Unl\_t(k) + Uls\_t(k) \quad (58)$$

As described above, the wheel speed feedback controller 102 calculates the torque feedback value TRQFB with the control algorithm expressed by the equations (48) to (58), and therefore the torque feedback value TRQFB is calculated as a value for causing the drive wheel speed Ws_act to converge to the filtered value Ws_cmd_f of the target wheel speed, in other words, as a value for causing the drive wheel speed Ws_act to converge to the target wheel speed Ws_cmd. In this case, as described hereinabove, the target wheel speed Ws_cmd is calculated by adding the slip offset value OptSlip to the non-drive wheel speed Ws_ref, so that in a state of Ws_act≈Ws_cmd, Ws_ref −Ws_act≈OptSlip holds.

Further, the torque feedback value TRQFB is calculated using the forgetting coefficient λt, and hence if the absolute value of the immediately preceding value Uls_t(k−1) of the disturbance estimated value is large, the above-described forgetting effect makes it possible to prevent the disturbance estimated value Uls_t, i.e. the torque feedback value TRQFB from being integrally increased, whereby it is possible to ensure the stability of the responsiveness of the control system in a transient state. Further, if the absolute value of the immediately preceding value Uls_t(k−1) of the disturbance estimated value is small, the forgetting coefficient λt is set to 1, and hence even when the follow-up error Et has converged to 0, the torque feedback value TRQFB can be held at a value appropriate enough to compensate for the follow-up error Et quickly, whereby it is possible to enhance the responsiveness when the follow-up error Et starts to increase.

Next, a description will be given of the modulator 103. The modulator 103 calculates a modulated value TRQFB_DSM by modulating the torque feedback value TRQFB with a modulation algorithm, described hereinafter. First, a small amplitude component value TRQFB_L is calculated by the following equations (59) to (61).

When $TRQFB(k) < -TRQFB\_L\_LMT$, $TRQFB\_L(k) = -TRQFB\_L\_LMT$ (59)

When $-TRQFB\_L\_LMT \leq TRQFB(k) \leq TRQFB\_L\_LMT$, $TRQFB\_L(k) = TRQFB(k)$ (60)

When $TRQFB\_L\_LMT < TRQFB(k)$, $TRQFB\_L(k) = TRQFB\_L\_LMT$ (61)

In the above equations (59) to (61), TRQFB_L_LMT represents a predetermined threshold value, and as shown in the equations (59) to (61), the small amplitude component value TRQFB_L is calculated by performing a limiting process on the amplitude of the torque feedback value TRQFB using a value TRQFB_L_LMT as an upper limit value and a value −TRQFB_L_LMT as a lower limit value. In other words, the small amplitude component value TRQFB_L corresponds to the torque feedback value TRQFB obtained when the torque feedback value TRQFB undergoes small changes, and an absolute value thereof is within a range of the threshold value TRQFB_L_LMT.

Further, a large amplitude component value TRQFB_H is calculated by the following equations (62) to (64):

When $TRQFB(k) < -TRQFB\_L\_LMT$, $TRQFB\_H(k) = TRQFB(k) + TRQFB\_L\_LMT$ (62)

When $-TRQFB\_L\_LMT \leq TRQFB(k) \leq TRQFB\_L\_LMT$, $TRQFB\_H(k) = 0$ (63)

When $TRQFB\_L\_LMT < TRQFB(k)$, $TRQFB\_H(k) = TRQFB(k) - TRQFB\_L\_LMT$ (64)

As shown in the above equations (62) to (64), the large amplitude component value TRQFB_H is calculated as 0 when the absolute value of the torque feedback value TRQFB does not exceed the threshold value TRQFB_L_LMT, whereas when the former exceeds the latter, the large amplitude component value DKCMD_H is calculated as a value corresponding to the excess amount. More specifically, when the quick responsiveness of the control is demanded due to large changes in the torque feedback value TRQFB, the large amplitude component value DKCMD_H is calculated as a value that will cause such a torque feedback value TRQFB to be properly reflected on the engine torque TRQENG.

Further, a modulated component value TRQFB_L_DSM is calculated by modulating the small amplitude component value TRQFB_L with a modulation algorithm to which is applied a ΔΣ modulation algorithm expressed by the following equations (65) to (68):

$$\delta dsm2(k) = TRQFB\_L(k) - TRQFB\_L\_DSM(k-1) \quad (65)$$

$$\sigma dsm2(k) = \sigma dsm2(k-1) + \delta dsm2(k) \quad (66)$$

When $\sigma dsm2(k) < 0$, $TRQFB\_L\_DSM(k) = -TRQFB\_L\_AMP$ (67)

When $\sigma dsm2(k) \geq 0$, $TRQFB\_L\_DSM(k) = TRQFB\_L\_AMP$ (68)

As shown in the above equation (65), the difference δdsm2 is calculated as the difference between the small amplitude component value TRQFB_L and the immediately preceding value of the modulated component value TRQFB_L_DSM. Further, in the equation (66), σdsm2 represents the integral value of the difference δdsm2. Further, in the equation (68), TRQFB_L_AMP represents a predetermined amplitude value. As is clear from the above equations (65) and (68), the modulated component value TRQFB_L_DSM is calculated as a value which is repeatedly inverted between a minimum value −TRQFB_L_AMP and a maximum value TRQFB_L_AMP with respect to 0.

Then, finally, as shown in the following equation (69), the modulated value TRQFB_DSM is calculated by adding the large amplitude component value TRQFB_H to the modulated component value TRQFB_L_DSM.

$$TRQFB\_DSM(k)=TRQFB\_L\_DSM(k)+TRQFB\_H(k) \quad (69)$$

It should be noted that in the present embodiment, the modulator 103 corresponds to the modulated input value-calculating means, and the modulated value DKCMD_DSM corresponds to the modulated input value.

Next, a description will be given of the aforementioned demanded torque-calculating section 104. The demanded torque-calculating section 104 is for calculating a demanded torque TRQDRV by a method, described hereinafter. The demanded torque TRQDRV corresponds to torque demanded of the engine 3 by a driver. It should be noted that in the present embodiment, the demanded torque-calculating section 104 corresponds to the demanded output-calculating means, and the demanded torque TRQDRV corresponds to the demanded output.

Figure 17:
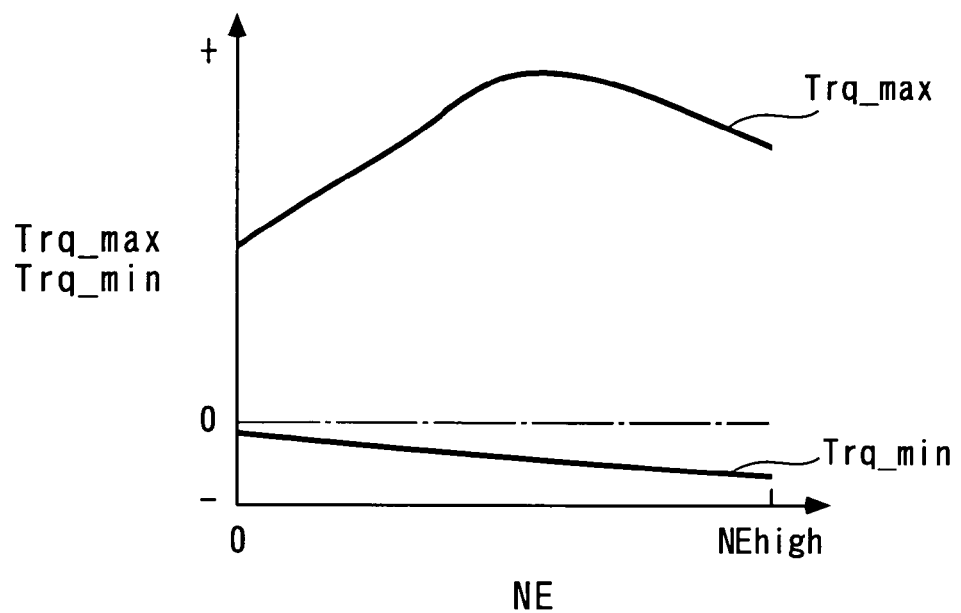
FIG. 17 is a diagram showing an example of a map for use in calculating a maximum torque Trq_max and a minimum torque Trq_min.

First, the demanded torque-calculating section 104 calculates a maximum torque Trq_max and a minimum torque Trq_min by searching a map shown in FIG. 17 according to the engine speed NE. In FIG. 17, NEhigh represents a predetermined maximum allowable engine speed (e.g. 7000 rpm). These values Trq_max and Trq_min correspond to the maximum value and the minimum value of the engine torque which can be achieved when the engine speed NE is equal to the associated engine speed. Further, in this map, the minimum torque Trq_min is set to a negative value. This is because the minimum torque Trq_min corresponds to engine torque obtained in a state in which the accelerator pedal is not stepped on, i.e. in an engine brake state during a deceleration fuel cut-off operation.

Figure 18:
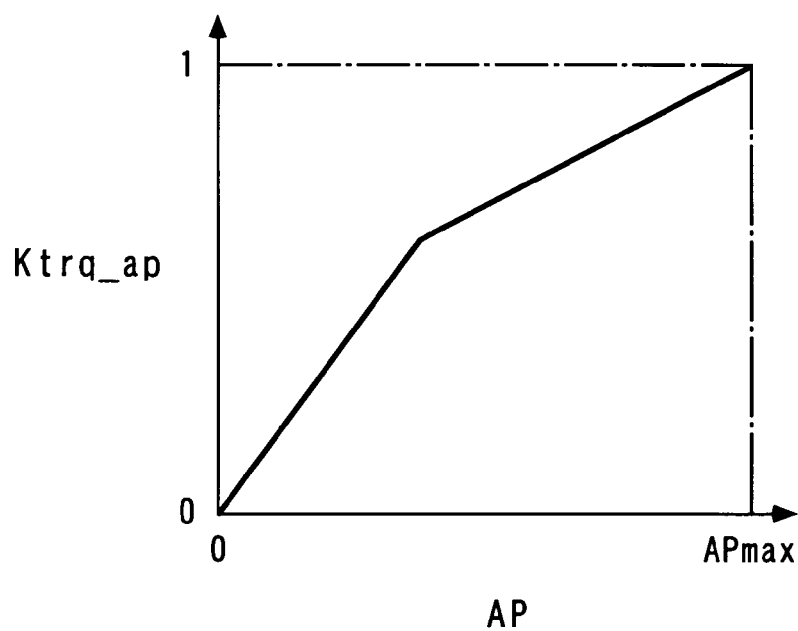
FIG. 18 is a diagram showing an example of a map for use in calculating a normalized demanded driving force Ktrq_ap.

Further, the demanded torque-calculating section 104 calculates a normalized demanded driving force Ktrq_ap by searching a map shown in FIG. 18 according to the accelerator pedal opening AP. In FIG. 18, APmax represents the maximum value (100%) of the accelerator pedal opening. Further, the normalized demanded driving force Ktrq_ap represents a value obtained by normalizing the demanded driving force Ktrq_ap determined based on the accelerator pedal opening AP, with reference to a demanded driving force Trq_apmax obtained when AP=APmax holds, that is, a value which satisfies the equation, Ktrq_ap=Trq_ap÷Trq_apmax.

Then, finally, the demanded torque TRQDRV is calculated by the following equation (70):

$$TRQDRV(k)=Ktrq\_ap(k)\{Trq\_\max(k)-Ttrq\_\min(k)\}+Ttrq\_\min(k) \quad (70)$$

Figure 19:
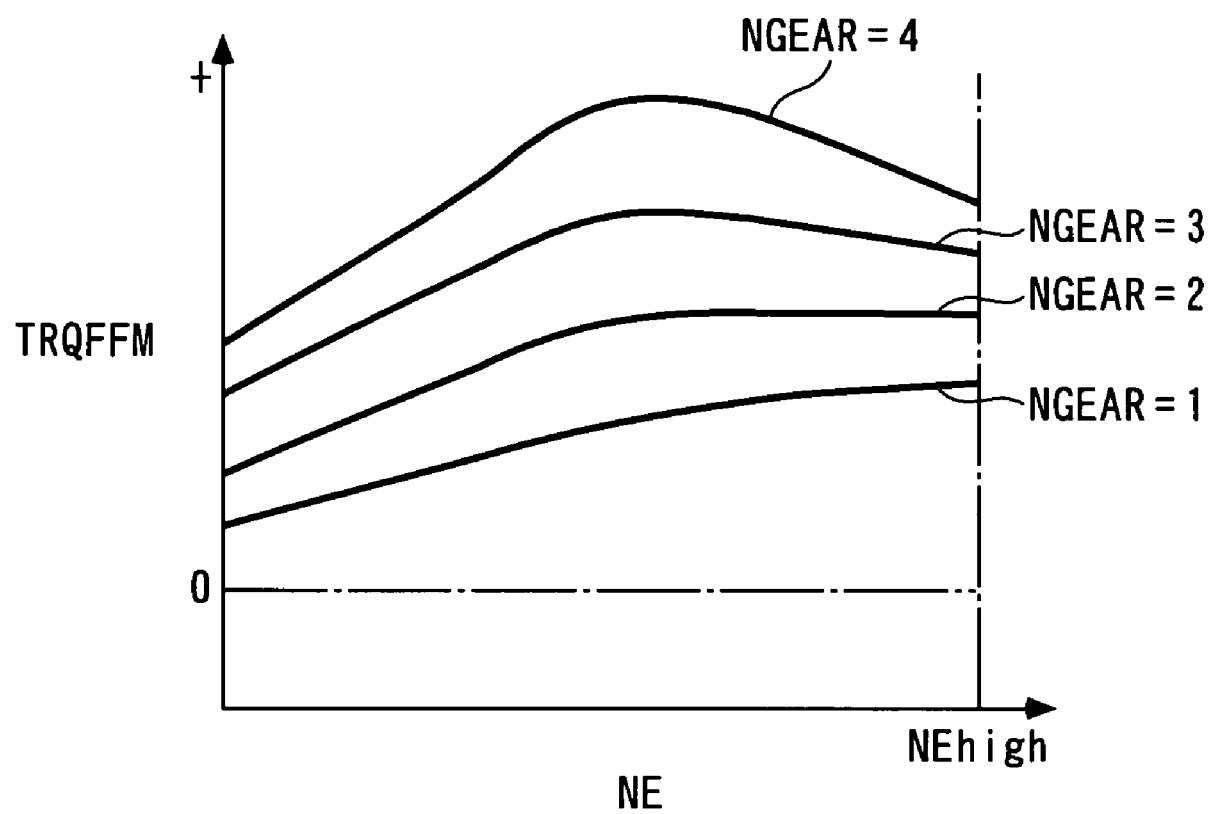
FIG. 19 is a diagram showing an example of a map for use in calculating a reference feedforward torque TRQFFM.

On the other hand, the aforementioned reference feedforward torque-calculating section 105 calculates a reference feedforward torque TRQFFM by searching a map shown in FIG. 19 according to the engine speed NE and the forward gear position value NGEAR. The reference feedforward torque TRQFFM corresponds to the maximum value of the torque of the engine 3, which does not cause the drive wheels to slip with respect to the non-drive wheels in typical conditions of both the road surface and tires, and therefore satisfies the equation, Ws_act≈Ws_cmd.

Further, the estimated torque-calculating section 106 calculates an estimated torque TRQINST using a neural network model (not shown) to which are input the intake air amount Gcyl, the intake pressure PB, the actual air-fuel ratio KACT, an EGR rate, the fuel injection amount Tout, ignition timing, and so forth, and from which is output the estimated torque TRQINST. The estimated torque TRQINST is obtained by estimating the upper limit value of the torque of the engine 3, which satisfies the equation, Ws_act≈Ws_cmd at the time point.

In this case, the method of calculating the estimated torque TRQINST by the estimated torque-calculating section 106 is not limited to the above-described method, but the neural network model may be replaced by a map search method. Further, by using an in-cylinder pressure sensor for detecting pressure within an associated one of the cylinders, an indicated mean effective pressure IMEP may be calculated based on a detection signal from the in-cylinder pressure sensor, and the estimated torque TRQINST may be estimated based on the indicated mean effective pressure IMEP and friction data of the engine 3 set in advance. Furthermore, the above-described torque feedback value TRQFB may be used as the estimated torque TRQINST.

It should be noted that in the present embodiment, the estimated torque-calculating section 106 corresponds to the estimated value-calculating means, and the estimated torque TRQINST corresponds to the estimated value of the control input.

Next, the aforementioned model modifier 120 will be described with reference to FIG. 20. The model modifier 120 is for calculating a model modification coefficient KTRQFF, as described hereinafter. As will be described hereinafter, the model modification coefficient KTRQFF is used for modifying (or correcting) the reference feedforward torque TRQFFM. It should be noted that in the present embodiment, the aforementioned model modifier 120 corresponds to the error parameter-calculating means and the modification value-calculating means.

Figure 20:
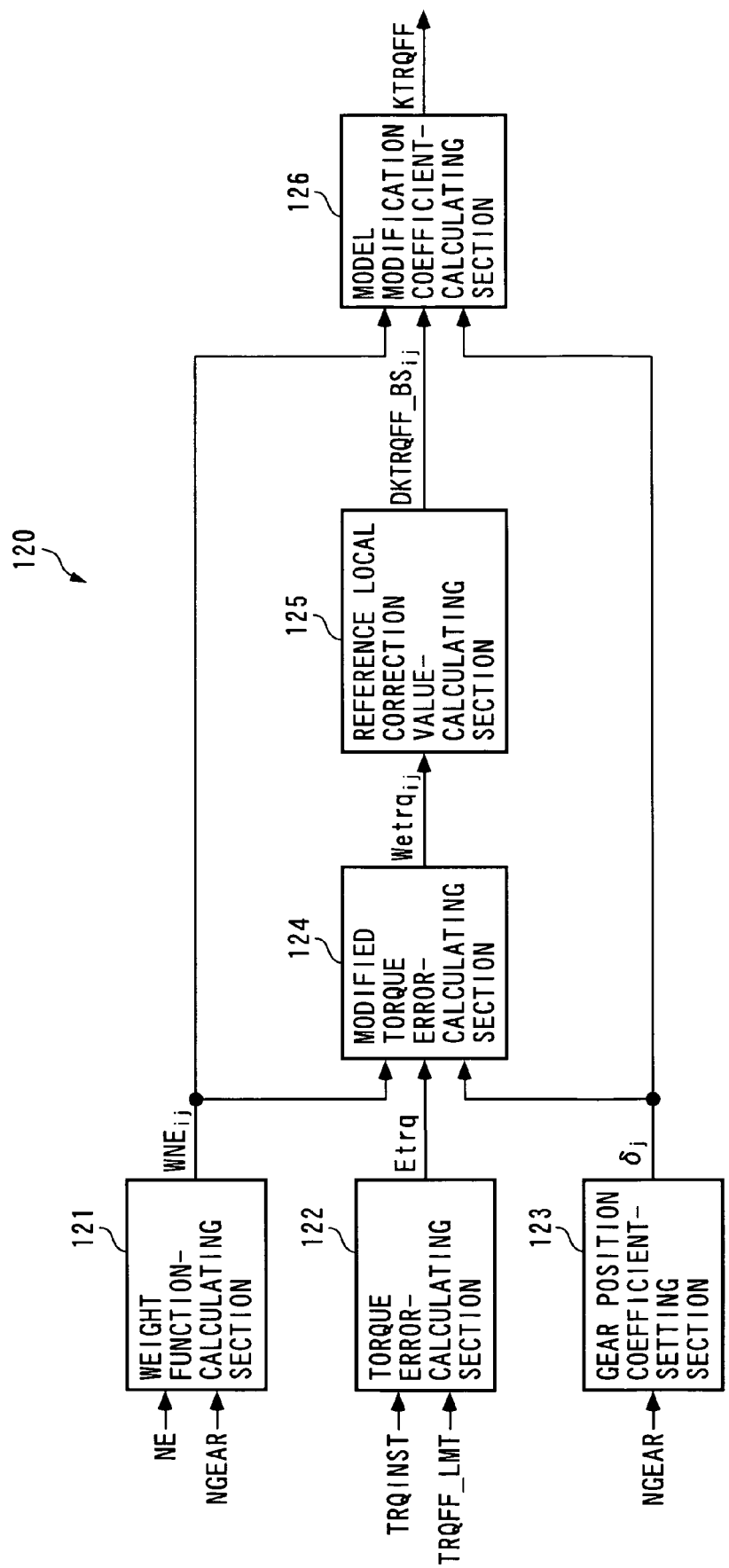
FIG. 20 is a schematic functional block diagram of a model modifier.

As shown in FIG. 20, the model modifier 120 is comprised of a weight function-calculating section 121, a torque error-calculating section 122, a gear position coefficient-setting section 123, a modified torque error-calculating section 124, a reference local correction value-calculating section 125, and a modification coefficient-calculating section 126.

First, as described hereinafter, the weight function-calculating section 121 calculates weight functions $WNE_{ij}$ according to the engine speed NE and the forward gear position value NGEAR. Here, the subscript i (i=1 to 3) of the weight function $WNE_{ij}$ represents each of three regions, described hereinafter, of the engine speed NE, and the subscript j (j=1 to 4) of the weight function represents each of all the values 1 to 4 that the forward gear position value NGEAR can take. That is, the weight function $WNE_{ij}$ is calculated as a vector which is composed of the elements of twelve values. These elements are associated with respective twelve regions determined by a combination of the engine speed NE and the forward gear position value NGEAR.

The weight function-calculating section 121 includes four maps associated with the forward gear values NGEAR as maps used for calculating the weight functions $WNE_{ij}$. The weight functions $WNE_{ij}$ are each calculated by first selecting a map associated with the forward gear position value NGEAR from the four maps, and then searching the selected map according to the engine speed NE.

FIG. 21 shows an example of one of the four maps, which is used when NGEAR=j=3 holds, i.e. which is selected when the automatic transmission is in the third-speed forward gear position. In FIG. 21, NEx1 to NEx6 represent predetermined values of the engine speed NE, and are set to values which satisfy the relationship of NEx1<NEx2<NEx3<NEx4<NEx5<NEx6 (=NEhigh).

As shown in FIG. 21, when a region within which the engine speed NE is variable is divided into three regions of $0 \leq NE < NEx3$, $NEx1 < NE < NEx5$, and $NEx3 < NE$, the three weight functions $WNE_{ij}$ are set such that they are associated with the above three regions, respectively, and are set to positive values not larger than 1 in the regions associated therewith, whereas in regions other than the associated regions, they are set to 0.

More specifically, the weight function $WNE_{1j}$ is set, in a region associated therewith ($0 \leq NE < NEx3$), to a maximum value of 1 when $NE \leq NEx1$ holds and to a smaller positive value as the engine speed NE is higher, while in the other regions, it is set to 0. Further, the weight function $WNE_{2j}$ is set, in a region associated therewith ($NEx1 < NE < NEx5$), to a maximum value of 1 when $NE = NEx3$ holds and to such a value as changes along the inclined sides of an isosceles triangle, while in the other regions, it is set to 0.

Further, the weight function $WNE_{3j}$ is set, in a region associated therewith ($NEx3 < NE$), to a maximum value of 1 when $NEx5 \leq NE$ holds and to a larger positive value as the engine speed NE is higher, while in the other regions, it is set to 0.

Moreover, the three regions with which the respective three weight functions $WNE_{ij}$ are associated are set such that adjacent ones thereof overlap each other, as described above, and the sum of the values of the weight functions $WN_{ij}$ associated with the respective overlapping regions becomes equal to the maximum value of 1 of each weight function $WN_{ij}$. For example, when $NE=NEx2$ holds, the values of the two weight functions $WNE_{1j}$ and $WN_{2j}$ corresponding to the value $NEx2$ are each set to 0.5, and hence the sum $WNE_{1j}+WNE_{2j}$ of the weight functions becomes equal to 1 which is equal to the maximum value of each weight function $WNE_{ij}$. Further, also when $NE=NEx4$ holds, the sum $WNE_{2j}+WNE_{3j}$ of the two weight functions $WNE_{2j}$ and $WNE_{3j}$ corresponding to the predetermined value $NEx4$ becomes equal to 1 which is equal to the maximum value of each weight function $WNE_{ij}$.

In this case, a weight function $WNE_{ij}$ composed of the elements of two values or four or more values on a map may be used in place of the weight function $WNE_{ij}$ composed of the elements of three values on the map shown in FIG. 21. In this case, the regions of the engine speed NE are only required to be set such that they overlap each other, according to the number of the elements. It should be noted that in the present embodiment, the weight function $WNE_{ij}$ correspond to the plurality of functions.

Further, the torque error-calculating section 122 calculates a torque error Etrq by the following equations (71) to (74):

$$DT(k)=TRQFF\_LMT(k-1)-TRQINST(k) \quad (71)$$

$$\text{When } DT(k)<ETRQ\_L, Etrq(k)=ETRQ\_L \quad (72)$$

$$\text{When } ETRQ\_L \leq DT(k) \leq ETRQ\_H, Etrq(k)=DT(k) \quad (73)$$

$$\text{When } ETRQ\_H<DT(k), Etrq(k)=ETRQ\_H \quad (74)$$

In the above equation (71), DT represents an difference, and TRQFF_LMT represents an adaptive limit torque calculated as described hereinafter. Further, ETRQ_L in the equation (72) represents a predetermined lower limit value, and ETRQ_H in the equation (73) represents a predetermined upper limit value. As described above, the torque error Etrq is calculated by performing a limiting process on the difference DT using the two values ETRQ_H and ETRQ_L as upper and lower limit values, respectively.

It should be noted that in the present embodiment, the torque error-calculating section 122 corresponds to the error parameter-setting means, the torque error Etrq to the error parameter, the difference between the error parameter and the predetermined target value, and the difference between the estimated value and the second input value, and a value of 0 to the predetermined target value.

Further, the gear position coefficient-setting section 123 sets four gear position coefficients $\delta_j$ by the following equations (75) and (76).

$$\text{When } NGEAR(k)=j, \delta_j(NGEAR(k))=1 \quad (75)$$

$$\text{When } NGEAR(k) \neq j, \delta_j(NGEAR(k))=0 \quad (76)$$

As is apparent from the above equations (75) and (76), out of the four gear position coefficients $\delta_j$, only a gear position coefficient $\delta_j$ whose subscript j is equal to the forward gear position value NGEAR is set to 1, and the others are set to 0. For example, when NGEAR=1 holds, $\delta_1$, is set to 1, and $\delta_2$ to $\delta_4$ are set to 0, whereas when NGEAR=3 holds, $\delta_3$ is set to 1, and $\delta_1$, $\delta_2$, and $\delta_4$ are set to 0.

Then, the modified torque error-calculating section 124 calculates modified torque errors $Wetrq_{ij}$ by the following equation (77):

$$Wetrq_{ij}(k)=WNE_{ij}(k) \cdot \delta_j(NGEAR(k)) \cdot Etrq(k) \quad (77)$$

As is apparent from the above equation (77), the modified torque error $Wetrq_{ij}$ is calculated as a vector which is composed of the elements of twelve values, and all the elements whose subscripts j are not equal to NGEAR are set to 0. It should be noted that in the present embodiment, the modified torque errors $Wetrq_{ij}$ correspond to a plurality of products.

Further, the reference local correction value-calculating section 125 calculates reference local correction values $DKTRQFF\_BS_{ij}$ with a sliding mode control algorithm using a forgetting coefficient $\lambda v$ expressed by the following equations (78) to (84). That is, the reference local correction value $DKTRQFF\_BS_{ij}$ is calculated as a vector which is composed of the elements of twelve values. These elements are associated with twelve regions determined by a combination of the engine speed NE and the forward gear position value NGEAR, respectively.

$$\sigma v_{ij}(k)=Wetrq_{ij}(k)+Sv \cdot Wetrq_{ij}(k-1) \quad (78)$$

$$Urch\_v_{ij}(k)=-Krch\_v \cdot \sigma v_{ij}(k) \quad (79)$$

$$Unl\_v_{ij}(k)=-Knl\_v \cdot sgn(\sigma v_{ij}(k)) \quad (80)$$

$$Uadp\_v_{ij}(k)=\lambda v \cdot Uadp\_v_{ij}(k-1)+Kadp\_v \cdot \sigma v_{ij}(k) \quad (81)$$

$$\text{When } DKTRQ\_L<DKTRQFF\_BS_{ij}(k-1)<DKTRQ\_H, \lambda v=1 \quad (82)$$

$$\text{When } DKTRQFF\_BS_{ij}(k-1) \leq DKTRQ\_L \text{ or } DKTRQ\_H \leq DKTRQFF\_BS_{ij}(k-1), \lambda v=\lambda vlmt \quad (83)$$

$$DKTRQFF\_BS_{ij}(k)=Urch\_v_{ij}(k)+Unl\_v_{ij}(k)+Uadp\_v_{ij}(k) \quad (84)$$

In the above equation (78), $\sigma v_{ij}$ represents a switching function, and Sv represents a switching function-setting parameter which is set to a value satisfying the relationship of $-1<Sv<0$. In this case, the convergence rate of the modified torque errors $Wetrq_{ij}$ to 0 is designated by a value set to the switching function-setting parameter Sv. Further, in the equation (79), Urch_$v_{ij}$ represents a reaching law input, and Krch_v represents a predetermined reaching law gain. Furthermore, in the equation (80), Unl_$v_{ij}$ represents a nonlinear input, and Knl_v represents a predetermined nonlinear input gain. Further, in the equation (80), sgn($\sigma v_{ij}$(k)) represents a sign function, and the value thereof is set such that sgn($\sigma v_{ij}$(k))=1 holds when $\sigma v_{ij}$(k)≧0, and sgn($\sigma v_{ij}$(k))=−1 holds when $\sigma v_{ij}$(k)<0 (it should be noted that the value thereof may be set such that sgn($\sigma v_{ij}$(k))=0 holds when $\sigma v_{ij}$(k)=0).

Furthermore, in the equation (81), Uadp_$v_{ij}$ represents an adaptive law input, and Kadp_v represents a predetermined adaptive law gain. Further, as shown in the equations (82) and (83), the value of the forgetting coefficient λv in the equation (81) is set to 1 or a predetermined value λvlmt, according to the results of comparisons between the immediately preceding value DKTRQFF_$BS_{ij}$(k−1) of the reference local correction value and predetermined upper and lower limit values DKTRQ_H and DKTRQ_L. The upper limit value DKTRQ_H is set to a predetermined positive value, and the lower limit value DKTRQ_L is set to a predetermined negative value, while the predetermined value λvlmt is set to a value which satisfies the relationship of 0<λvlmt<1.

The above-mentioned forgetting coefficient λv is used for the following reason: When a sudden change in a state of the wheels gripping the road surface is temporarily caused by a local change on the road surface (e.g. a local frozen condition of the road surface, a local change in the paved state of the road surface, or the like), the absolute value of the torque error Etrq suddenly increases, and accordingly, the absolute value of the adaptive law input Uadp_$v_{ij}$ is suddenly increased, whereby the adaptive limit torque TRQFF_LMT, described hereinafter, is also suddenly decreased or increased. When the local change in the road surface is eliminated in this state, unless the forgetting coefficient λv is in use, the adaptive law input Uadp_$v_{ij}$ is held at a large value, which causes deviation of the adaptive limit torque TRQFF_LMT from a predetermined optimum range. This causes degradation of acceleration response of the vehicle, and a momentary wheel slip. Therefore, in the present embodiment, the forgetting coefficient λv is used so as to quickly restore the adaptive limit torque TRQFF_LMT to the predetermined range when the local change in the road surface is eliminated.

Further, as shown in the equation (84), the reference local correction value DKTRQFF_$BS_{ij}$ is calculated as the sum of the reaching law input Urch_$v_{ij}$, the nonlinear input Unl_$v_{ij}$, and the adaptive law input Uadp_$v_{ij}$.

As described above, the reference local correction value-calculating section 125 calculates the reference local correction values DKTRQFF_$BS_{ij}$ with the control algorithm expressed by the equations (78) to (84), and therefore the reference local correction values DKTRQFF_$BS_{ij}$ are calculated as values for causing the modified torque-errors Wetrq$_{ij}$ to converge to 0, respectively, in other words, as values for causing the adaptive limit torque TRQFF_LMT to converge to the estimated torque TRQINST.

In this case, the control algorithm for use in calculating the reference local correction values DKTRQFF_$BS_{ij}$ is not limited to the aforementioned equations (78) to (84), but any suitable feedback control algorithm may be used insofar as it is capable causing the modified torque errors Wetrq$_{ij}$ to converge to 0. For example, the PID control algorithm, the backstepping control algorithm, the response-specifying control algorithm in which a controlled object model of the sliding mode control algorithm is replaced by a controlled object model of a linear type, or the optimal regulator may be used. It should be noted that in the present embodiment, the reference local correction values DKTRQFF_$BS_{ij}$ correspond to the plurality of modification values.

Further, the aforementioned modification coefficient-calculating section 126 calculates the model modification coefficient KTRQFF by the following equations (85) to (87):

$$Dktrqff_{ij}(k) = WNE_{ij}(k) \cdot \delta_j(NGEAR(k)) \cdot DKTRQFF\_BS_{ij}(k) \quad (85)$$

$$DKTRQFF_j = \sum_{i=1}^{3} Dktrqff_{ij}(k) \quad (86)$$

$$KTRQFF(k) = 1 + \sum_{j=1}^{4} DKTRQFF_j(k) \quad (87)$$

In the above equation (85), Dktrqff$_{ij}$ represents a product, and in the equation (86), DKTRQFF$_j$ represents local correction values. In this case, the product Dktrqff$_{ij}$ is calculated by multiplication using the gear position coefficient $\delta_j$, so that out of four local correction values DKTRQFF$_j$, three local correction values DKTRQFF$_j$ whose subscripts j are not equal to NGEAR are all calculated as 0.

As described above, the model modifier 120 calculates the model modification coefficient KTRQFF by adding the total sum of the four local correction values DKTRQFF$_j$ to 1. This is because as described hereinafter, the model modification coefficient KTRQFF is used as a multiplication value by which a reference feedforward torque TRQFFM is multiplied, and hence when there is no need to correct the reference feedforward torque TRQFFM, the model modification coefficient KTRQFF is thus calculated to make KTRQFF equal to 1.

More specifically, the aforementioned multiplier 107 calculates the adaptive limit torque TRQFF_LMT by the following equation (88). It should be noted that in the present embodiment, the adaptive limit torque TRQFF_LMT corresponds to the second input value.

$$TRQFF\_LMT(k) = KTRQFF(k) \cdot TRQFFM(k) \quad (88)$$

FIGS. 22A to 22E show examples of the results of calculation of values by the model modifier 120 and the multiplier 107, obtained particularly when the forward gear position value NGEAR=j=3 holds, i.e. when the automatic transmission is in the third-speed forward gear position. As shown in FIGS. 22A to 22E, the three products Dktrqff$_{ij}$ are calculated as values which change in a manner different from each other, while the model modification coefficient KTRQFF is calculated as a value which nonlinearly changes with respect to the engine sped NE. From the above, it is understood that the adaptive limit torque TRQFF_LMT can be calculated as the result of nonlinear modification of the reference feedforward torque TRQFFM by the model modification coefficient KTRQFF.

As described above, the model modifier 120 and the multiplier 107 calculate the reference local correction values DKTRQFF_$BS_{ij}$ such that the torque error Etrq becomes equal to 0 (i.e. such that the drive wheel speed Ws_act becomes equal to the target wheel speed Ws_cmd), calculates the model modification coefficient KTRQFF while modifying the weight functions WNE$_{ij}$ by the reference local correction values DKTRQFF_$BS_{ij}$ calculated as above, and further calculates the adaptive limit torque TRQFF_LMT by modifying the reference feedforward torque TRQFFM using the thus calculated model modification coefficient KTRQFF. This makes it possible, even when optimum torque for causing no slippage of the drive wheels is nonlinearly changed by the above-mentioned various causes, it is possible to calculate the adaptive limit torque TRQFF_LMT while causing the same to be adapted to the above nonlinear changes in the optimum torque.

Further, the feedforward torque-calculating section 108 calculates the feedforward torque TRQFF by the following equations (89) and (90):

When $TRQFF\_LMT(k) < TRQDRV(k)$, $TRQFF(k) = TRQFF\_LMT(k)$     (89)

When $TRQFF\_LMT(k) < TRQDRV(k)$, $TRQFF(k) = TRQDRV(k)$     (90)

As shown in the above equations (89) and (90), the feedforward torque TRQFF is set to a smaller one of the adaptive limit torque TRQFF_LMT and the demanded torque TRQDRV. The reason for this will be described hereinafter.

Further, the adder 109 calculates a limit torque TRQTC by adding the feedforward torque TRQFF to the modulated value DKCMD_DSM, as shown in the following equation (91):

$TRQTC(k) = TRQFB\_DSM(k) + TRQFF(k)$     (91)

Then, the aforementioned engine torque-calculating section 110 finally calculates the engine torque TRQENG by the following equations (92) and (93):

When $TRQTC(k) < TRQDRV(k)$, $TRQENG(k) = TRQTC(k)$     (92)

When $TRQTC(k) \leq TRQDRV(k)$, $TRQENG(k) = TRQDRV(k)$     (93)

As shown in the above equations (92) and (93), the engine torque TRQENG is set to a smaller one of the limit torque TRQTC and the demanded torque TRQDRV. It should be noted that in the present embodiment, the engine torque-calculating section 110 corresponds to the selection means, and the limit torque TRQTC corresponds to the target output.

As described hereinbefore, in the traction controller 100, the engine torque-calculating section 110 selects a smaller one of the two torques TRQTC and TRQDRV as the engine torque TRQENG, while the feedforward torque-calculating section 108 selects a smaller one of the two torques TRQFF_LMT and TRQDRV as the feedforward torque TRQFF. This is for the following reason:

When a too large amount of the torque TRQDRV is demanded by the driver, which can cause the drive wheels to slip, the engine torque-calculating section 110 calculates the engine torque TRQENG by performing the limiting process on the demanded torque TRQDRV using the limit torque TRQTC as an upper limit value. This makes it possible to properly control torque generated by the engine 3 to the limit torque TRQTC that is capable of preventing the drive wheels from slipping, thereby making it possible to ensure running stability of the vehicle.

On the other had, when the amount of the torque TRQDRV demanded by the driver is smaller than the limit torque TRQTC, the engine torque-calculating section 110 sets the engine torque TRQENG to the demanded torque TRQDRV, whereby it is possible to prevent the drive wheels from slipping. In this case, the wheel speed feedback controller 102 sometimes calculates the torque feedback value TRQFB as a negative value. Assuming that from this state, the demanded torque TRQDRV is suddenly increased by a sudden accelerator pedal operation by the driver, thereby largely exceeding the limit torque TRQTC, although the engine torque-calculating section 110 sets the engine torque TRQENG to the limit torque TRQTC, the torque feedback value TRQFB has a characteristic of low responsiveness since it is calculated with the feedback control algorithm. This can cause, when the torque feedback value TRQFB takes a negative value, the limit torque TRQTC to be made smaller than required to make the torque generated by the engine 3 smaller than required, which can result in degraded acceleration response of the vehicle and degraded drivability.

In contrast, when the demanded torque TRQDRV is suddenly increased to largely exceed the adaptive limit torque TRQFF_LMT, the feedforward torque-calculating section 108 sets the feedforward torque TRQFF to the adaptive limit torque TRQFF_LMT. The adaptive limit torque TRQFF_LMT is calculated as an upper limit value of torque within which the drive wheels can be prevented from slipping, and the limit torque TRQTC is calculated by adding the modulated value TRQFB_DSM, which is a modulated value of the torque feedback value TRQFB, to the adaptive limit torque TRQFF_LMT. Therefore, it is possible to calculate the engine torque TRQENG as a value which is repeatedly inverted with respect to the adaptive limit torque TRQFF_LMT. This makes it possible to prevent the limit torque TRQTC from being made smaller than required, thereby making it possible to hold the torque generated by the engine 3 at a value close to the upper limit value of the torque within which the drive wheels can be prevented from slipping. This make it possible to obtain excellent acceleration response of the vehicle. To obtain the above-described advantageous effects, the two calculating sections 108 and 110 calculate the engine torque TRQENG and the feedforward torque TRQFF by the above-described method.

As described above, in the control apparatus 1A of the present embodiment, the engine torque TRQENG is calculated by the traction controller 100, and by using the engine torque TRQENG as a target, an intake air amount control process, the air-fuel ratio control process, and an ignition timing control process are carried out such that the actual torque of the engine 3 becomes equal to the engine torque TRQENG.

Next, results (hereinafter referred to as "the control results") of a simulation of the traction control carried out by the control apparatus 1A according to the second embodiment will be described with reference to FIGS. 23A to 23D and FIGS. 24A to 24C. FIGS. 23A to 23D show an example of the control results obtained by the control apparatus 1A according to the present embodiment when the acceleration/deceleration of the vehicle is repeatedly performed on a road surface having a small frictional resistance, particularly when j=3 holds, i.e. when the automatic transmission is in the third-speed forward gear position. On the other hand, FIGS. 24A to 24C show, for comparison with 23A to 23D, an example (hereinafter referred to as "the comparative example") of the control results obtained when the model modification coefficient KTRQFF is held at 1, i.e. when the reference feedforward torque TRQFFM is directly used as the adaptive limit torque TRQFF_LMT.

Referring first to FIGS. 24A to 24C, it is understood that in the comparative example, the reference feedforward torque TRQFFM is used as the adaptive limit torque TRQFF_LMT, and hence the limit torque TRQTC is corrected only by the torque feedback value TRQFB, so that the drive wheel speed Ws_act overshoots the target wheel speed Ws_cmd after time points (time points t31, t33, t35, and t37) when the drive wheel speed Ws_act has reached the target wheel speed Ws_cmd. Further, it is understood that the torque feedback value TRQFB does not converge to 0, making the fluctuating frequency of the modulated value TRQFB_DSM liable to decrease, which makes it impossible to give minute vibrations to the drive wheels in a slipping state, so that it is impossible to compensate for the aforementioned nonlinear characteristic of the grip behavior. As a result, it takes time for a steady-state deviation of the amount of slippage of the drive wheels (steady-state deviation of the drive wheel speed Ws_act from the target wheel speed Ws_cmd) to converge to 0.

In contrast, as shown in FIGS. 23A to 23D, according to the control apparatus 1A of the present embodiment, it is understood that when the demanded torque TRQDRV is changed into such a large value as causes the drive wheels to slip, although with a slight overshoot, the degree of overshoot is suppressed to be smaller than in the comparative example during a time period during which traction control is executed for a first time (between time points t21 and t22), and further, during a time period during which traction control is executed for a second time et seq. (between time points t23 and t24, t25 and t26, and t27 and t28), the drive wheel speed Ws_act converges to the target wheel speed Ws_cmd without causing overshoot. This is because the execution of the traction control a plurality of times advances the learning of the model modification coefficient KTRQFF, whereby the adaptive limit torque TRQFF_LMT is adapted to such an optimum torque which does not cause the drive wheels to slip, and the engine torque TRQENG can be properly limited by the limit torque TRQTC calculated by using the optimum torque.

Further, it is understood that since the torque feedback value TRQFB can be held at a value close to 0, it is possible to hold the fluctuating frequency of the modulated value TRQFB_DSM in a high frequency region, which makes it possible to impart minute vibrations to the drive wheels in the slipping state, and compensate for the aforementioned nonlinear characteristic of the grip behavior, thereby making it possible to suppress the steady-state deviation of the amount of slippage of the drive wheels. As described above, it is understood that the example of the control results of the present embodiment is improved in control accuracy compared with the comparative examples As described above, according to the control apparatus 1A of the second embodiment, the torque feedback value TRQFB is calculated such that the drive wheel speed Ws_act converges to the target wheel speed Ws_cmd, and the modulated value TRQFB_DSM is calculated by modulating the torque feedback value TRQFB with the algorithm to which is applied the $\Delta\Sigma$ modulation algorithm. This causes the modulated value TRQFB_DSM to be calculated as a value exhibiting an inverting behavior at a high frequency (e.g. a frequency of not lower than 5 Hz), since when Ws_act≈Ws_cmd holds, TRQFB≈0 holds.

Further, the demanded torque TRQDRV is calculated according to the engine speed NE and the accelerator pedal opening AP, a smaller one of the adaptive limit torque TRQFF_LMT and the demanded torque TRQDRV is selected as the feedforward torque TRQFF, and the limit torque TRQTC is calculated by adding the modulated value TRQFB_DSM to the feedforward torque TRQFF. Further, a smaller one of the limit torque TRQTC and the demanded torque TRQDRV is selected as the engine torque TRQENG.

In this case, the adaptive limit torque TRQFF_LMT is calculated by modifying (or correcting) the reference feedforward torque TRQFFM using the model modifier 120 by the model modification coefficient KTRQFF, and the model modification coefficient KTRQFF is calculated such that the modified torque error Wetrq$_{ij}$ is caused to converge to 0. More specifically, the model modification coefficient KTRQFF is calculated such that the adaptive limit torque TRQFF_LMT is caused to converge to the estimated torque TRQINST, and hence the adaptive limit torque TRQFF_LMT calculated using the thus calculated model modification coefficient KTRQFF is calculated as the optimum torque that is capable of causing the drive wheel speed Ws_act to converge to the target wheel speed Ws_cmd.

With this configuration, when a too large amount of the torque TRQDRV is demanded by the driver, which can cause the drive wheels to slip, the limit torque TRQTC is selected as the engine torque TRQENG, so that it is possible to control the torque generated by the engine 3 such that the torque performs a periodic fluctuating behavior with respect to the optimum torque that is capable of preventing the drive wheels from slipping. This holds the torque in a state in which Ws_act≈Ws_cmd holds, whereby it is possible to hold the fluctuating frequency of the modulated value TRQFB_DSM, i.e. the limit torque TRQTC in a high frequency region. This makes it possible to compensate for the aforementioned nonlinear characteristic of the grip behavior, thereby making it possible to realize high-level traction control. In addition, as described hereinabove, it is possible to prevent the limit torque TRQTC from being suppressed to be smaller than required, thereby making it possible to hold the torque generated by the engine 3 at a value close to the upper limit value of the torque within which the drive wheels can be prevented from slipping. This makes it possible to obtain excellent acceleration response of the vehicle while realizing the high-level traction control.

Further, the model modifier 120 calculates the torque error Etrq by performing a limiting process on the difference DT (=TRQFF_LMT−TRQINST), and calculates the modified torque error Wetrq$_{ij}$ by multiplying the torque error Etrq, the gear position coefficient $\delta_j$, and the weight function WNE$_{ij}$ by each other. Furthermore, the model modifier 120 calculates the reference local correction value DKTRQFF_BS$_{ij}$ such that the modified torque error Wetrq$_{ij}$ calculated as above is caused to converge to 0, calculates the product Dktrqff$_{ij}$ by multiplying the gear position coefficient $\delta_j$, the weight function WNE$_{ij}$, and the reference local correction value DKTRQFF_BS$_{ij}$ by each other, and calculates the four local correction values DKTRQFF$_j$ as the sums of the products Dktrqff$_{ij}$ associated with the respective four values 1 to 4 which the forward gear position value NGEAR can take. Then, the model modifier 120 calculates the model modification coefficient KTRQFF by adding the total sum of the local correction values DKTRQFF$_j$ to 1, and calculates the adaptive limit torque TRQFF_LMT by modifying (correcting) the reference feedforward torque TRQFFM by the model modification coefficient KTRQFF.

As described above, when the FIG. 19 relationship between the reference feedforward torque TRQFFM and the engine sped NE suffer from a local error in any of the above-described three regions with respect to the actual relationship between the optimum torque and the engine speed NE, or even when there is variation in the actual relationship between the reference feedforward torque TRQFFM and the engine sped NE, between the three regions, it is possible to properly and quickly cause the relationship between the reference feedforward torque TRQFFM and the engine sped NE to coincide with the actual relationship between the optimum torque and the engine speed NE. This makes it possible to positively obtain the above-described advantageous effects.

Further, each of the three weight functions WNE$_{ij}$ associated with any of the values of the forward gear position value NGEAR is set to a positive value not larger than 1 in the above-described regions associated therewith, and is set to 0 in the other regions. Further, the weight functions WNE$_{ij}$ are configured such that two adjacent weight functions WNE$_{mj}$ and $WNE_{m+1j}$, (m=1 or 2) intersect with each other, and the sum of the values at the intersection of the two adjacent weight functions is equal to the maximum value 1 of the weight functions $WNE_{ij}$. Therefore, in modifying the reference feedforward torque TRQFFM, it is possible to modify the same continuously over the three regions, so that the adaptive limit torque TRQFF_LMT resulting from the modification comes to have no discontinuities. This makes it possible to prevent the adaptive limit torque TRQFF_LMT from becoming temporarily improper due to the discontinuities of the reference feedforward torque TRQFFM.

It should be noted that although in the second embodiment, the control apparatus according to the present invention is applied to the controlled object in which the drive wheel speed Ws_act is a controlled variable and the engine torque TRQENG is a control input, by way of example, this is not limitative, but it may be applied to any suitable system in various industrial apparatuses, as a controlled object, in which an output therefrom is a controlled variable and an input thereto is a control input.

Further, although in the second embodiment, the engine speed NE is used as the operating state parameter indicative of the operating state of the engine, by way of example, the operating state parameter according to the present invention is not limited to this, but any suitable operating state parameter may be used insofar as it represents the operating state of the engine. For example, in-cylinder pressure may be used as the operating state parameter.

It is further understood by those skilled in the art that the foregoing are preferred embodiments of the invention, and that various changes and modifications may be made without departing from the spirit and scope thereof.

We claim:

1. A control apparatus for controlling a controlled variable of a controlled object by a control input, comprising:
   controlled variable-detecting means for detecting the controlled variable;
   target controlled variable-setting means for setting a target controlled variable serving as a target to which the controlled variable is controlled;
   first input value-calculating means for calculating a first input value for performing feedback control of the controlled variable such that the controlled variable is caused to converge to the target controlled variable, with a predetermined feedback control algorithm;
   modulated input value-calculating means for calculating a modulated input value by modulating the first input value with a predetermined modulation algorithm such that the modulated input value has a higher frequency as an absolute value of the first input value is smaller;
   operating state parameter-detecting means for detecting an operating state parameter indicative of an operating state of the controlled object, except for the controlled variable;
   error parameter-calculating means for calculating an error parameter indicative of an error of the control input with respect to an estimated value of the control input at which the controlled variable is estimated to become equal to the target controlled variable;
   modification value-calculating means for calculating a plurality of modification values respectively associated with a plurality of regions formed by dividing a region within which the operating state parameter is variable, with a predetermined control algorithm, such that the error parameter becomes equal to a predetermined target value;
   model-modifying means for modifying a correlation model representative of a relationship between a second input value for feedforward-controlling the controlled variable and the operating state parameter, using the plurality of modification values;
   second input value-calculating means for calculating the second input value using the modified correlation model and the operating state parameter; and
   control input-calculating means for calculating the control input based on a sum of the second input value and the modulated input value such that the control input performs a periodic fluctuating behavior.

2. A control apparatus as claimed in claim 1, wherein said model-modifying means calculates a plurality of products by multiplying a difference between the error parameter and the predetermined target value, by values of a respective plurality of predetermined functions, and calculates the plurality of modification values according to the plurality of products, respectively,
   wherein the plurality of regions have adjacent regions overlapping each other, and
   wherein the plurality of predetermined functions are associated with the plurality of regions, respectively, and are set to values other than 0 only in the associated regions and to 0 in regions other than the associated regions, such that in regions overlapping each other, an absolute value of a total sum of values of the respective functions associated with the overlapping regions becomes equal to an absolute value of a maximum value of the functions.

3. A control apparatus as claimed in claim 1, wherein said error parameter-calculating means includes setting means for setting the first input value to the error parameter, and setting the predetermined target value to 0.

4. A control apparatus as claimed in claim 3, wherein the controlled variable is an output from an exhaust gas concentration sensor for detecting a concentration of a predetermined component of exhaust gases in an exhaust passage of an internal combustion engine at a location downstream of a catalytic device,
   wherein the target controlled variable is a target output at which an exhaust emission reduction rate of the catalytic device is estimated to be placed in a predetermined state,
   wherein the operating state parameter is an operating state parameter indicative of an operating state of the engine, and
   wherein said control input-calculating means calculates, as the control input, a target air-fuel ratio which serves, in an air-fuel ratio control of a mixture supplied to the engine, as a target to which the air-fuel ratio of the mixture is controlled.

5. A control apparatus as claimed in claim 1, wherein said error parameter-calculating means comprises:
   estimated value-calculating means for calculating the estimated value of the control input; and
   error parameter-setting means for setting a difference between the estimated value and the second input value to the error parameter.

6. A control apparatus as claimed in claim 5, wherein the controlled variable is a speed of drive wheels of a vehicle using the engine as a drive source,
   wherein the target controlled variable is a target speed for making an amount of slippage of the drive wheels with respect to non-drive wheels of the vehicle, equal to a predetermined amount, wherein the operating state parameter is an operating state parameter indicative of an operating state of the engine, and wherein said control input-calculating means calculates, as the control input, a target output which serves, in output control of an output from the engine, as a target to which the output from the engine is controlled.

7. A control apparatus as claimed in claim 6, further comprising:
demanded output-calculating means for calculating the output from the engine demanded by a driver of the vehicle, as a demanded output; and
selection means for selecting a smaller one of the demanded output and the target output as the target of the output from the engine in the output control.

8. A control apparatus as claimed in claim 7, wherein said control input-calculating means calculates the target output as a sum of the second input value and the modulated input value when the second input value is smaller than the demanded output, and calculates the target output as a sum of the demanded output and the modulated input value when the second input value is not smaller than the demanded output.

9. A method of controlling a controlled variable of a controlled object by a control input, comprising:
a controlled variable-detecting step of detecting the controlled variable;
a target controlled variable-setting step of setting a target controlled variable serving as a target to which the controlled variable is controlled;
a first input value-calculating step of calculating a first input value for performing feedback control of the controlled variable such that the controlled variable is caused to converge to the target controlled variable, with a predetermined feedback control algorithm;
a modulated input value-calculating step of calculating a modulated input value by modulating the first input value with a predetermined modulation algorithm such that the modulated input value has a higher frequency as an absolute value of the first input value is smaller;
an operating state parameter-detecting step of detecting an operating state parameter indicative of an operating state of the controlled object, except for the controlled variable;
an error parameter-calculating step of calculating an error parameter indicative of an error of the control input with respect to an estimated value of the control input at which the controlled variable is estimated to become equal to the target controlled variable;
a modification value-calculating step of calculating a plurality of modification values respectively associated with a plurality of regions formed by dividing a region within which the operating state parameter is variable, with a predetermined control algorithm, such that the error parameter becomes equal to a predetermined target value;
a model-modifying step of modifying a correlation model representative of a relationship between a second input value for feedforward-controlling the controlled variable and the operating state parameter, using the plurality of modification values;
a second input value-calculating step of calculating the second input value using the modified correlation model and the operating state parameter; and
a control input-calculating step of calculating the control input based on a sum of the second input value and the modulated input value such that the control input performs a periodic fluctuating behavior.

10. A method as claimed in claim 9, wherein said model-modifying step includes calculating a plurality of products by multiplying a difference between the error parameter and the predetermined target value, by values of a respective plurality of predetermined functions, and calculating the plurality of modification values according to the plurality of products, respectively,
wherein the plurality of regions have adjacent regions overlapping each other, and
wherein the plurality of predetermined functions are associated with the plurality of regions, respectively, and are set to values other than 0 only in the associated regions and to 0 in regions other than the associated regions, such that in regions overlapping each other, an absolute value of a total sum of values of the respective functions associated with the overlapping regions becomes equal to an absolute value of a maximum value of the functions.

11. A method as claimed in claim 9, wherein said error parameter-calculating step includes a setting step of setting the first input value to the error parameter, and setting the predetermined target value to 0.

12. A method as claimed in claim 11, wherein the controlled variable is an output from an exhaust gas concentration sensor for detecting a concentration of a predetermined component of exhaust gases in an exhaust passage of an internal combustion engine at a location downstream of a catalytic device,
wherein the target controlled variable is a target output at which an exhaust emission reduction rate of the catalytic device is estimated to be placed in a predetermined state,
wherein the operating state parameter is an operating state parameter indicative of an operating state of the engine, and
wherein said control input-calculating step includes calculating, as the control input, a target air-fuel ratio which serves, in an air-fuel ratio control of a mixture supplied to the engine, as a target to which the air-fuel ratio of the mixture is controlled.

13. A method as claimed in claim 9, wherein said error parameter-calculating step comprises:
an estimated value-calculating step of calculating the estimated value of the control input; and
an error parameter-setting step of setting a difference between the estimated value and the second input value to the error parameter.

14. A method as claimed in claim 13, wherein the controlled variable is a speed of drive wheels of a vehicle using the engine as a drive source,
wherein the target controlled variable is a target speed for making an amount of slippage of the drive wheels with respect to non-drive wheels of the vehicle, equal to a predetermined amount,
wherein the operating state parameter is an operating state parameter indicative of an operating state of the engine, and
wherein said control input-calculating step includes calculating, as the control input, a target output which serves, in output control of an output from the engine, as a target to which the output from the engine is controlled.

15. A method as claimed in claim 14, further comprising:
a demanded output-calculating step of calculating the output from the engine demanded by a driver of the vehicle, as a demanded output; and
a selection step of selecting a smaller one of the demanded output and the target output as the target of the output from the engine in the output control.

16. A method as claimed in claim 15, wherein said control input-calculating step includes calculating the target output as a sum of the second input value and the modulated input value when the second input value is smaller than the demanded output, and calculating the target output as a sum of the demanded output and the modulated input value when the second input value is not smaller than the demanded output.

17. A control unit including a control program for causing a computer to execute a method of controlling a controlled variable of a controlled object by a control input,
wherein the method comprises:
a controlled variable-detecting step of detecting the controlled variable;
a target controlled variable-setting step of setting a target controlled variable serving as a target to which the controlled variable is controlled;
a first input value-calculating step of calculating a first input value for performing feedback control of the controlled variable such that the controlled variable is caused to converge to the target controlled variable, with a predetermined feedback control algorithm;
a modulated input value-calculating step of calculating a modulated input value by modulating the first input value with a predetermined modulation algorithm such that the modulated input value has a higher frequency as an absolute value of the first input value is smaller;
an operating state parameter-detecting step of detecting an operating state parameter indicative of an operating state of the controlled object, except for the controlled variable;
an error parameter-calculating step of calculating an error parameter indicative of an error of the control input with respect to an estimated value of the control input at which the controlled variable is estimated to become equal to the target controlled variable;
a modification value-calculating step of calculating a plurality of modification values respectively associated with a plurality of regions formed by dividing a region within which the operating state parameter is variable, with a predetermined control algorithm, such that the error parameter becomes equal to a predetermined target value;
a model-modifying step of modifying a correlation model representative of a relationship between a second input value for feedforward-controlling the controlled variable and the operating state parameter, using the plurality of modification values;
a second input value-calculating step of calculating the second input value using the modified correlation model and the operating state parameter; and
a control input-calculating step of calculating the control input based on a sum of the second input value and the modulated input value such that the control input performs a periodic fluctuating behavior.

18. A control unit as claimed in claim 17, wherein said model-modifying step includes calculating a plurality of products by multiplying a difference between the error parameter and the predetermined target value, by values of a respective plurality of predetermined functions, and calculating the plurality of modification values according to the plurality of products, respectively,
wherein the plurality of regions have adjacent regions overlapping each other, and
wherein the plurality of predetermined functions are associated with the plurality of regions, respectively, and are set to values other than 0 only in the associated regions and to 0 in regions other than the associated regions, such that in regions overlapping each other, an absolute value of a total sum of values of the respective functions associated with the overlapping regions becomes equal to an absolute value of a maximum value of the functions.

19. A control unit as claimed in claim 17, wherein said error parameter-calculating step includes a setting step of setting the first input value to the error parameter, and setting the predetermined target value to 0.

20. A control unit as claimed in claim 19, wherein the controlled variable is an output from an exhaust gas concentration sensor for detecting a concentration of a predetermined component of exhaust gases in an exhaust passage of an internal combustion engine at a location downstream of a catalytic device,
wherein the target controlled variable is a target output at which an exhaust emission reduction rate of the catalytic device is estimated to be placed in a predetermined state,
wherein the operating state parameter is an operating state parameter indicative of an operating state of the engine, and
wherein said control input-calculating step includes calculating, as the control input, a target air-fuel ratio which serves, in an air-fuel ratio control of a mixture supplied to the engine, as a target to which the air-fuel ratio of the mixture is controlled.

21. A control unit as claimed in claim 17, wherein said error parameter-calculating step comprises:
an estimated value-calculating step of calculating the estimated value of the control input; and
an error parameter-setting step of setting a difference between the estimated value and the second input value to the error parameter.

22. A control unit as claimed in claim 21, wherein the controlled variable is a speed of drive wheels of a vehicle using the engine as a drive source,
wherein the target controlled variable is a target speed for making an amount of slippage of the drive wheels with respect to non-drive wheels of the vehicle, equal to a predetermined amount,
wherein the operating state parameter is an operating state parameter indicative of an operating state of the engine, and
wherein said control input-calculating step includes calculating, as the control input, a target output which serves, in output control of an output from the engine, as a target to which the output from the engine is controlled.

23. A control unit as claimed in claim 22, wherein the method further comprises:
a demanded output-calculating step of calculating the output from the engine demanded by a driver of the vehicle, as a demanded output; and
a selection step of selecting a smaller one of the demanded output and the target output as the target of the output from the engine in the output control.

24. A control unit as claimed in claim 23, wherein said control input-calculating step includes calculating the target output as a sum of the second input value and the modulated input value when the second input value is smaller than the demanded output, and calculating the target output as a sum of the demanded output and the modulated input value when the second input value is not smaller than the demanded output.

* * * * *